(12) United States Patent
Desai

(10) Patent No.: US 7,835,055 B2
(45) Date of Patent: Nov. 16, 2010

(54) FIBER BASED MEMS

(75) Inventor: Shahyaan Desai, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 12/615,625

(22) Filed: Nov. 10, 2009

(65) Prior Publication Data

US 2010/0050415 A1 Mar. 4, 2010

Related U.S. Application Data

(63) Continuation of application No. 12/323,322, filed on Nov. 25, 2008, now Pat. No. 7,616,367, which is a continuation of application No. 11/166,363, filed on Jun. 24, 2005, now Pat. No. 7,457,021.

(60) Provisional application No. 60/582,405, filed on Jun. 24, 2004, provisional application No. 60/659,736, filed on Mar. 8, 2005.

(51) Int. Cl.
*G02B 26/08* (2006.01)
(52) U.S. Cl. .................................. 359/224.1
(58) Field of Classification Search ... 359/223.1–226.1, 359/871, 872; 385/16–18
See application file for complete search history.

(56) References Cited

U.S. PATENT DOCUMENTS

| | | | |
|---|---|---|---|
| 6,516,208 | B1 | 2/2003 | Eden |
| 6,530,698 | B1 * | 3/2003 | Kuhara et al. .............. 385/88 |
| 6,668,108 | B1 | 12/2003 | Helkey et al. |
| 7,003,188 | B2 | 2/2006 | Hsu et al. |
| 7,405,854 | B2 | 7/2008 | Desai et al. |
| 7,457,021 | B2 | 11/2008 | Desai |
| 7,616,367 | B2 | 11/2009 | Desai |
| 2001/0055462 | A1 | 12/2001 | Seibel |
| 2002/0131139 | A1 | 9/2002 | Mandella et al. |
| 2002/0181844 | A1 | 12/2002 | Vaganov |
| 2003/0123786 | A1 * | 7/2003 | Yee .............................. 385/16 |
| 2004/0082247 | A1 | 4/2004 | Desai et al. |
| 2006/0007514 | A1 | 1/2006 | Desai |
| 2006/0268384 | A1 | 11/2006 | Desai et al. |
| 2009/0153936 | A1 | 6/2009 | Desai |

FOREIGN PATENT DOCUMENTS

EP 0875780 A2 11/1998

(Continued)

OTHER PUBLICATIONS

"U.S. Appl. No. 10/395,008, Advisory Action Apr. 22, 2008", 3 pgs.

(Continued)

*Primary Examiner*—Euncha P Cherry
(74) *Attorney, Agent, or Firm*—Schwegman, Lundberg & Woessner, P.A.

(57) ABSTRACT

MEMS can be fabricated from fibers without the use of a matrix material. Devices can be built where fibers are attached only at a substrate edge (e.g. cantilevers, bridges). Motions can be controlled by adjusting the linkage between multiple fibers with weak coupling (e.g. base, tip, in-between). Driving mechanisms include base-forcing (magnetics, piezo, electrostatics) or tip forcing (magnetics). Mirrors may be formed on free ends of cantilevers to form optical scanners.

33 Claims, 49 Drawing Sheets

FOREIGN PATENT DOCUMENTS

WO     WO-2006002388 A1     1/2006

OTHER PUBLICATIONS

"U.S. Appl. No. 10/395,008, Advisory Action mailed Mar. 26, 2008", 3 pgs.

"U.S. Appl. No. 10/395,008, Advisory Action mailed Apr. 22, 2008", 3 pgs.

"U.S. Appl. No. 10/395,008, Advisory Action mailed June. 20, 2006", 3 pgs.

"U.S. Appl. No. 10/395,008, Amendment and Response filed Feb. 5, 2007 to Non-Final Office Action mailed Oct. 5, 2006", 20 pgs.

"U.S. Appl. No. 10/395,008, Amendment and Response filed Mar. 30, 2005 to Non-Final Office Action mailed Dec. 30, 2004", 18 pgs.

"U.S. Appl. No. 10/395,008, Amendment and Response filed Mar. 9, 2006 to Final Office Action mailed Feb. 9, 2006", 15 pgs.

"U.S. Appl. No. 10/395,008, Final Office Action mailed Feb. 9, 2006", 6 pgs.

"U.S. Appl. No. 10/395,008, Interview Summary mailed May 5, 2008", 4 pgs.

"U.S. Appl. No. 10/395,008, Non-Final Office Action mailed Oct. 5, 2006", 7 pgs.

"U.S. Appl. No. 10/395,008, Non-Final Office Action mailed Dec. 30, 2004", 7 pgs.

"U.S. Appl. No. 10/395,008, Notice of Non-Compliant Amendment mailed Aug. 9, 2007", 3 pgs.

"U.S. Appl. No. 10/395,008, Office Communication mailed May 2, 2007", 2 pgs.

"U.S. Appl. No. 10/395,008, Second Substitute Amendment and Response filed Sep. 6, 2007 to Notice of Non-Compliant Amendment mailed Aug. 9, 2007", 20 pgs.

"U.S. Appl. No. 10/395,008, Substitute Amendment and Response filed May 31, 2007 to Office Communication mailed May 2, 2007 and Office Action mailed Oct. 5, 2006", 20 pgs.

"U.S. Appl. No. 10/395,008, Amendment and Response filed Mar. 6, 2008 to Final Office Action mailed Dec. 6, 2007", 17 pgs.

"U.S. Appl. No. 10/395,008, Supplemental Amendment and Response filed Apr. 3, 2008 to Final Office Action/Advisory Action mailed Dec. 6, 2007", 18 pgs.

"U.S. Appl. No. 10/395,008, Second Supplemental Amendment and Response filed Apr. 30, 2008 to Advisory Action mailed Apr. 22, 2008", 16 pgs.

"U.S. Appl. No. 10/395,008 Notice of Allowance mailed May 21, 2008", NOAR, 11pgs.

"U.S. Appl. No. 10/395,008, Final Office Action Mailed Dec. 6, 2007", 12 pgs.

"U.S. Appl. No. 11/166,363, Non-Final Office Action mailed Jan. 10, 2008", 7 pgs.

"U.S. Appl. No. 11/166,363, Non-Final Office Action mailed May 1, 2007", 9 pgs.

"U.S. Appl. No. 11/166,363, Final Office Action mailed Oct. 18, 2007", 7 pgs.

"U.S. Appl. No. 11/166,363, Amendment and Response filed Dec. 18, 2007 to Final Office Action mailed Oct. 18, 2007", 8 pgs.

"U.S. Appl. No. 11/166,363, Amendment and Response filed Aug. 1, 2007 to Non-Final Office Action mailed May 1, 2007", 10 pgs.

"U.S. Appl. No. 11/166,363, Amendment and Response filed Apr. 9, 2008 to Office Action mailed Jan. 10, 2008", 8 pgs.

"U.S. Appl. No. 11/500,011, Response filed May 12, 2008 to Restriction Requirement mailed Apr. 14, 2008", 8 pgs.

"U.S. Appl. No. 12/323,322, Response filed Feb. 9, 2009 to Notice of Omitted Items mailed Dec. 16, 2008", 4.

"U.S. Appl. No. 12/323,322, Notice of Allowance mailed Jun. 30, 2009", 11 pgs.

"Chinese Application Serial No. 200580028499.6, Office Action Mailed Oct. 10, 2008", 14 pgs.

"PCT Application No. PCT/US2005/022534, International Search Report mailed Nov. 7, 2005", 4 pgs.

"PCT Application No. PCT/US2005/022534, Written Opinion mailed Nov. 7, 2005", 7 pgs.

"U.S. Appl. No. 11/166,363, Notice of Allowance mailed Jul. 25, 2008", NOAR, 4 pgs.

200580028499.6, "Chinese Application Serial No. 200580028499.6, Office Action mailed Apr. 24, 2009", 6 pgs.

Lin, Hung-Yi, et al., "Rib-reinforced micromachined beam and its applications", *Journal of Micromechanics and Microengeering*, 10(1), (2000), 93-99.

Netravali, A., et al., "F04-CRO2 Fibrous Micro-electro-mechanical-system (MEMS)", *National Textile Centre Annual Report*, 2004, (Nov. 2004), 1-4.

Rajic, S., et al., "Novel fabrication and simple hybridization of exotic material MEMS", *Proceedings of the SPIE—The International Society for Optical Engineering*, 3874, (1999), 188-194.

Siebel, E. J, et al., "Optical Fiber Scanning as a Microdisplay Source for a Wearable Low Vision Aid", *SID Symposium Digest of Technical Papers*, 33(1), (May 2002), 4 pgs.

Ting, J-M., et al., "Formation of Nodulated Vapor Grown Carbon Fiber", *Carbon*, 38(14), (2000), 1917-1923.

\* cited by examiner

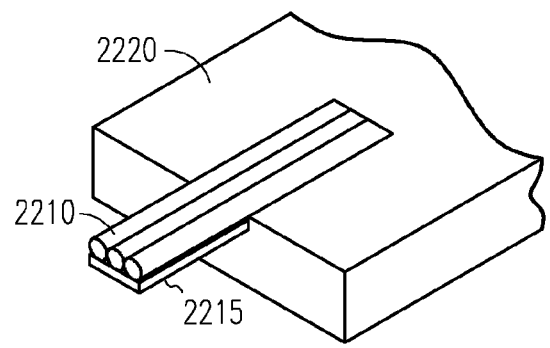
FIG. 22
   
FIG. 23A    FIG. 23B
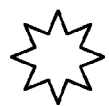      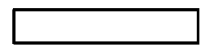
FIG. 23C    FIG. 23D    FIG. 23E

FIBER BASED MEMS

RELATED APPLICATIONS

This application is a continuation of U.S. patent application Ser. No. 12/323,322, filed Nov. 25, 2008, which is a continuation of U.S. patent application Ser. No. 11/166,363, filed Jun. 24, 2005 which is related to U.S. patent application Ser. No. 10/395,008: "Fibrous Micro-Composite Material" filed on Mar. 21, 2003. This application claims priority to U.S. Provisional Application Ser. No. 60/582,405 (entitled FIBERS FOR MICRO-ELECTROMECHANICAL SYSTEMS, filed Jun. 24, 2004) which is incorporated herein by reference. This application also claims priority to U.S. Provisional Application Ser. No. 60/659,736 (entitled MEMS OPTICAL SCANNER USING FIBERS, filed Mar. 8, 2005) which is incorporated herein by reference.

FIELD OF THE INVENTION

The present invention relates to MEMS, and in particular to using fiber structures in MEMS.

BACKGROUND OF THE INVENTION

Present day micro-electro-mechanical systems (MEMS) based actuator devices have fundamental performance issues that severely limit their widespread commercialization. Although MEMS manufacturers have pushed to develop silicon (both polycrystalline and single crystal) and other material-based structures, the resulting systems still lack the needed mechanical properties. A specific example is the case of MEMS based optical scanners and switches (OMEMS). Such devices need to produce large angular deflections (several tens of degrees) and resonant frequencies exceeding tens of kilohertz with lifetime reliability over billions of cycles.

Monolithic materials, such as silicon, metal and ceramic thin films currently used to produce MEMS lack the required combination of high elastic stiffness, high strength, high fatigue lifetime and low density (mass per unit volume) i.e., the basic mechanical flexibility and flaw tolerance necessary for many potential MEMS applications. Polymers are not adequate since they are too flexible and have low strength which limits them to low frequency operation in devices where low forces and/or displacements are required, such as valves and fluidic pumps.

Consequently, moving component MEMS, such as optical scanners, are nearly non-existent commercially today. Most successful applications of MEMS remain based on quasi-static devices such as pressure and acceleration sensors. One moving component MEMS is a digital light processor that is based on bistable positioning of aluminum MEMS mirrors.

The need for advanced capability MEMS devices can be illustrated through a particular application—the MEMS based optical scanner (an OMEMS). Such scanners are envisioned for large area display applications using three-color scanning. Early MEMS optical scanners utilized a torsional silicon micro-mirror produced using wet etching. It was capable of deflecting a beam through a 0.8° angle at a resonance frequency of 16.3 kHz. The majority of OMEMS scanners in development today are still designed using similar thin beams of silicon acting either as torsion bars (around which a silicon mirror element rotates) or as cantilevers (which vibrate to provide the scanning motion). Both of these structure types are efficient, with no moving parts to wear.

General applications are dependent on the resonance frequency, the maximum deflection, and the maximum restoring force—with higher values of each normally desired. These properties are dependent on the size, shape, and mechanical properties of the underlying materials. However, materials used in traditional IC-based MEMS fabrication lack the mechanical characteristics required to allow specific tailoring and optimization for many applications. There is no current way to design simultaneously for high frequency operation, large amplitude deflection, low operating power, robustness, and long-term reliability under cyclic stresses with existing material systems. The basic problem with silicon, and monolithic materials in general, is that while having sufficient elastic stiffness, their strength and fatigue lifetime is too low and density too high. This combination limits the ultimate deflection amplitude and frequency, and increases power requirements to sustain oscillation.

Fundamental limitations exist in the performance of materials currently used for MEMS and micro-mechanical devices. These materials such as Si, $SiO_2$, SiC, metals, $Si_3N_4$ cannot provide large deflections (>100 um) at high speeds (>kHz) necessary for many MEMS actuator applications hampering their widespread commercialization. Most of all, the existing materials do not have the fatigue life necessary to undergo repeated large deformations over the billions of cycles that most actuator MEMS applications require.

BRIEF DESCRIPTION OF THE DRAWINGS

FIGS. 10A, 10B, 10C, 10D, 10E, 10F, 10G, 10H, 101, 10J and 10K are cross section views illustrating a process of forming cantilever MEMS devices according to an example embodiment.

FIG. 22 shows fiber reinforcement on a silicon cantilever according to an example embodiment.

FIGS. 23A, 23B, 23C, 23D and 23E show various cross sections of fibers that may be formed according to an example embodiment.

DETAILED DESCRIPTION OF THE INVENTION

Figure 1:
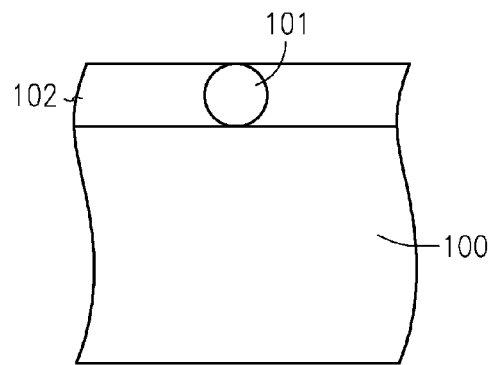
FIG. 1 is a cross section of a single micro-fiber encapsulated in a matrix supported by a substrate according to an example embodiment.

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Fibrous micro-composite materials are formed from micro fibers. The fibrous micro-composite materials are utilized as the basis for a new class of MEMS. In addition to simple fiber composites and microlaminates, fibrous hollow and/or solid braids, can be used in structures where motion and restoring forces result from deflections involving torsion, plate bending and tensioned string or membrane motion. In some embodiments, these materials will enable simultaneous high operating frequencies, large amplitude displacements and or rotations, high reliability under cyclical stresses.

In one embodiment, fibrous elements are formed using high strength, micron and smaller scale fibers, such as carbon/graphite fibers, carbon nanotubes, fibrous single or multi-ply graphene sheets, or other materials having similar structural configurations.

In a further embodiment, cantilever beams are fabricated from single fibers, single/multilayer aligned arrays of fibers, or single/multilayer fabrics. Such fabrics exploit the special strong anisotropic mechanical properties and high strength along the fiber axis of the fibers yielding structures with high bending stiffness, and low mass, yet large bending curvatures. Single fiber cantilevers provide high operating frequencies for potential applications such as RF sensors, at the expense of lateral stiffness and strength. Multifiber cantilevers benefit from statistical improvements and stability based on averaging properties and load sharing in the event of fiber damage or intrinsic faults. The natural extension is to more complex fabrics with optimized properties in multiple directions or multiple modes of deflection. Such cantilevers can also be produced from braided torsion elements, producing both lateral and angular displacements.

In still further embodiments, plates (two dimensional minimally deformable objects) are fabricated from single/multilayer aligned arrays of fibers, or single/multilayer fabrics. This configuration optimizes the stiffness to mass ratio together with the strength required for high frequency motion, such as required for a mirror element in a scanner MEMS. Relative stiffness in the two axes may be tailored to balance driving forces through fiber density, type, orientation, positioning and/or weave characteristics.

In yet a still further embodiment, hollow or tubular microbraids made from micron-scale fibers are used as torsional deflecting elements in devices to provide high performance MEMS actuators. Braids permit the transformation of stresses within the torsion bar from shear (resulting from twisting motion) to tensile/compressive stresses (with some bending) along the orthogonal fiber axes at plus/minus 45 degrees. In effect, the braid allows the fibers to act in a mode in which their behavior is exceptional. Torsion elements at the sub 100 micron scale (comparable to MEMS device dimensions) can be fabricated from fibers 5 microns in diameter; smaller fibers produce commensurately smaller braids.

Additionally by manipulating the dimensions of the braid, the braiding angle, the types of fibers used to construct the braid, and the size and number of fibers in the braid, torsional elements with tailored strength, elastic stiffness, density, and other mechanical properties can be produced. This enhancement and tailorability of the strength and elastic stiffness of the torsional element results in MEMS devices capable of producing large angular deflections and forces at high frequencies and speeds without failure.

Fibrous micro-composite materials are formed from micro fibers. A new class of MEMS (Micro-Electro-Mechanical-System) devices may be based on the fibrous micro-composite materials. Such fibrous micro-composite MEMS promise to meet the requirements of high performance applications where large deflections and forces, coupled with high operating frequency and reliability under cyclical stresses are required, and which cannot be met by silicon and other currently used MEMS materials.

MEMS devices are constructed from a single or multi-fiber structures with approximately 10 micron to sub-micron fibers, fiber braids, or fabrics. The fiber may be all of the same type (homogeneous) or of different types fabricated side-by-side or together (heterogeneous). In one embodiment, the majority of the fibers are used to control the mechanical properties of the MEMS device.

A minority of fibers may be incorporated to provide other electrical, mechanical, biological, or optical functionality. These may then be used, for example, to electro-mechanically actuate the MEMS device or serve as associated control circuitry and sensing elements within the structures.

The entire micro-composite is impregnated with an appropriate binder (epoxy, glass, organic binders, etc.) to constrain the fibers and provide fiber-to-fiber load transfer. The binder is referred to as a matrix. In one embodiment, the matrix is chemically compatible with the selected fibers, processing techniques, and the environment in which the MEMS device will operate.

MEMS are inherently micron-scale devices. Typical devices require a footprint of at most a few mm on an edge, and have thicknesses on the order of a few tens or hundreds of microns. High strength fibers are already commercially available in low to sub-micron diameters. These fibers can be readily oriented in any desired manner, and/or woven into fabrics that remain within the 100-200 μm range.

In FIG. 1, a suitable substrate 100, such as a silicon wafer is used to support a fiber 101 which is mounted in a suitable matrix 102. The single fiber 101 is placed on the wafer 100 surface. The matrix 102 encapsulates the fiber on the wafer surface. It is formed by spin coating or any other suitable method such as one that is compatible with processes common to MEMS and semiconductor fabrication. The spin coating forms a film encapsulating the fiber on the wafer surface that is then cured thermally, or by using light or other radiation to form a composite film.

Figure 2:
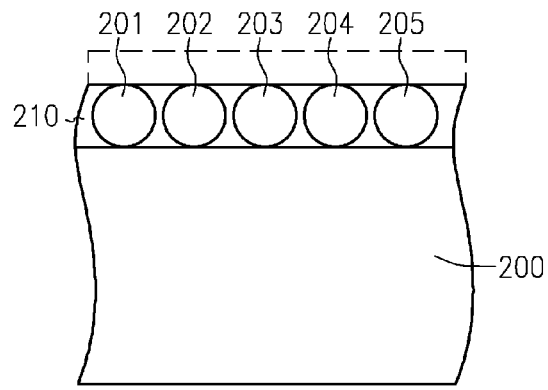
FIG. 2 is a cross section of a collection of parallel aligned fibers encapsulated in a matrix supported by a substrate according to an example embodiment.

In FIG. 2, a substrate 200 is shown supporting multiple fibers, 201, 202, 203, 204 and 205 laid out substantially parallel and adjacent to each other. A matrix 210 encapsulates the fibers to provide a single layer array of fibers.

Carbon/graphite fibers are the strongest material currently available for forming fibrous based fabrics and braids, and are extremely fatigue resistant in tension and compression even at high stress levels. Fiber material tensile strengths in excess of 20 GPa have been seen in bending loop tests. Additionally, fiber strength is size dependent, increasing when fiber lengths decrease to sub millimeter levels or when fiber diameter continually decreases below 10 microns. Micro-fibers also vary between 2 cm to sub mm in length in one embodiment. Longer fibers may also be used.

Graphite fiber which has a mean tensile strength of 5 GPa at a 2 cm length scale can have a tensile strength of 10 GPa at sub mm length scales and this can be "guaranteed" by selection through proof-testing. Thus, graphite fibers can be selected to have failure strains consistently above 5%. This is especially possible with the latest generation of graphite fibers reportedly with strengths at several cm gage lengths of 8 GPa so this should scale to 15 GPa at sub mm dimensions.

Graphite fibers exhibit the highest flaw tolerance of any material. The stacked and folded graphene "sheet" nature of graphite fibers isolates the interior core from flaws on the outer surface of the fibers; fibers shed outer sheaths without failure of the entire fiber. Fibers also tend to increase their strength as the size is reduced—for carbon fibers, the highest failure stresses (>15 GPa) are observed in 4-5 μm fibers. In a further embodiment, it is desired that the fibers are comprised of multiple parallel carbon nanotubes. Such fibers may allow the use of nanotubes in fiber bundles on the micrometer to millimeter scale.

To ensure high strength of fibers within the braid, 2-5 µm Torayca T1000 carbon fibers which have stated strengths of approximately 1.2 Msi (~8.3 GPa) at 2 to 3 cm gage lengths are used in one embodiment. Only carbon fibers that have been proof tested at over 5% strains are used to make braids in one embodiment. Of course, other fibers may also be used with varying results.

Figure 3:
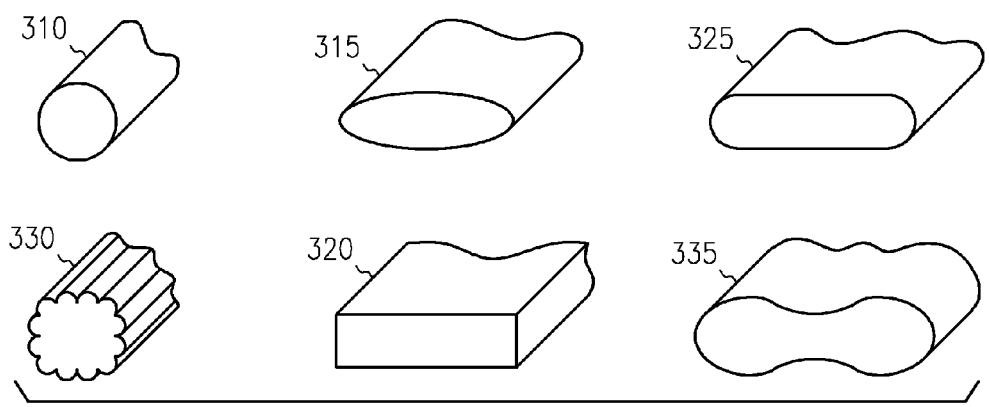
FIG. 3 is a perspective view of multiple variations of micro-fiber cross sections according to an example embodiment.

Multiple different cross sections of fibers are shown in FIG. 3. A typical round cross section fiber is indicated at 310. An elliptical fiber cross section is shown at 315. A rectangular fiber cross section is shown at 320. At 325, a fiber cross section that is fairly rectangular, but with rounded edges is shown. A grooved fiber cross section is shown at 330, and a dogbone type cross section fiber is shown at 335. Each of these fibers may be used to create fibrous micro-composite structures.

The matrix choice is important in some embodiments to achieving the desired mechanical properties of the micro-composite. Further embodiments do not include the use of a matrix. In one embodiment, the matrix is durable enough to survive a large number of deformation cycles, wherein it reliably transfers the load across filaments in the composite. It also adheres strongly to outer packaging structures of the device, and serves as an efficient load transfer medium at the fiber terminations. It may also be compatible with deposition, etching etc., techniques and processes used in making MEMS devices.

Electro-active polymers may be utilized for the matrix. Piezoelectric polymers may also be used as part of the matrix. Blends of different materials may be used as matrices to obtain tailored electro-mechanical properties.

Many different methods to enhance fiber/matrix bonding may be utilized. For example, matrix load-transfer characteristics may be modified by adjusting the sizing applied to different fibers. Requirements in the mirror, frame, and flexure elements of MEMS scanners are different and significant alterations in surface treatments may be advantageous.

In addition to fibers that act to enhance the mechanical properties of the MEMS, fibers of electro-chemically/mechanically/optically/biologically functional materials may also be incorporated into said MEMS structures and devices to act as actuating and or sensing elements. For example, magnetic actuation, generates at low power, the high forces required for high speed and deflection. The strength of the interaction depends on the total volume of magnetic material that can be incorporated into the MEMS structure. Traditionally, these are electroplated onto structures of the MEMS device. In the case of fabrics, fibers of ferromagnetic material, are woven directly into the fabric, integrating the actuation directly into the overall fabric. Additionally, incorporating other types of fibers into the weave and creating a hybrid fibrous structure can also create MEMS devices with integrated sensor elements.

Figure 4:
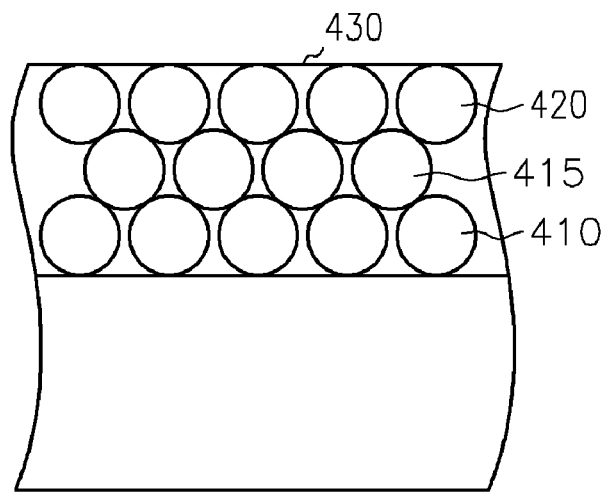
FIG. 4 is a cross section view of a collection of multiple layers of parallel aligned fibers encapsulated in a matrix supported by a substrate according to an example embodiment.

The MEMS structures can also be made by layering arrays of oriented fibers 410, 415 and 420 in FIG. 4 in different configurations. Such arrays are impregnated with an appropriate matrix 430 and converted into a stiff composite. Or, by weaving filaments into a fabric. A fabric base provides advantages over laminated unidirectional fiber arrays since the fiber interlacing points provide additional stiffness and better transverse properties that help maintain mirror flatness during operation. Alignment of the fabric to specific elements or structures within the MEMS is also simpler. The weave of the fabric (plain, twill, satin, double, etc.) may be selected based on the desired stiffness of the mirror element. In this composite, the matrix serves primarily as load transfer between the fibers at low shear stresses and strains; though in the braid it will also serve to maintain mechanical stability. A wide range of matrices may be used and selected to achieve the desired stiffness. This fabric-based (fibrous) composite, bonded to conventional silicon substrates, forms a base for the optical scanner, and potentially for a wide variety of other MEMS structures.

The fibers, matrix, weave and braid characteristic can each be independently optimized to achieve specific requirements. The fiber type, alignment/orientation, weave, and fiber volume fraction determine the tensile and fracture strengths of micro-composites, as well as their elastic stiffness. The stiffness of torsion elements formed from the micro-composites is dominated by the fiber axial stiffness in combination with curvatures associated with the braid characteristics and to a much lesser extent the matrix modulus and the adhesion between the fibers in the braid and the matrix. The fibers in the braids and fabric should be well adhered. Individual matrix areas may also be modified separately, using localized cross-linking techniques, to achieve optimal mechanical properties within a MEMS device such as a scanner.

In this composite, the matrix serves primarily as load transfer between the fibers. A wide range of matrix material can be selected to achieve the desired behavior from the fibrous composite MEMS. This fabric-based (fibrous) composite, bonded to conventional silicon substrates, forms a base for the optical scanner, and potentially for a wide variety of other MEMS structures.

Figure 5:
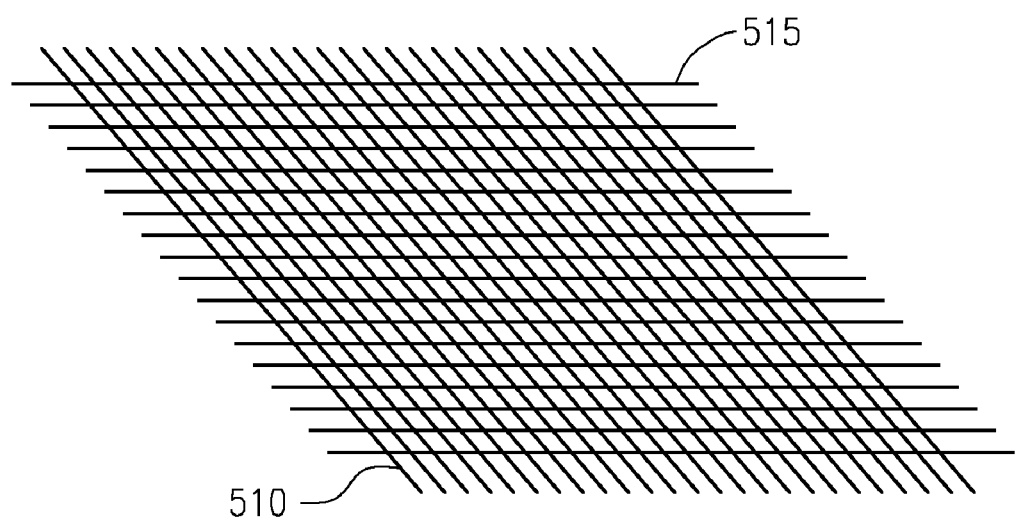
FIG. 5 is a perspective schematic view of layers of bidirectional micro-fibers according to an example embodiment.

In FIG. 5, adjacent layers of fibers are shown in a non-weaved pattern. A first layer 510 is comprised of a group of parallel adjacent fibers arranged in one plane, with an adjacent second layer 515 of a group of parallel adjacent fibers arranged in a plane parallel to the first layer 510. In one embodiment, the fibers in the two layers are substantially orthogonal to each other. The actual angle formed between the fibers of the two layers may be significantly varied from orthogonal to parallel as desired. Still further layers may be added with the fibers arranged in the same manner or different manners, such as various weave patterns.

Figure 6:
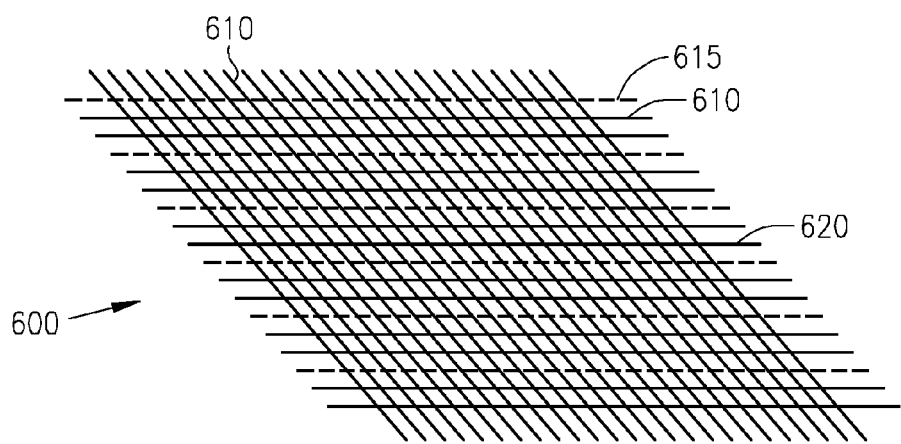
FIG. 6 is a perspective schematic view of a micro-fiber weaved fabric having a braid therein according to an example embodiment.

A variety of weaving and braiding patterns are possible to obtain the necessary mechanical properties for the mirror and frame elements. A plain weave as shown in FIG. 6 has the advantage of the highest interlacing density, yielding a stiff composite for the mirror element and frame. In FIG. 6, the woven fabric itself is a micro-composite constructed from several, micron to sub-micron scale, fibers, as shown at 600. The majority of the fibers (indicated by solid lines 610) are chosen to control the stiffness and strength (i.e. graphite, glass, nicalon) of the fabric, while some, such as a minor fraction of the fibers (indicated by dotted line 615) are ferromagnetic (i.e. nickel or Permalloy) to couple to a solenoid for actuation. Torsion bars may also be formed of a fiber braid 220 and integrated into the weave.

A satin weave has the least interlacing density, but permits a much greater fiber/yarn density in the fabric, increasing the fiber content in the final composite. Twill weave interlacing density lies between the two and will depend on the type of the twill weave. Different weave patterns may be tested to determine those providing optimal stiffness with relatively simple fabrication and processing.

Figure 7:
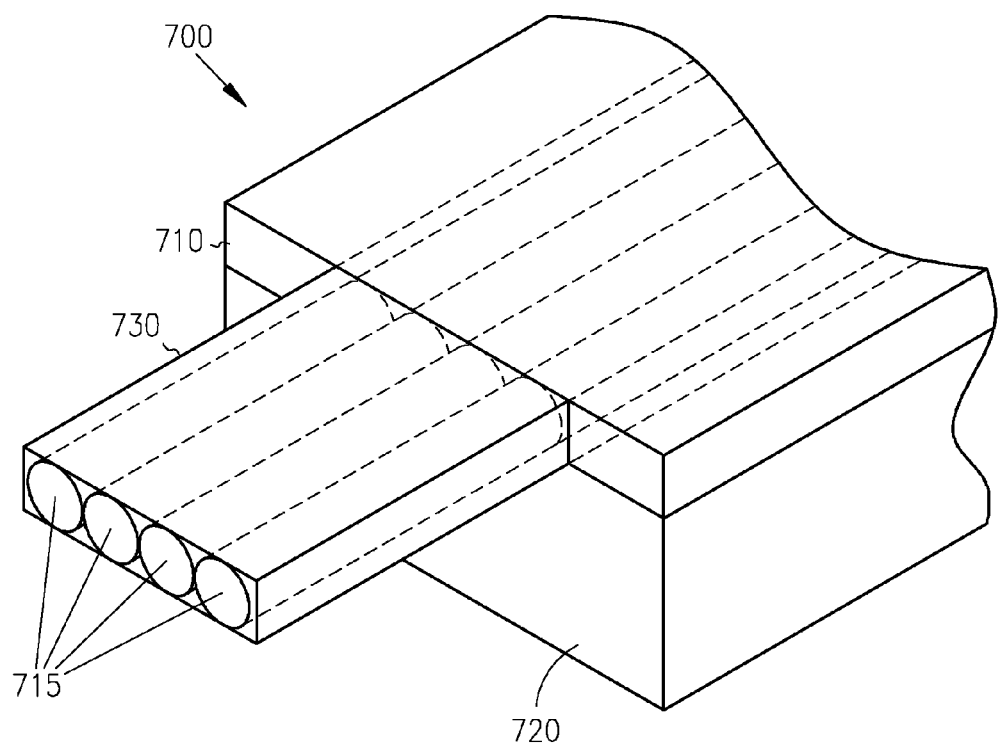
FIG. 7 is a perspective view of a multi micro-fiber cantilever supported by a substrate according to an example embodiment.

One example MEMS device utilizing such fibrous materials of the present invention is a simple oscillating multiple fiber cantilever, such as that shown in FIG. 7 at 700. In this embodiment, a matrix 710 encapsulating multiple fibers 715 is attached to a substrate 720. The fibers 715 and portion of the matrix 710 extends beyond the substrate 720 as indicated at 730. The length of the extension and properties of the fiber and matrix determine the oscillatory characteristics of the cantilever 700. Further layers may be added, such as Al or Au may formed on top of the matrix.

Figure 8:
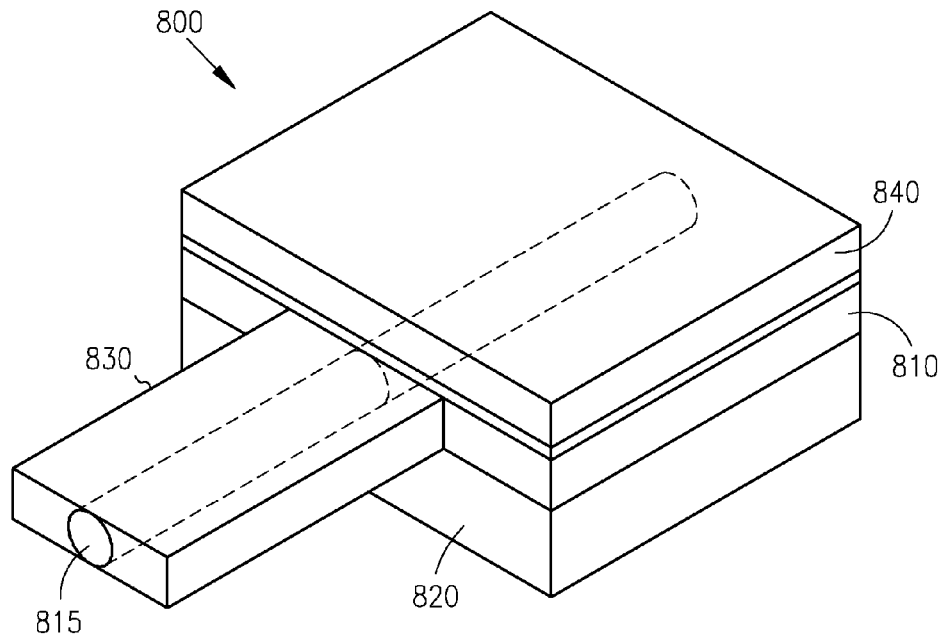
FIG. 8 is a perspective view of a single micro-fiber cantilever supported by a substrate according to an example embodiment.

One example MEMS device utilizing such fibrous materials of the present invention is a simple oscillating single fiber cantilever, such as that shown in FIG. 8 at 800. In this embodiment, a matrix 810 encapsulating a single fiber 815 is attached to a substrate 820. The fiber 815 and portion of the matrix 810 extends beyond the substrate 820 as indicated at 830. The length of the extension and properties of the fiber and matrix determine the oscillatory characteristics of the cantilever 800. In a further embodiment, a further layer 840 is formed on top of the matrix, at least in a footprint corresponding to the substrate 820. Such further material comprises Au or Al in one embodiment, and it may be coupled as by gluing, or formed in many different ways known in the semiconductor processing art.

Figure 9:
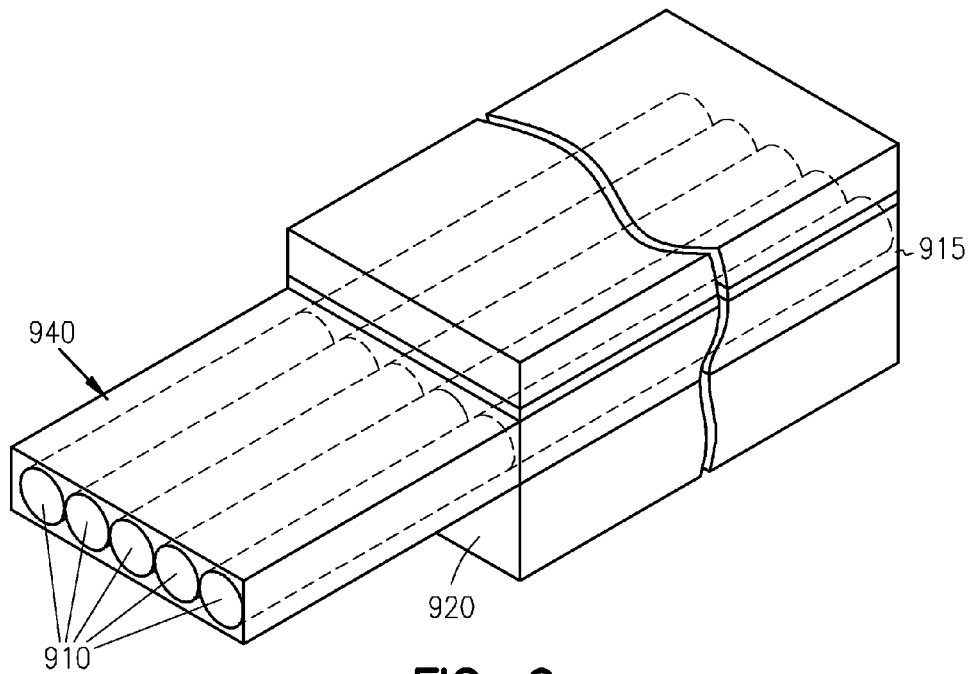
FIG. 9 is a perspective view of an alternative multi micro-fiber cantilever supported by a substrate according to an example embodiment.

In an example of a MEMS device having a multiple fiber cantilever 900 in FIG. 9, several fibers are encapsulated in a matrix 915. The matrix 915 is coupled to a substrate 920. The fibers and matrix extend from an edge of the substrate 920 as indicated at 940. The fibers 910 and matrix 915 may be cut or trimmed as desired to obtain desired characteristics.

An example method for fabricating the cantilever MEMS structure of FIG. 9 is shown in FIGS. 10A through 10L. In one embodiment single graphite fibers are extracted from bundles and placed side-by-side to form a fiber array 1001 in FIG. 10A across the surface of an oxidized 1002 silicon wafer 1003. The ends of the fiber arrays are glued to keep the fibers aligned with the substrate and with each other. The wafer with the unidirectionally aligned fiber arrays is then coated with a suitable matrix 1004 such as polyimide, by spin coating the liquid matrix material onto the substrate wafer 1003 to encapsulate the fiber array 1001. Once a desired thickness of the matrix is achieved on the substrate and the fibers are encapsulated, the matrix is cured in a furnace at 350-400 degrees C.

Figure 10A:
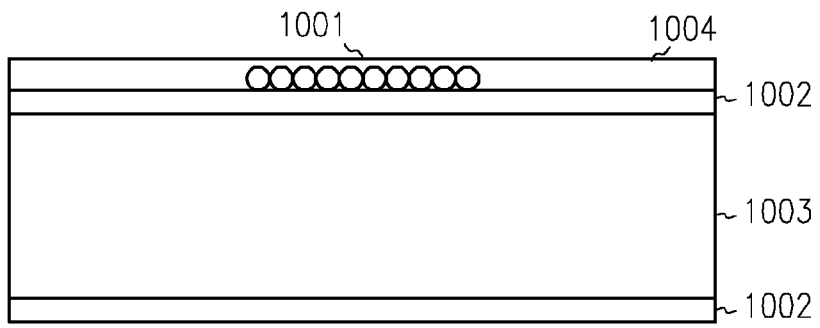
Figure 10B:
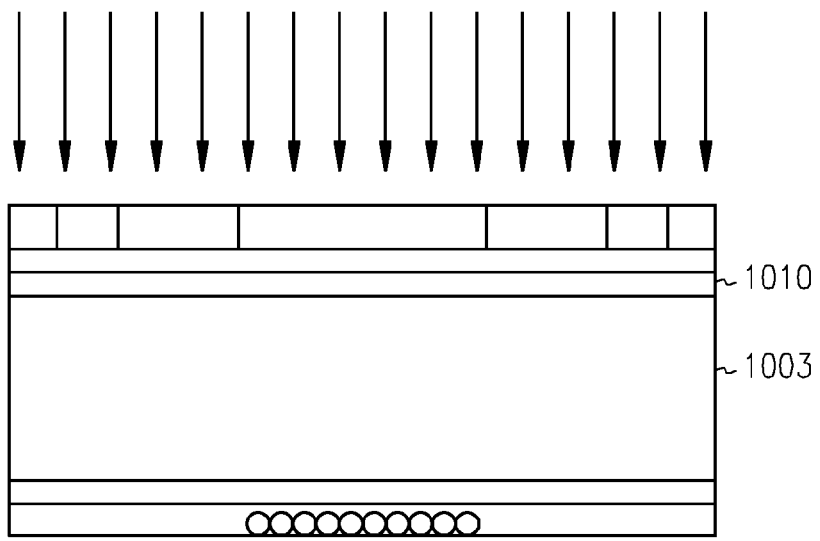
Figure 10C:
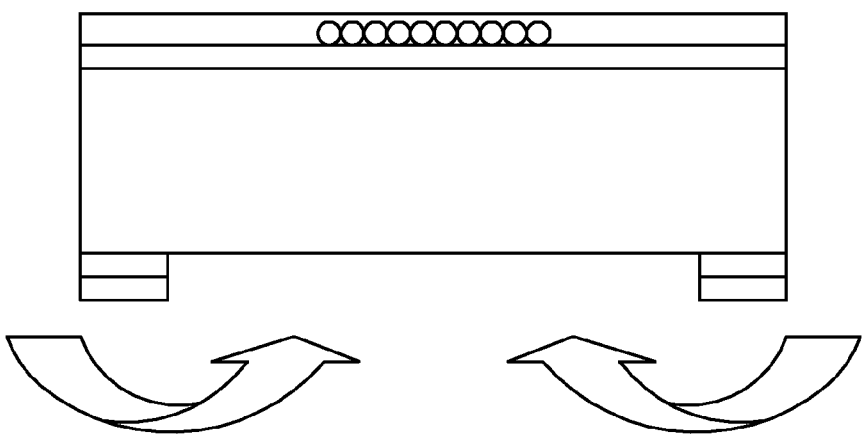
Figure 10D:
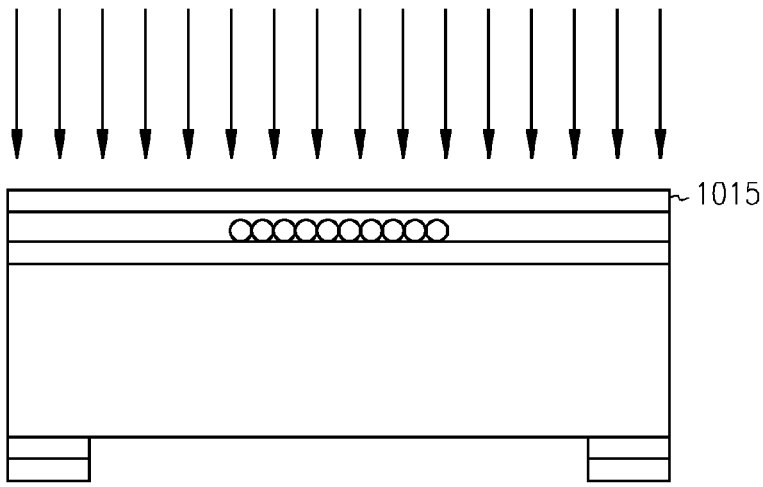
Figure 10E:
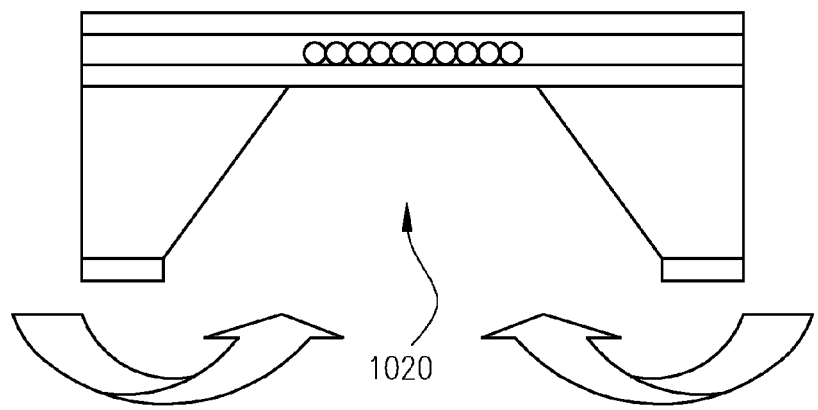
Figure 10F:
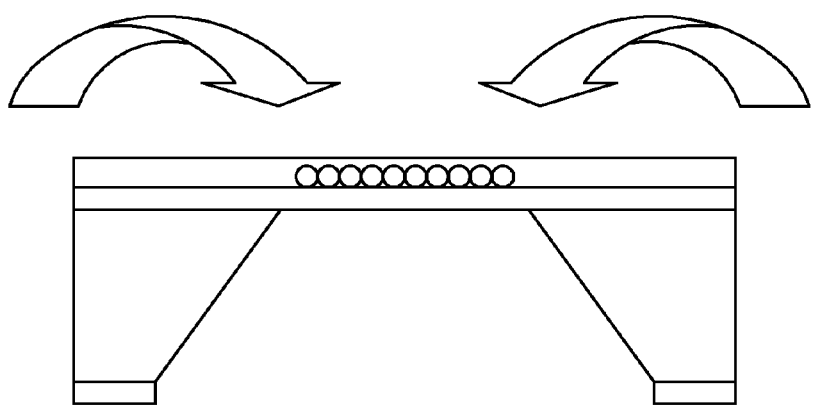

A back surface 1010 of the substrate wafer (i.e., the surface without any fiber encapsulated in polyimide) as shown in FIG. 10B is then masked for a trench etch. The mask is selectively exposed 1012 such as by UV light, and etched using wet etch chemistries common in CMOS processing. Specifically HF as seen in FIG. 10C is used to remove the oxide. Tungsten 1015 is blanket deposited to about 1000 Angstrom to protect the polyimide on the front of the substrate in FIG. 10D. KOH is used to produce trenches 1020 over which cantilever tips can freely oscillate as seen in FIG. 10E. The tungsten 1015 is then removed such as by using HF in FIG. 10F.

Figure 10G:
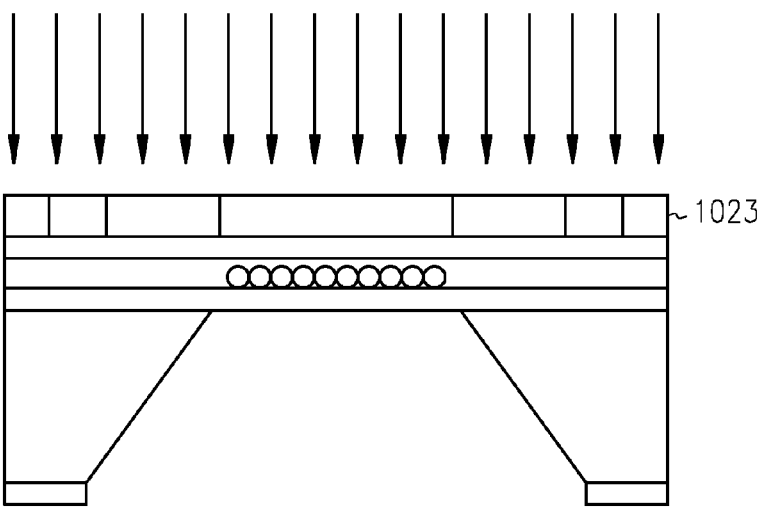
Figure 10H:
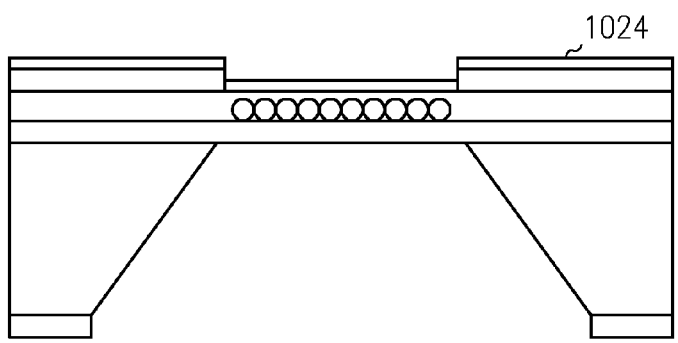
Figure 10I:
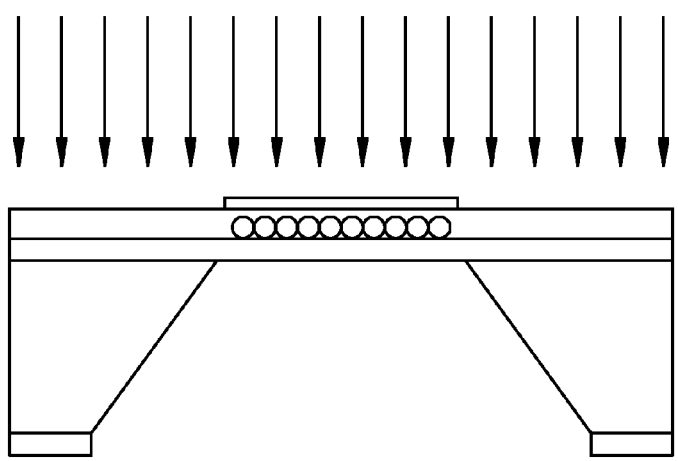
Figure 10J:
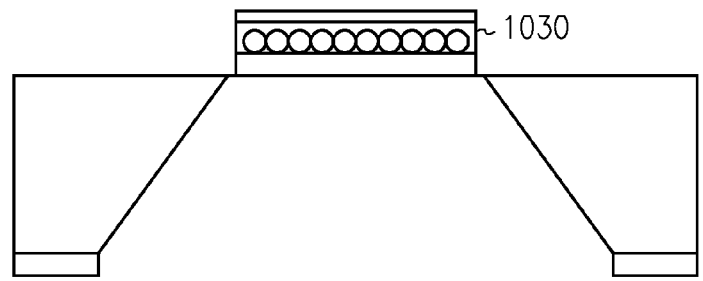
Figure 10K:
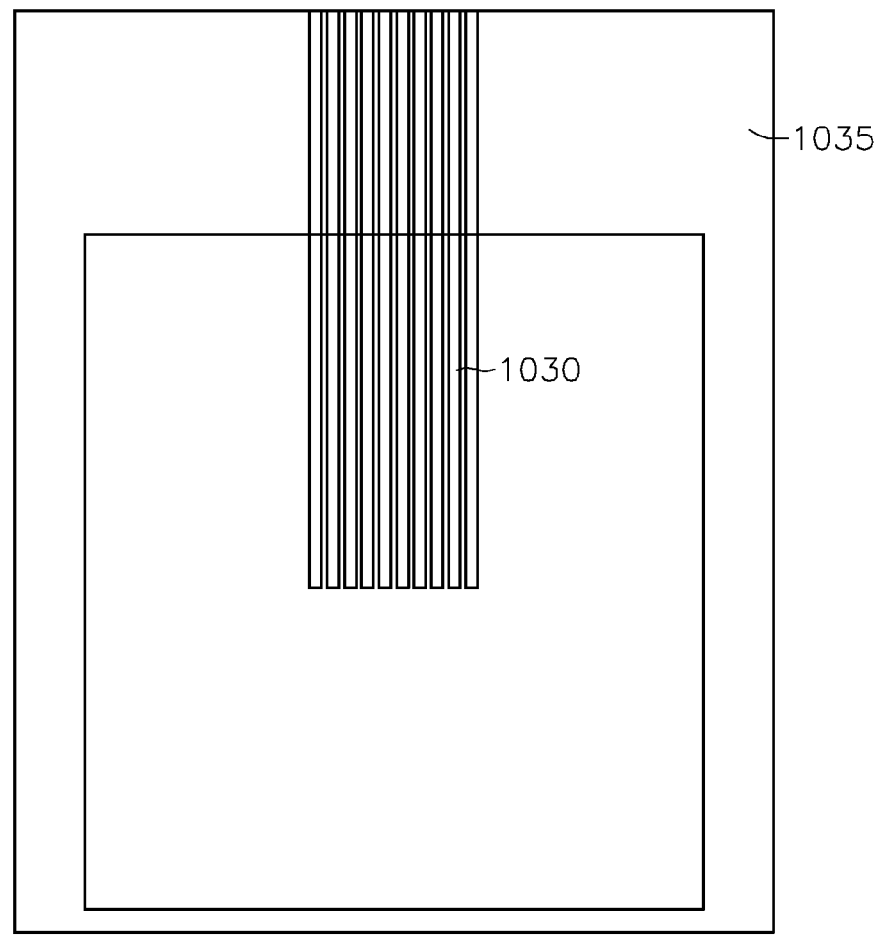

In FIG. 10G, a second mask 1023 is used to pattern cantilevers. A blanket of Al 1024 is deposited on the wafer and lifted off in areas other than the cantilevers. The wafer containing the polyimide encapsulated fibers is then exposed and etched in a $CF_4/O_2$ plasma as shown in FIG. 10I using the Al as a self-aligned mask to remove polymer and oxide. This process produces rectangular beams of polyimide encapsulated fibers 1030 that cantilever over the edges of the trenches etched into the substrate wafer from the back side as shown in side and top views of FIGS. 10J and 10K respectively. A further polyimide film 1035 may be spun on the wafer.

Figure 11:
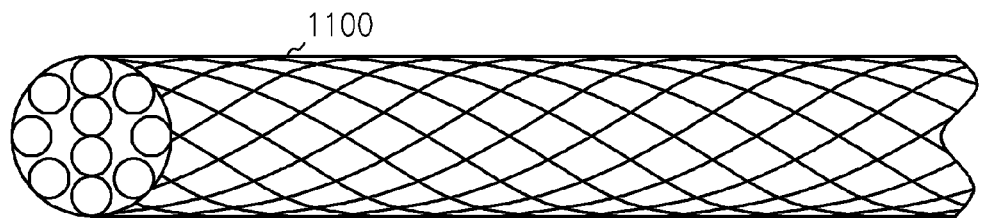
FIG. 11 is a perspective view of a solid micro-fiber braid according to an example embodiment.
Figure 12:
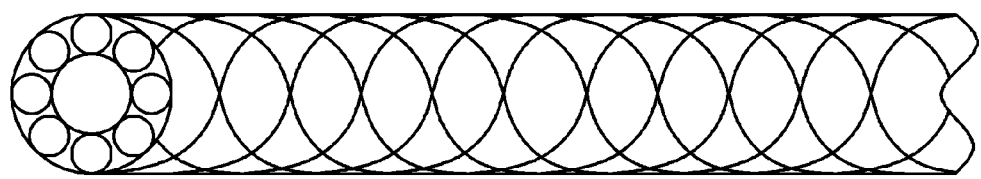
FIG. 12 is a perspective view of a hollow micro-fiber braid according to an example embodiment.
Figure 13:
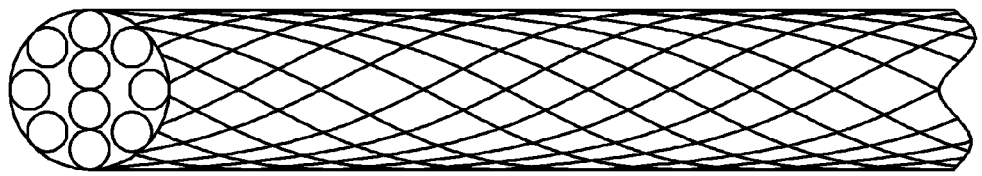
FIG. 13 is a perspective view of a solid low angle micro-fiber braid according to an example embodiment.

Several different braid structures may also be produced from the fibers as shown in FIGS. 11, 12 and 13. Braiding patterns are illustrated as single lines along the length of the braids to better illustrate such patterns. The ends of the braids illustrate a cross section of the fibers used in the braids. A solid braid 1100 comprises multiple fibers braided together in a solid structure. Each fiber is wound on a bobbin, and the process for making the braid is very similar to that used in normal textile braiding. A hollow braid 1200 comprises a ring of fibers braided with a hollow core. No bobbins are positioned in the middle, resulting in the ring of adjacent fibers with no fibers in the middle of the structure. Finally, a low angle braid 1300 is formed by adjusting the tension on the braid while the braiding process occurs.

Figure 14:
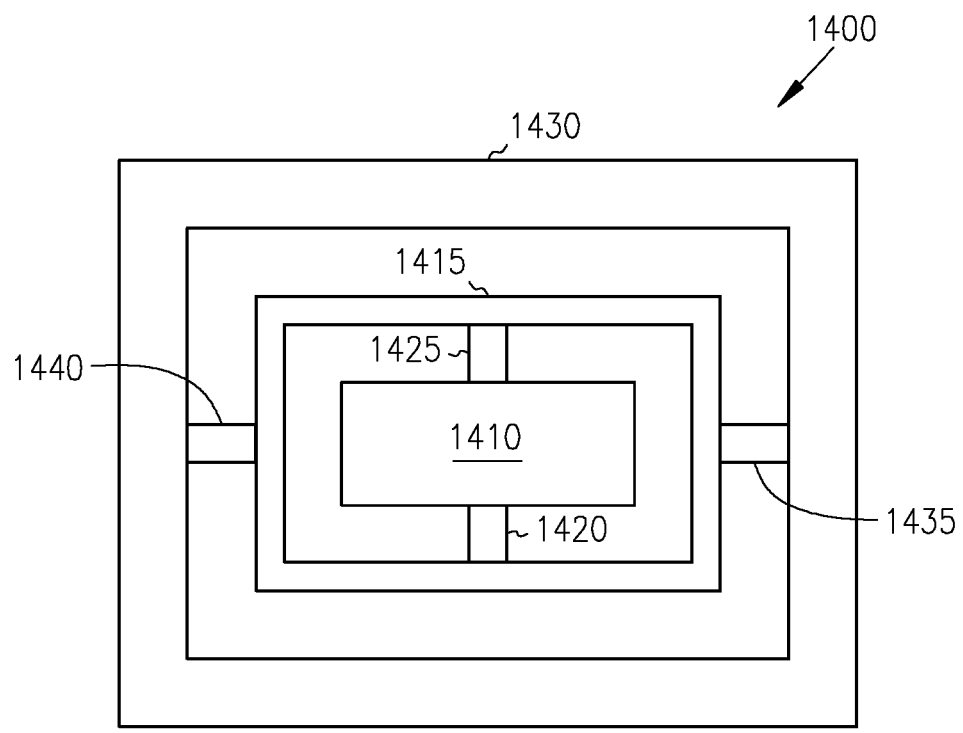
FIG. 14 is a schematic view of a scanner having nested frames and a mirror supported by orthogonal pairs of fiber braids according to an example embodiment.

Another example MEMS device utilizing such fibrous materials of the present invention is a torsional opto-mechanical scanner, such as that shown in FIG. 14 at 1400. Scanner 1400 comprises a mirror 1410 coupled to an inner frame 1415 by a pair of coaxial opposed inner torsional elements 1420 and 1425. The inner frame 1415 in turn is coupled to an outer frame 1430 by a pair of coaxial opposed outer torsional elements 1435 and 1440 which are orthogonal to the inner torsional elements. The axes of both sets of torsional elements are co-planar in one embodiment. The arrangement of frames and torsional elements allow the mirror 1410 to move about both axes of the torsional elements.

In one embodiment, the inner and outer frames 1415 and 1430 are formed using biaxial arrays of micro-fibers, the torsional elements are formed using braided fibers, and the central mirror 1410 is formed by as a woven fiber sheet such as that shown in FIG. 6. The torsion braids are hollow, and may have fibers in their cores for other purposes in various embodiments. The braids are coupled to the frames by one of many different mechanisms. In one embodiment, they are interlaced with the frames. Interlacing points between fibers in the structure provide mechanical stability. In further embodiment, the torsion elements may also be single fibers, or multiple fibers, with or without a matrix.

Scanner 1400 is a staggered frame configuration where the central mirror 1410 is a plate of any desired symmetric shape, suspended by torsion elements at two opposite ends from a rectangular frame. The mirror may be coated with aluminum, chrome, copper, silver or gold in varying embodiments. In further embodiments, the mirror may be formed of thin reflective metallic films or other reflective material such as polished silicon, reflective metal thin films (Au, Ti etc.) or dichroic films. The frame in turn is also suspended from a substrate by torsion elements on opposite sides, however these elements lie orthogonal but in the same plane to those suspending the mirror element. Angular deformation of the torsion elements along their axes produces corresponding rotation of the central mirror plate along two orthogonal but coplanar axes.

In one embodiment, carbon/graphite fiber micro-braids serve as the torsional elements. Unlike MEMS scanners based on silicon and related materials, the torsional elements use graphite fibers braided or double-coiled into helical structures. Such structures transform the stresses within the torsional elements from shear into tension or compression along individual fibers. Since such fibers are typically an order of magnitude stronger under tensile or compressive stresses as compared to shear stresses, these torsional elements can be made significantly stronger, lighter, and with tailorable stiffness, than any currently used monolithic material. Additionally, properties of the torsion element can be also tailored through the dimensions of the braid, and the braiding angle, the types of fibers used to construct the braid. These enhancements and tailorability of the strength, stiffness and density result in MEMS scanner devices capable of undergoing much larger angular deflections at very high resonance frequencies without failure for an extended number of cycles. This results in scanners that can be adapted or tailored to meet specific scanning or optical switching applications.

In addition to the use of micro-braids as the torsional elements, the rest of the scanner device i.e., the frames 1415 and 1430 and mirror plate 1410 may also be composed of arrays of fibers, either as aligned arrays or fabrics. A fabric base is used in one embodiment as opposed to random or aligned fiber arrays since fiber interlacing points in a fabric make delamination difficult, resulting in better mechanical properties. Additionally, the micro-braids can be interlaced into fabrics easily facilitating fabrication and construction of the device.

Alignment of the fibers and braids within specific MEMS structures is also easier with a fabric. In addition to the micro-braids in the torsional elements, the woven fabric serves to enhance the mechanical properties of those structures in devices, such as the central mirror plate and surrounding frame element that face significant deformation due to inertial forces resulting from high frequency resonant operation. Deformation of the central mirror element results in inconsistent optical scans, and deformation of the frame element in addition to the mirror plate can cause the MEMS scanner to oscillate in modes other than the preferred mode of operation. A fabric base stiffens these elements to minimize deformation during dynamic operation due to inertial effects, while keeping the mass of these structures at a minimum. Simply altering the weave, fiber types, and amount and type of matrix impregnation in a fabric creates devices with different properties in different structures.

Given the above properties, single fine diameter fibers making up the individual helices in the braid are capable of consistently undergoing bend radii of as little as 10 times their own diameters. Note that tensile stress level in the fiber walls is inversely proportional to bend radius. In fabricating the torsional elements, the initial fiber configurations will have local radii several times larger than they are ultimately capable of, which means that the bending stresses will be far below the threshold for their failure. This allows the creation of dynamic/moving MEMS devices that use torsional deflection (twisting motions) to produce movement with exceptional torsional performance (by several times) compared to what is possible using existing MEMS materials.

In one embodiment torsional elements, are only a single braid consisting of only a few tens of fibers. In other embodiments, multiple layer braids may be used.

The torsional strength and stiffness of tubular braids is affected by the helix angle (i.e., the angle at which individual coils are wrapped around to form a braid), and crimp angle (i.e., the angle formed at fiber cross-over points.) Additionally other factors such as the number and diameter of the fibers making up the braid, the number of cross over points formed by the fibers, spacing between individual coils, and braid diameter and length, along with the amount and type of impregnation in the braid also affect the braid's strength and stiffness in tension.

Large diameter (100 µm) braids made with fine diameter (2-6 µm) fibers coiled at low helix angles, and with few cross over points between fibers, and modest spacing between the coils, results in braids in which the fibers are initially stressed to a fraction of their capabilities—that is bend radii of about 4 to 5 times the fiber diameter. For example for a 100 µm diameter ($R_o$) braid made of 5 µm diameter fibers coiled at a helix angle ($\alpha_o$) of 45° the curvature of the fiber in the unstrained braid is given by:

$$k = \frac{\sin^2\alpha_0}{R_0} = \frac{(1.414)^2}{100\ \mu m} = \frac{1}{50}$$

In further embodiments, anchoring is performed by splaying the fibers (beyond the flexure region) into a broad fan, which are then embedded into the mirror and frame structures. By expanding the braid in these regions, the anchoring is increased by a factor essentially equal to the number of fibers in the fan. This solution may complicate the fabrication of devices in a microprocessing flow, but can be achieved for at least small numbers of elements.

The majority of the fibers in the scanner 1400 (indicated by solid lines 610) in FIG. 6 are chosen to control the stiffness and strength of the fabric, while some, such as a minor fraction of the fibers (indicated by dotted line 615) are electromechanically functional for actuation and or sensing. For example they may be ferromagnetic nickel or permalloy fibers that couple to a solenoid and cause the entire element to move due to the magnetic interaction. For each scanner 1400, the weave incorporates a single small diameter graphite fiber braid 620 serving as the torsion bars.

Figure 15:
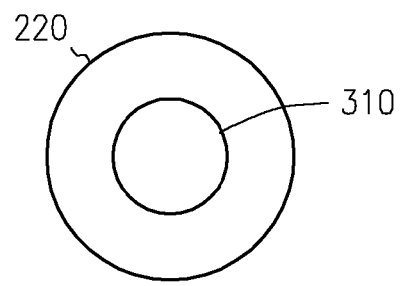
FIG. 15 is a cross section of a braid having a piezoelectric core according to an example embodiment.

In the embodiment where magnetic actuation is used to oscillate the scanner device, the density of permalloy fibers incorporated within the structures is directly coupled to the strength of the solenoid actuators. The strength of the interaction depends on the total volume of magnetic material that can be incorporated into the MEMS structure. Traditionally, these are electroplated onto structures of the MEMS device. In the case of fabrics, magnetically functional fibers 615, are incorporated with the oriented structural fibers or woven directly into the fabric, integrating the actuation directly into the overall fabric or fiber array. Additionally, other types of fibers 615 can also be incorporated into MEMS elements creating a hybrid fibrous structure with some fibers acting as integrated sensor elements. Sensing can be particularly critical in optical switching applications. For example, the torsional braid 620 can be constructed with a piezoelectric core 1510 as seen in FIG. 15. or by incorporating one or more fibers with piezoelectric properties in the braid. Braid 620 is then used to actively sense the angular deflection of the mirror.

Fabrication methods for said torsional scanners utilizes techniques from semiconductor manufacturing and existing MEMS processing and may be similar to that described earlier.

One fabrication process for said fibrous MEMS devices and scanners involves aligning fiber arrays or fabrics onto the surface of an oxidized silicon wafer and impregnating the fibers with a suitable matrix material. The matrix material may be selectively cured in certain areas to provide varying degrees of stiffness in different parts of the scanner devices. For example laser energy may be used to selectively cure the structure making up the mirror and torsional elements to a greater extent to enhance their stiffness.

Localized curing of the matrix allows the tailoring of stiffness and strength. In the scanner, the mirror element must be extremely stiff to avoid dynamic deformation during scanning. However, the torsional beams must only be stiff enough for the high frequency operation—any additional stiffness increases the power requirements. To address these disparate requirements, the matrix is selectively cured in different parts of the scanner. In one embodiment, both a pulsed 1064 nm Nd:YAG laser and a pulsed 308 nm XeCl excimer laser are used to selectively cure the mirror element and supporting structures. The cure is adjusted for the torsional elements. A pulsed laser (30 ns) will thermally affect only the irradiated area; heat diffusion is almost purely one-dimensional in this time regime. Fluences of 100 mJ/cm$^2$ are adequate with 5-10 pulses per area. Under these conditions, a conventional excimer laser (50 W) can treat a 200 mm wafer area in well under a minute. In this way, a scanner device is produced where the mirror element has very high stiffness (modulus>150 GPa) while the torsion bars are elastic to undergo large shear deformations, but sufficiently stiff to resonate at high frequencies.

Figure 16:
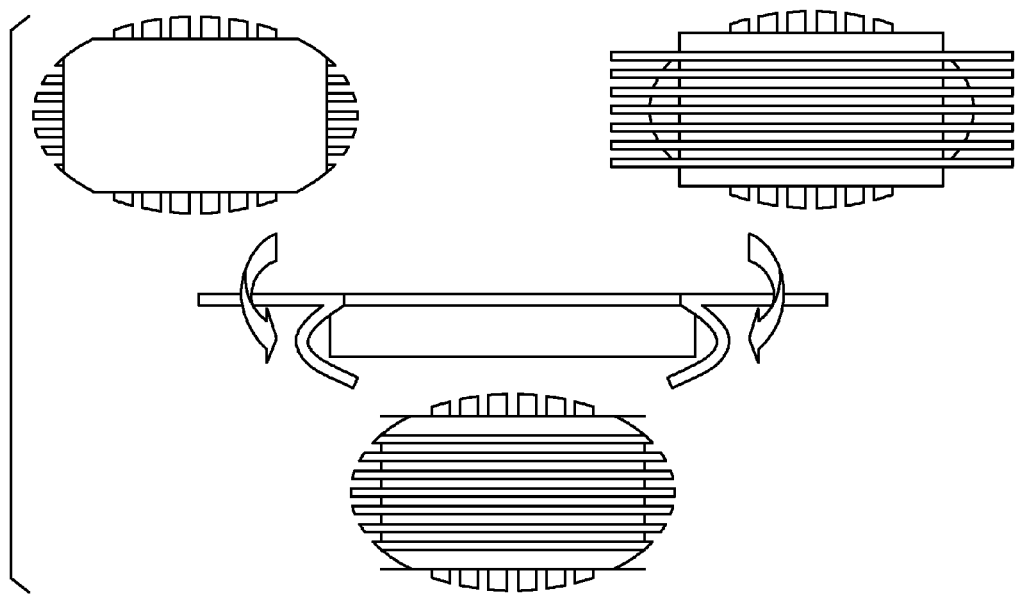
FIG. 16 illustrates pre-etching of slots in a substrate to align fiber braids during the process of forming the scanner of FIG. 14 according to an example embodiment.
Figure 17A:
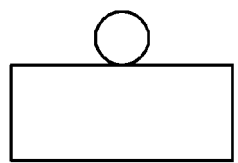
FIGS. 17A and 17B shows a single fiber placed or aligned on a suitable substrate according to an example embodiment.
Figure 17B:
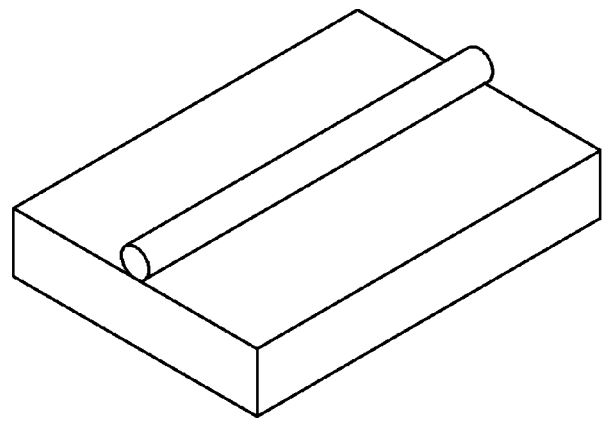

The torsional element braids in the fabric may be aligned precisely to ensure that they are totally contained within the lithographically defined regions in one embodiment. The torsion beams are maintained defect free, and it is important to avoid or at least minimize any etching of the outer elements of the braids. In one embodiment, a pre-etching of alignment slots in the silicon substrate is performed as shown in FIG. 16. The thicker braided yarns (which will form the torsion beams) are separated from the other fine-diameter fibers and then captured in the slots. This then aligns the oriented fibers, or fabric to the substrate.

Carbon fibers etch well in oxygen and other plasmas used in conventional MEMS and IC processing. The matrix and fibers used may also be etched out in similar plasmas such as $CF_4/H_2/O_2$ or $Cl_2$ and argon. Elements of the silicon wafer are etched using standard wet etching chemistries.

A single axis scanner may also be fabricated incorporating the torsional braid and fabric mirror element in the same manner as the dual axis scanner.

The challenges of existing MEMS materials can be overcome by using inherently anisotropic material such as fibers of graphite, glass, metallic/alloys, ceramics etc. Fibers when used as the mechanical scaffold for MEMS structures can be tailored to provide desired properties by varying their alignment, number, material type etc. Additionally, they are some of the most versatile and damage tolerant materials existing today.

Instead of silicon or any other conventional MEMS material derived from semiconductor processing, fibers/filaments and fibrous materials are used to form the structural elements of MEMS i.e., individual or a plurality or fibers aligned/oriented specifically make up individual MEMS structures, they may be added or suitably coupled to pre-patterned micro-structures on a substrate, may or may not contain binders to couple to couple them to a substrate and or with each other.

In one embodiment, MEMS structures can be formed by aligning the fibers into cantilevers, torsion springs, plates, membranes etc. A single fiber may form a cantilever, a microbridge, a tensioned string or a torsion bar; or these structures can be made by aligning a plurality of fibers and coupling them in a way where they act in unison to form such structures. Layers of aligned fibers may also be used to create MEMS structures imparting desired properties.

The simplest structure that can be created using fibers is a single fiber cantilever that is attached to the substrate at one end using a suitable method of attachment, while the other end is free to oscillate at a frequency determined by the material properties of the fiber, its length and cross sectional moment of inertia. Additionally a mass can be attached to the tip of the fiber, e.g., a mirror surface to scan a reflected beam in one or both dimensions.

In another embodiment, a plurality of coplanar and aligned fibers can be used to make cantilever structures that are coupled both at their tips and bases, with the tips being free to oscillate and the bases clamped. Such structures may be used as valves, pumps etc., or can be integrated with reflective elements to form scanning mirrors, or bio-chemical/optical/electrical/piezoelectric elements to be used as sensors.

In yet another embodiment oriented fibers can be deposited/placed, into or onto pre-patterned structures on a substrate to form desired MEMS structures that may comprise solely of specifically oriented fibers/filaments and fibrous materials as structural elements, or may be coupled to other MEMS structures to form a desired MEMS device/structure.

Similarly micro bridge structures, diaphragms, etc. can be made by aligning a number of fibers or layers of fibers onto a substrate. The structures may consist of a single fiber, a plurality of oriented fibers, or layers of fibers. The fibers may also be used as reinforcement for existing MEMS structures made from conventional MEMS materials as well. This would involve pre-patterning a substrate to create MEMS structures such as cantilevers from silicon and related MEMS materials and applying oriented fiber or array of fibers onto the structure in a desired configuration to impart necessary physical properties.

Carbon/graphite fibers are the strongest materials currently available, and extremely chemical resistant, fatigue resistant in tension and compression at high stress levels. In bending these materials have been shown to produce very large elastic deformations with strains exceeding 5% and stresses approaching 20 GPa, and lifetimes exceeding $10^{10}$ cycles at kHz frequencies.

Graphite fibers exhibit the greatest flaw tolerance of any existing material. The stacked/folded graphene sheet nature of graphite fibers isolates the interior core from flaws on the outer surface of the fibers; fibers shed outer sheaths without failure of the entire fiber. Fibers also tend to increase in strength as finer diameters are approached and lengths are reduced. In a further embodiment, it is desired that the fibers are comprised of or replaced by multiple carbon nanotubes.

Multiple different cross sections of fibers shown in FIG. 6 may be used. In addition to fibers that form MEMS structures, other electro-chemical/biological/optical/magnetic/mechanically functional fibers may be combined and coupled to form desired MEMS structures.

Multiple fibers with varied material types may be combined to form MEMS structures with desired and tailored properties.

Figure 19A:
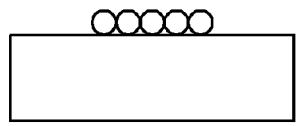
FIGS. 19A and 19B shows a substrate supporting multiple fibers aligned substantially parallel and adjacent to each other according to an example embodiment.
Figure 19B:
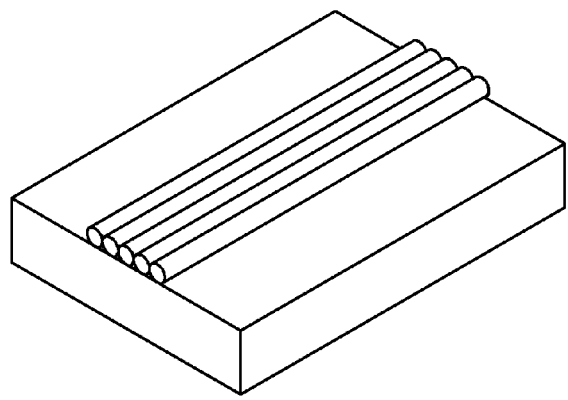

One example MEMS device utilizing such fibrous materials is a simple oscillating multiple fiber cantilever, such as shown in FIGS. 19A and 19B. In this embodiment the fibers are coupled to a substrate using a suitable method such as a binder or epoxy which encapsulates the fibers and attaches them to the substrate. Some examples of binders include epoxy, SU8, photoresists, polyimide, and other binders. The fibers extend beyond the substrate to form a fixed-free cantilever. The tips of the fibers may be coupled also using a binder to make the fibers oscillate in unison. Further layers may be added at the tips, bases, or other points along the lengths of the fibers to impart actuation, or to enhance the coupling between fibers, or to form functional elements of a MEMS device e.g., reflective layers of metal may be deposited onto the tips of such cantilevers to form mirrors that can oscillate and produce a scanned beam of light.

Figure 18A:
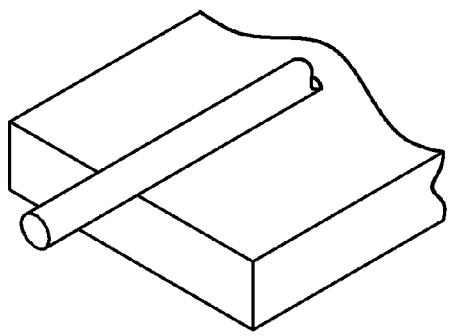
FIGS. 18A and 18B shows a simple cantilever structure formed by a single fiber according to an example embodiment.
Figure 18B:
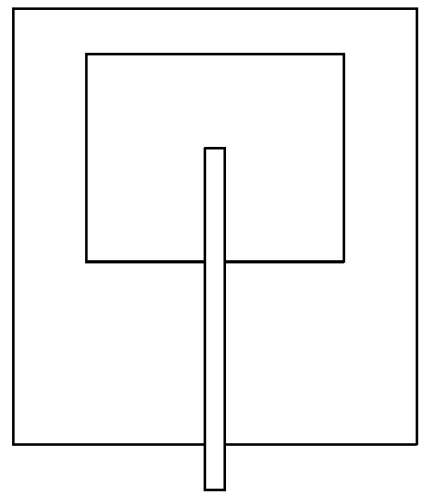

One example MEMS device utilizing such fibrous materials of the present invention is a simple oscillating single fiber cantilever shown in FIG. 18. In this embodiment the fiber is attached to a substrate using suitable means. The fiber extends beyond the substrate and is free to oscillate according to the behavior dictated by its length, material properties, moment of inertia, mass at tip, magnitude, direction and location of force applied to it etc.

Another example is the addition of oriented fibers to an existing MEMS structure pre-defined onto a substrate to enhance mechanical properties. The fibers may be coupled to such structures simply by gluing or using methods known in the semiconductor processing art.

Figure 24A:
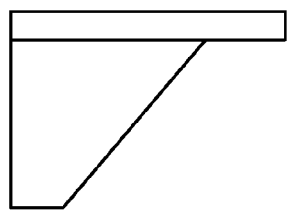
FIGS. 24A, 24B, 24C, 24D, 24E, 24F, 24G, 24H, 24I, and 24J illustrate a method of fabricating MEMS structures according to an example embodiment.
Figure 24B:
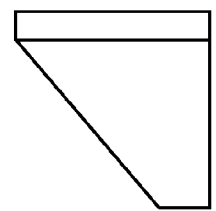
Figure 24C:
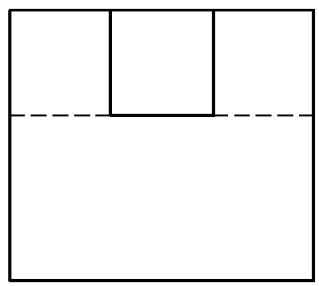
Figure 24D:
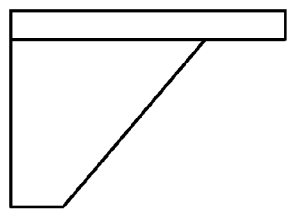
Figure 24E:
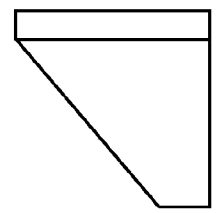
Figure 24F:
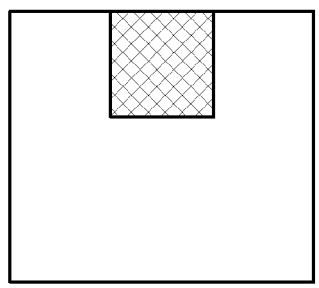
Figure 24G:
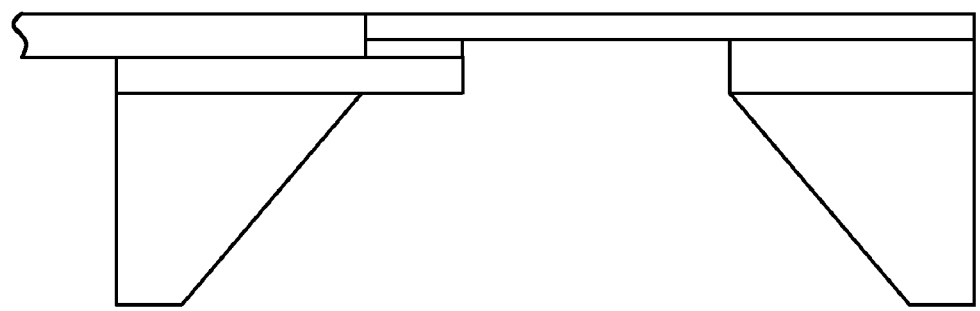
Figure 24H:
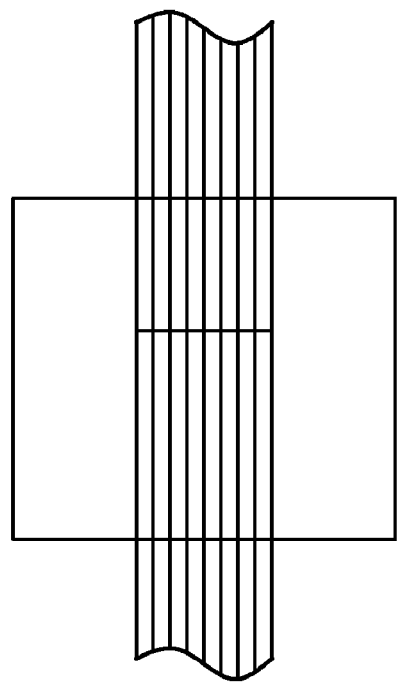
Figure 24I:
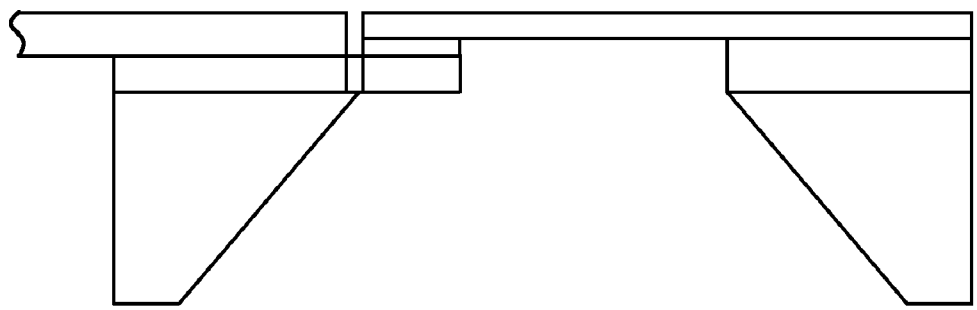
Figure 24J:
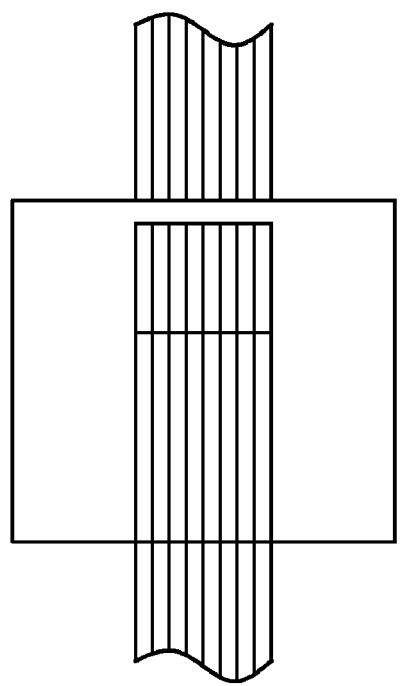

An example method for fabricating the cantilever MEMS structures of FIGS. 19A and 19B is shown in FIGS. 24A-24J. In one embodiment, single graphite fibers are extracted from bundles and are placed side by side to form a fiber array in FIGS. 24G and 24H across the surface of a patterned nitride coated silicon wafer (FIGS. 24A, 24B and 24C). The wafer consists of trenches on the backside across which silicon nitride membranes/ledges have been formed and coated with suitable reflective materials, such as Al as shown in FIGS. 24D, 24E and 24F. The ends of the fibers are tensioned and held in place to maintain fiber alignment with the substrate and each other. A suitable coupling agent is then applied to the fibers at various points on the substrate such that in areas where cantilever structures are desired to be formed the fibers remain uncoated everywhere but at their bases and tips as shown in FIGS. 24D, E and F. That is, the fibers are bonded to the substrate at one at the two opposite ends of the pre-patterned trenches in the wafer, so that one end forms the base, while the end coupled to the reflectively coated silicon nitride ledge forms the cantilever tips. A YAG laser is used to cut the ends of the cantilevers and then free the cantilever tips from the substrate—this involves using the laser energy to cut the fibers and nitride diaphragm/ledge to which it is attached as shown in FIGS. 24I and 24J. The reflective coating remains on the free end of the resulting cantilever.

Fiber MEMS structures can be actuated using a variety of methods. Cantilever and torsion structures may be driven from the tips to generate the large forces or deflections required using magnetic, electrostatic or a combination of actuation methods used in conventional MEMS technology. Alternatively matrix material or electroactive/electromechanical fibers and other structures can be coupled with the graphitic fiber scaffold at various locations to create the necessary actuation or motion. In one embodiment, large tip displacements and forces in fiber MEMS structures are generated by driving the structure into resonance at its base. Magnetic, piezoelectric, electrostatic, electrothermal, electrostrictive, or a combination of such actuating mechanisms may be used to excite the base of a fiber MEMS structure which is fixed to the substrate. The energy of such vibrations is coupled into the free ends of these structures, where they are amplified to produce large amplitudes and forces at the tips.

Figure 20:
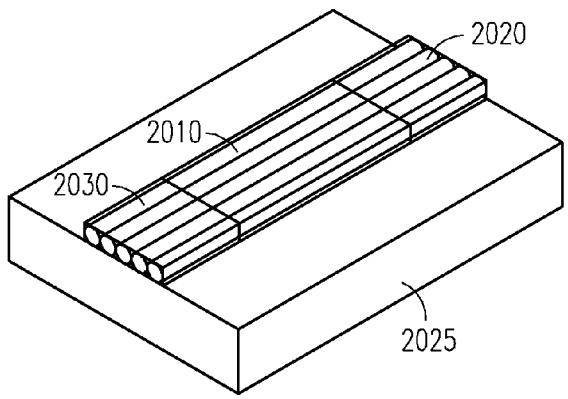
FIG. 20 shows that the fibers may be coupled at any points along their lengths to each other and the common substrate according to an example embodiment.

FIG. 20. shows that the fibers may be coupled at any points along their lengths to each other and the common substrate. In this embodiment, an array of fibers 2010 is embedded in a coupling agent 2020 to a substrate 2025 at a desired position on the substrate. The coupling agent 2020 may be epoxy, metal, an alloy, $SiO_2$, or other material that provides sufficient binding to the substrate for a desired application. In one embodiment, the fiber array may be bound together with a binder, such as epoxy, and may also be coupled to the substrate at a second end 2030 by a suitable coupling agent.

Figure 21:
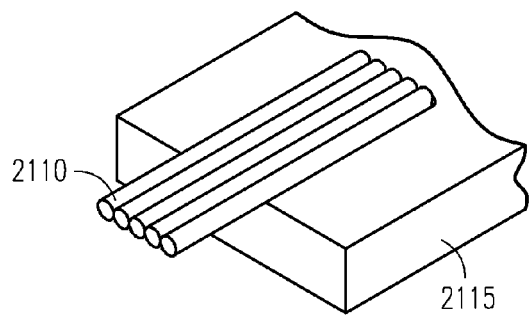
FIG. 21 shows the formation of a MEMS cantilever structure using a plurality of fibers aligned parallel and adjacent to each other according to an example embodiment.

FIG. 21 shows the formation of a MEMS cantilever structure using a plurality of fibers 2110 aligned parallel and adjacent to each other and coupled to a substrate 2115.

FIG. 22 shows fiber reinforcement on a silicon cantilever. An array of fibers 2210 is coupled directly to a silicon cantilever 2215. The fibers 2210 may be used to change the bending and frequency characteristics of the silicon cantilever in a desired manner. The number and arrangement of the fibers provides a good means to modify such characteristics for selected applications. In one embodiment, the cantilever is coupled to a substrate 2220. The fibers 2210 may be coupled to the cantilever alone, or the cantilever and substrate to provide the desired characteristics.

FIGS. 23A, 23B, 23C, 23D and 23E show various cross sections of fibers that may be formed. The cross sections range from simple geometric shapes, such as circles, ovals, squares, rectangles, to complex polygonal shapes and others, such as a star shape shown in FIG. 23C. The cross sections may be tailored to provide structural properties, either enhancing stiffness, or providing further flexibility in desired directions by making certain dimensions thinner. For example, the shapes in FIGS. 23B and 23E may inhibit left and right movement along a thicker axis, but permit more movement along a thinner axis corresponding to the thinner cross section.

Figure 25A:
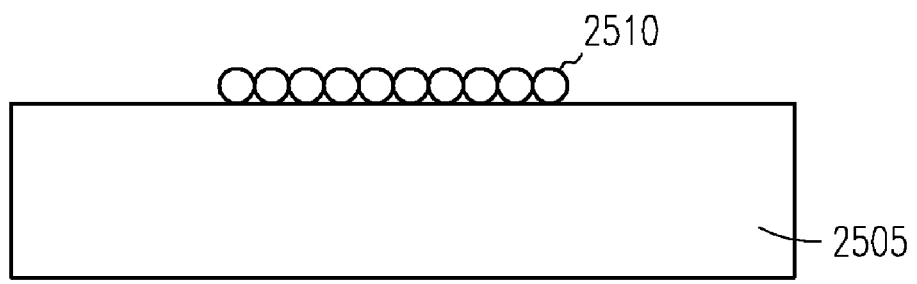
FIGS. 25A and 25B show an array of fibers for an optical scanner according to an example embodiment.
Figure 25B:
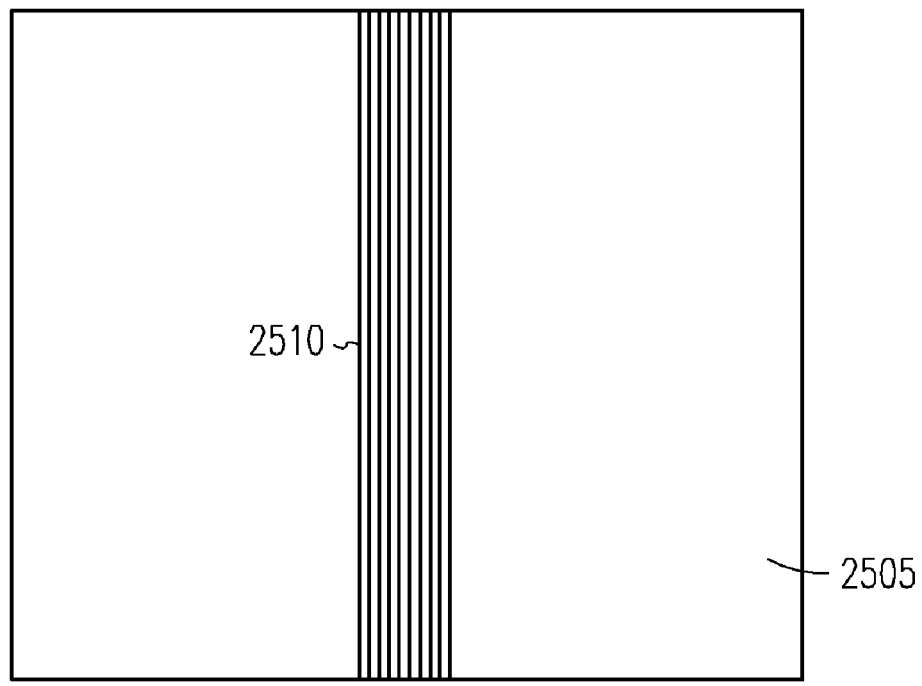

The use of fibers in forming various embodiments of an optical scanner is now described. Formation of an optical scanner is shown in FIGS. 25A and 25B. A substrate 2505, such as a silicon substrate is used to support an array of carbon fibers 2510. In one embodiment, there are 10, 5 um diameter fibers aligned substantially adjacently, optionally substantially in parallel, on the substrate surface. The structural backbone of the scanner device consists of the fiber array. The fibers may be graphite fibers that are aligned along their lengths on the silicon substrate.

Figure 26A:
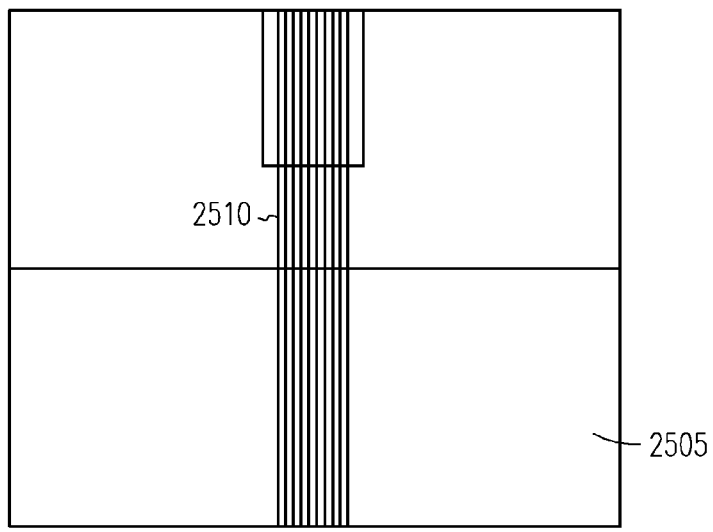
FIGS. 26A and 26B show an array of fibers for an optical scanner according to an example embodiment.
Figure 26B:
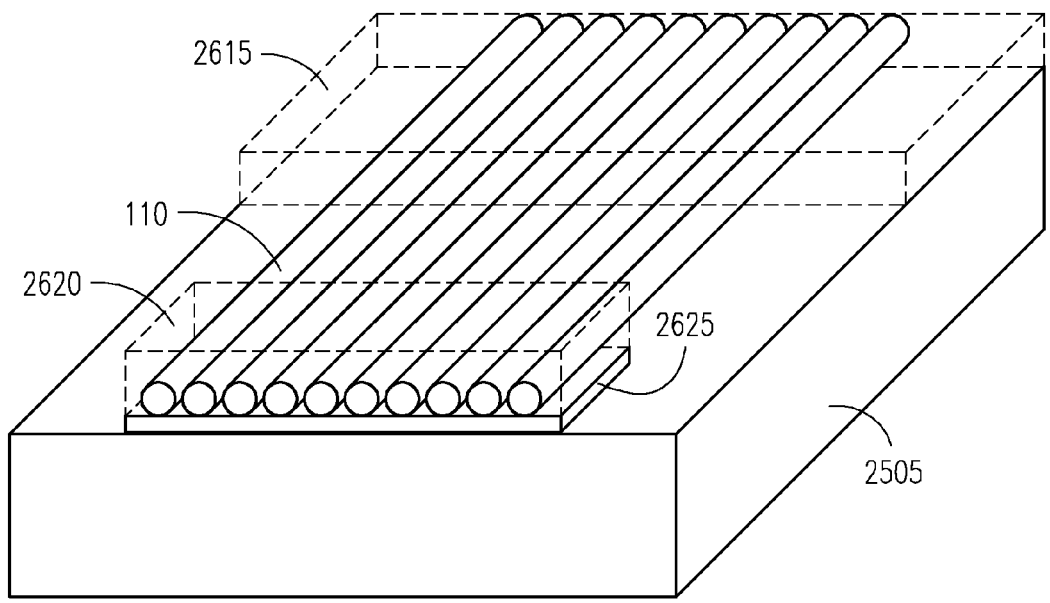

Ends of the fiber array may be encapsulated in a photopatternable epoxy 2615 and 2620, in FIG. 26, so that one end 2615 is anchored to the substrate 2505 (the anchored end), and the other end attached to an optically reflective element 2625 previously patterned on the substrate (the free end) 2620, with some length of fibers exposed and unanchored to the substrate in between the anchored and free encapsulated ends.

Ends may be anchored to the substrate by many methods, including the use of electrodeposited materials. Conventional photoresists may be used to define openings at anchor points on the wafer which has been coated with a thin layer of conductive material. By applying a voltage to the wafer and placing it in an electrochemical bath, metal can be made to precipitate on the substrate, encapsulating the fibers and attaching them to the substrate. The photoresist can then be dissolved away leaving selectively anchored fibers on the wafer surface, encapsulated in electrodeposited metal. Other methods of attaching the fibers to the substrate or a frame may also be used, including physical vapor deposition, or chemical vapor deposition of films such as $SiO_2$, Al, Cu or the use of spin on glass.

Figure 27A:
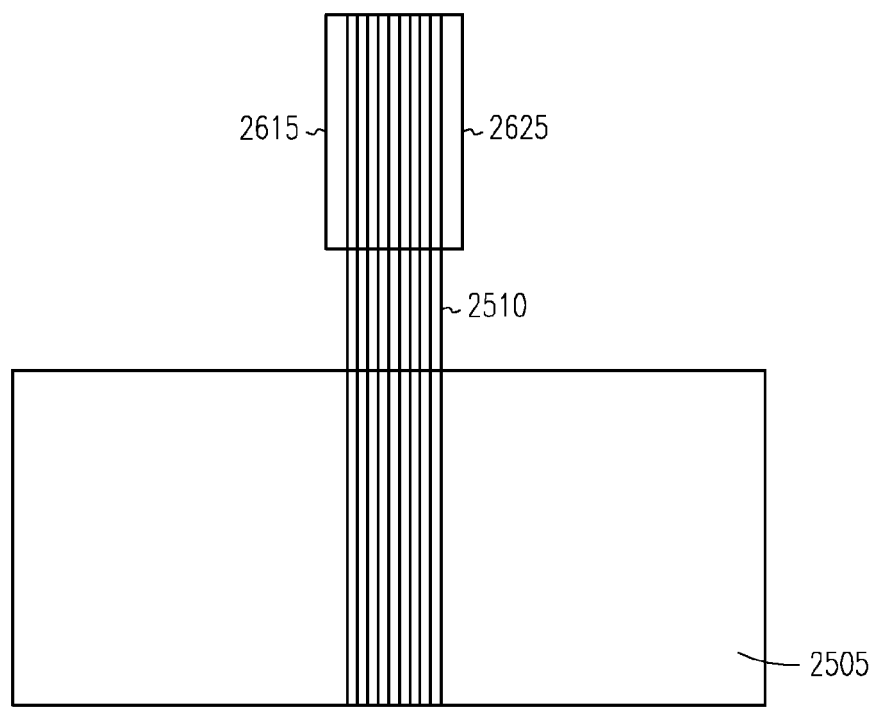
FIGS. 27A and 27B show an array of fibers forming a cantilever for an optical scanner according to an example embodiment.
Figure 27B:
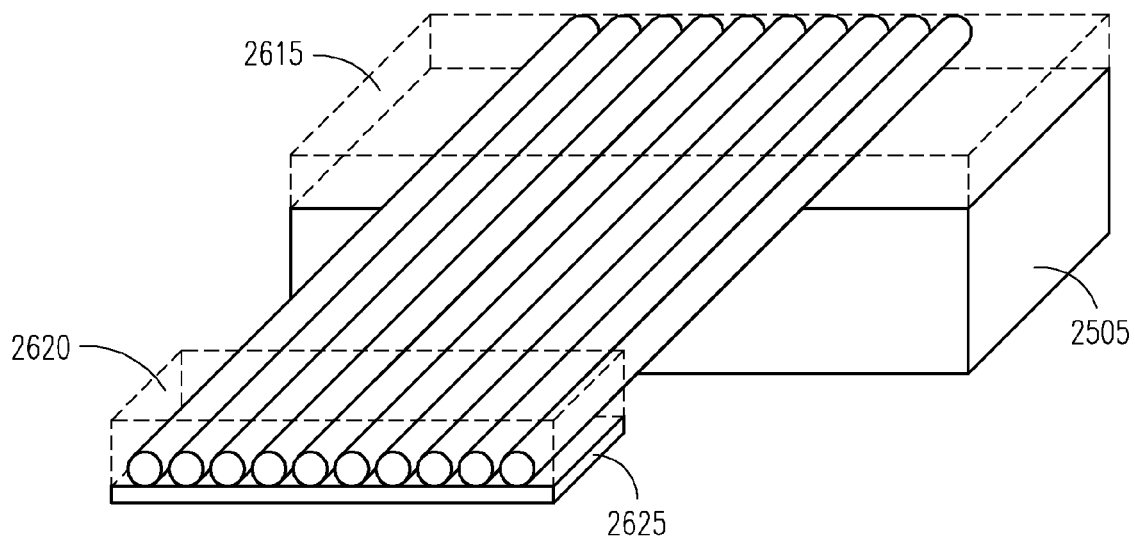

By removing the substrate material from underneath that end of the fiber array that is encapsulated and attached to the optically reflective element all the way up to where the unanchored and exposed fibers of the array meet the point where the array is anchored to the substrate a cantilever beam is formed as illustrated in FIGS. 27A and 27B.

Figure 28:
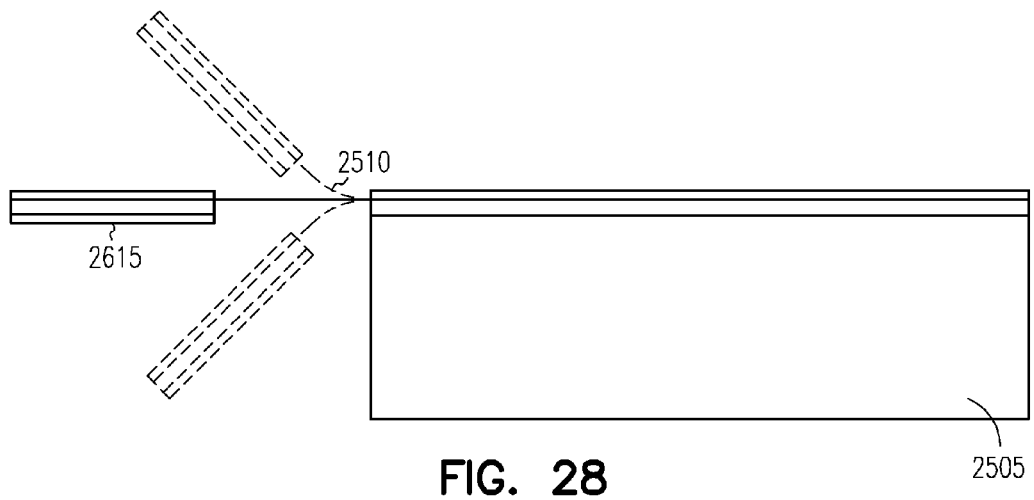
FIG. 28 illustrates movement of a fiber based cantilever according to an example embodiment.

By providing a mechanical stimulus to the substrate, or directly to the cantilever, an oscillation may be produced in the cantilever structure which causes the unencapsulated fibers extending from the substrate to flex or bend, and cause a deflection in the free end of the cantilever comprising of fibers encapsulated and attached to the optically reflective element as shown in FIG. 28. Some length of the fiber array that makes up the cantilever structure remains unencapsulated to form a spring like hinge structure between the cantilever's anchored end and free end. Such a cantilever structure exploits the inherent superior micro-mechanical behavior of the graphite fibers, which are intrinsically stiff, have high bending strength and are fatigue free when subjected to bending or flexural deformation.

Figure 29:
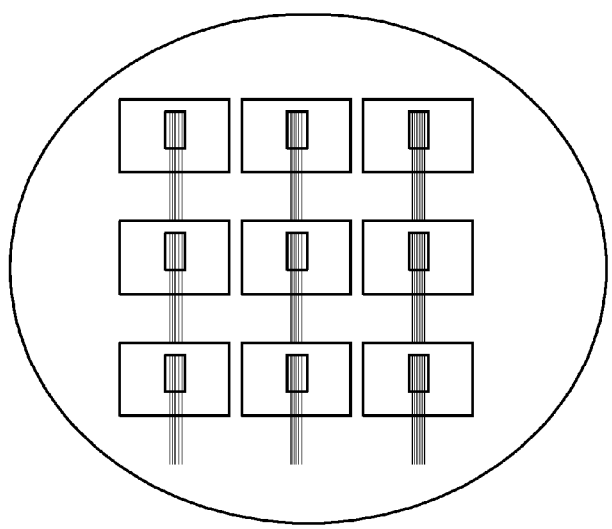
FIG. 29 illustrates an array of fiber based cantilevers for an optical scanner according to an example embodiment.

In a manufacturing process, multiple cantilever structures may be formed in parallel on single silicon wafers, each discrete and independent from the other as illustrated in FIG. 29. This allows efficient and inexpensive fabrication of large numbers of scanners.

Figure 30:
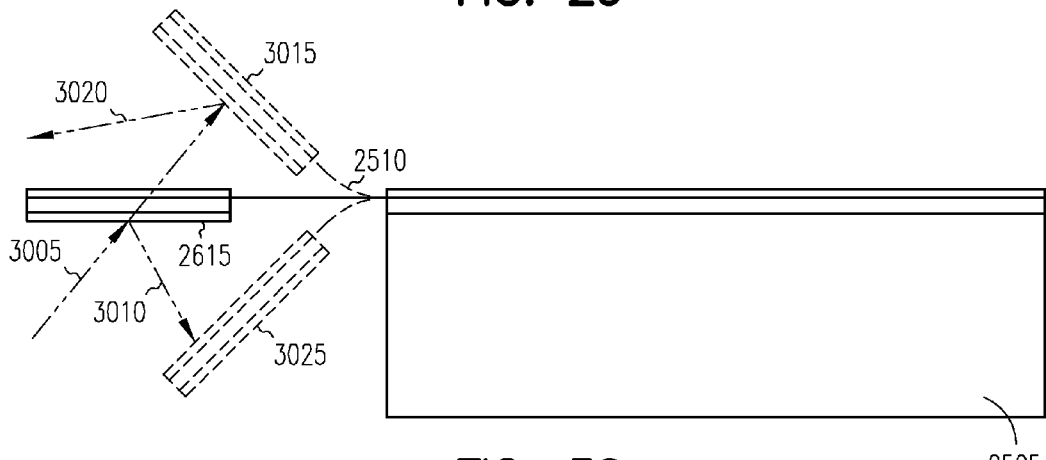
FIG. 30 illustrates light reflected off an optical scanner according to an example embodiment.
Figure 31A:
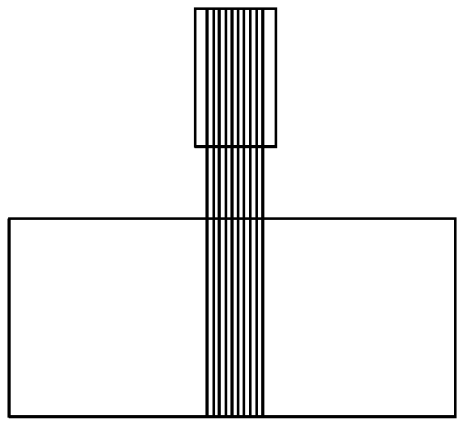
FIGS. 31A, 31B, 31C and 31D illustrate different length cantilevers for an optical scanner according to an example embodiment.
Figure 31B:
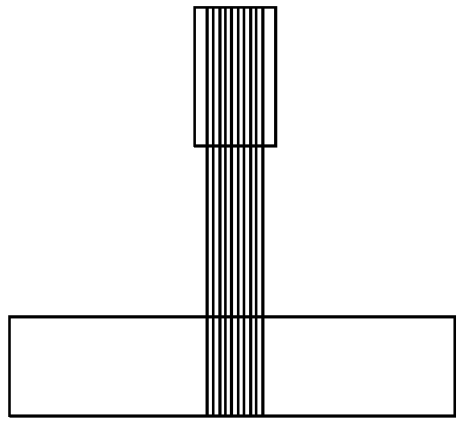
Figure 31C:
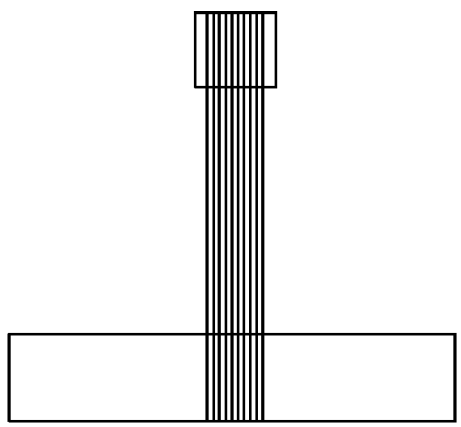
Figure 31D:
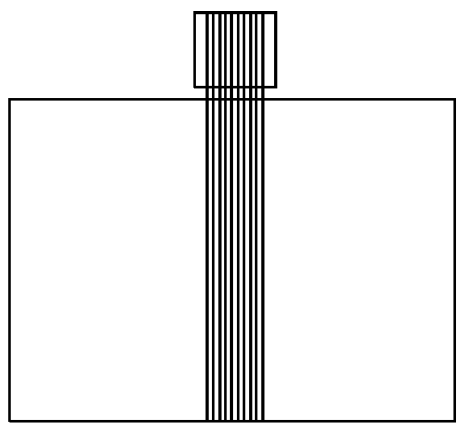

By mechanically stimulating the fiber array cantilever repetitively and at a frequency matching its resonance frequency very large deflections in the cantilever tip may be accomplished as illustrated in FIG. 30. Furthermore, by placing this optically reflective oscillating cantilever in the path of a beam of light 3005, light reflected from the mirrored surface 2625 located at the cantilever tip can be scanned back and forth across a surface located some distance away from the oscillating fiber array cantilever structure. When the cantilever is at rest, light is reflected as shown at 3010. When oscillating, in a first upward position 3015, light is reflected at a substantially different angle 3020. When in a downward position 3025, the mirror is outside the path of incident light, and no light is reflected. The positions of the incident light, and the amount of deflection of the cantilever and hence mirror, may be varied as desired to scan a desired surface.

Although such structures can operate at any frequency, operation at resonance may be desirable in some embodiments because deflections and therefore scan angles/lengths are greatest at the resonant frequency, and the energy (and hence the power) required to maintain large oscillations is minimized within the system.

Figure 32A:
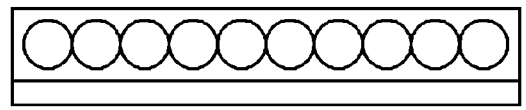
FIGS. 32A, 32B and 32C illustrate cantilevers having different tip mass according to an example embodiment.
Figure 32B:
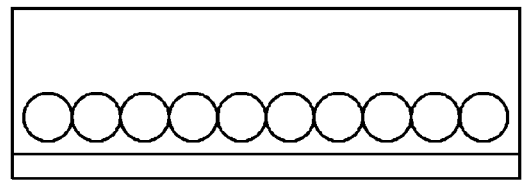
Figure 32C:
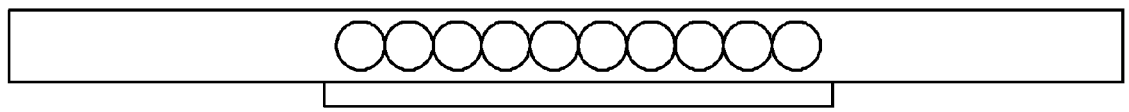

The resonant oscillating frequency of the cantilever scanner can be controlled by varying the length of the fiber array that is free from the substrate and attached to the reflective element—i.e., by varying the length of the cantilever as shown in FIGS. 31A, 31B, 31C and 31D. Longer fiber array cantilevers have slower resonant oscillation speeds. Varying the amount of 'glue' used to attach the fiber array to the mirror also controls the frequency at which the scanner oscillates in resonance. Mass can be added to slow down the cantilever scanner by varying the thickness of the photopatternable epoxy used to encapsulate the fibers tips to the reflective element as seen in FIGS. 32A, 32B and 32C. FIG. 32A shows an encapsulated tip with a nominal amount of encapsulation. FIG. 32B shows fiber tips with a deeper amount of encapsulation, where FIG. 32C shows the fiber tips with a broader amount of encapsulation. Both encapsulations add mass at the tip, which leads to a lower resonant frequency of oscillation of the cantilever.

Alternatively, the mass of the optically reflective element attached to the fiber array tips may also be varied by changing its thickness or surface area, or both to affect the resonant speed of the cantilever.

Although extremely stiff, graphite fibers are capable of very large elastic deformations (max. strains approaching 5%, in bending). The mechanical deflection of the scanner can be controlled by varying the length of that part of the cantilever structure where the fibers are exposed and unanchored to the substrate, as well as varying the overall length of the cantilever scanner.

Figure 33:
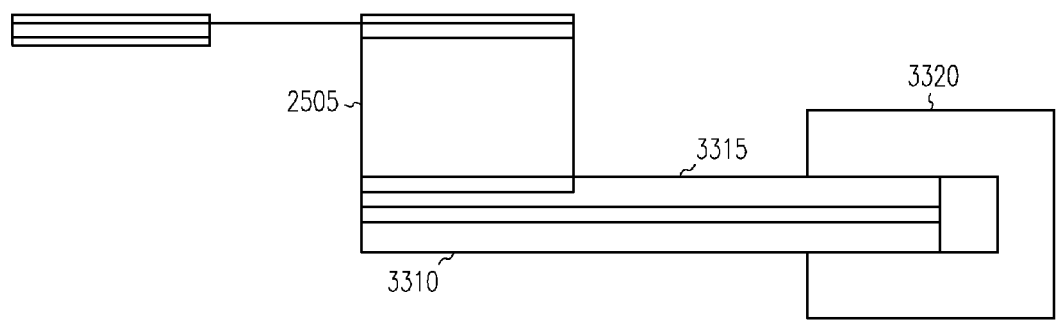
FIG. 33 is a dual cantilever optical scanner according to an example embodiment.
Figure 34:
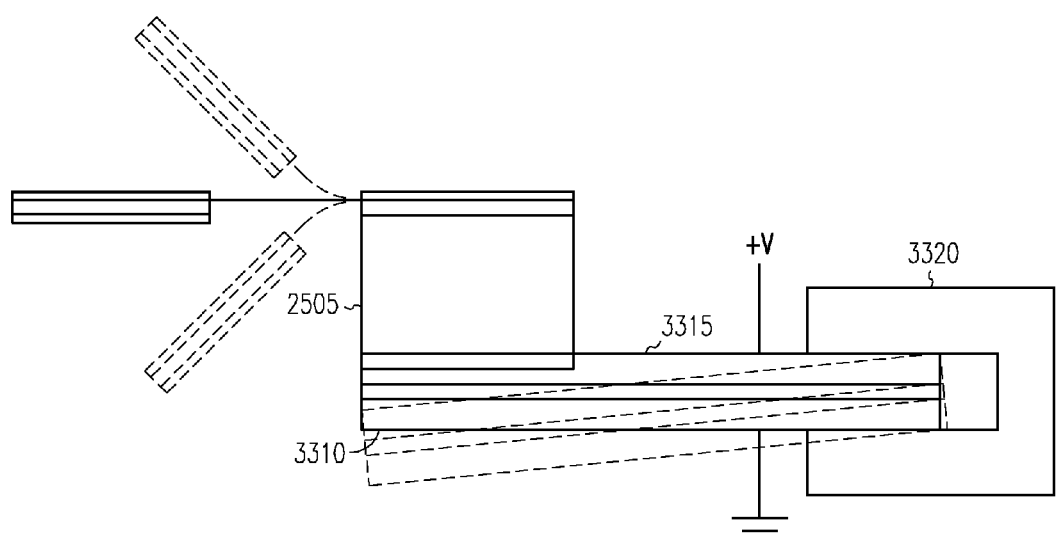
FIG. 34 is an illustration of motion of a dual cantilever optical scanner according to an example embodiment.

The scanner device may be made to oscillate by attaching the silicon substrate 2505 anchoring the cantilever structure to a tip 3310 of a piezoelectric bending element 3315 as shown in FIG. 33. A voltage is applied to the piezoelectric element causing it to bend/oscillate at a frequency tuned to match the resonance of the fiber based MEMS cantilever structure. Movement in the piezoelectric element (bimorph) causes motion of the silicon substrate anchoring the fiber cantilever, i.e., at the base or fixed end of the cantilever, which is amplified at the cantilever's free end or tip. The piezoelectric bending element 3315 may be clamped to another structure if desired by clamp or fastener 3320, essentially forming a second cantilever or other coupling structure capable of moving (rotating, twisting, bending) in a direction orthogonal to the cantilever of the scanner device. Oscillation of the scanner device is illustrated in FIG. 34, where movement of the substrate caused by the bending element 3315 results in oscillation of the cantilever and mirror. In further embodiments, the second cantilever may be formed of nickel or other ferromagnetic material and be driven electromagnetically.

Figure 35:
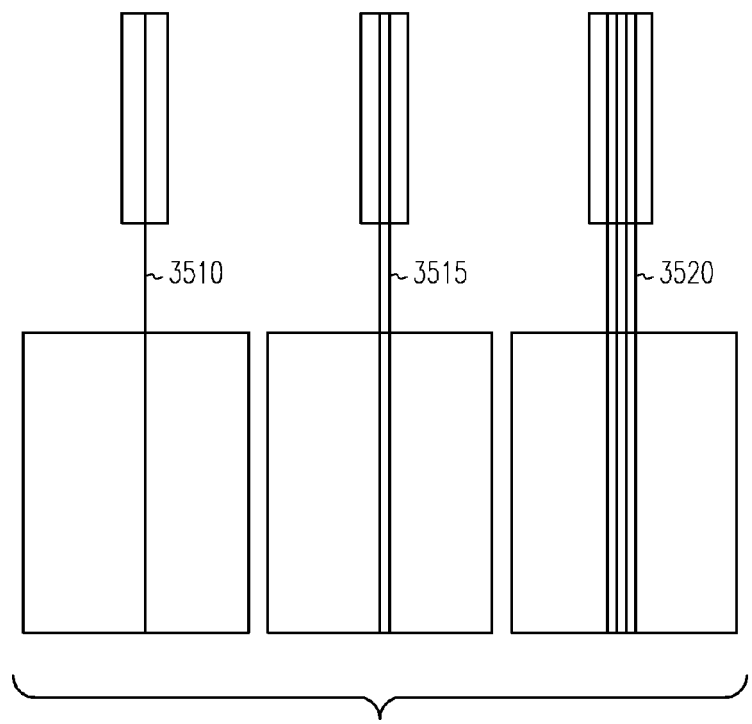
FIG. 35 is an illustration of multiple fiber based cantilevers having a varying number of fibers according to an example embodiment.
Figure 36:
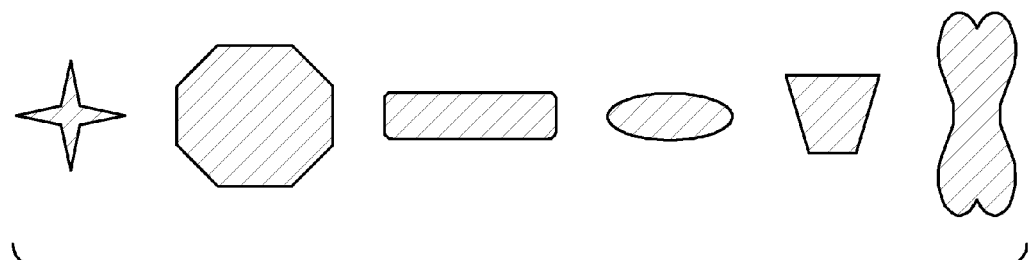
FIG. 36 illustrates various fiber cross sections according to an example embodiment.

Different numbers of fibers may be used to form cantilevers, as shown in FIG. 35. A single fiber 3510 or any number of fibers may be used to make up the fiber array forming the structural backbone of the cantilever MEMS optical scanner. Two fibers are shown at 3515 and a four fiber cantilever is shown at 3520. The diameter of the individual fibers in the array may range from approximately 10 nm-100 µm. Even smaller diameters may be used. They may also be composed of materials other than graphite, and may be of shapes other than regular cylinders as shown in FIG. 36, where star, octagonal, flattened/rectangular, oval, quadrangular and dog-bone shapes are illustrated for example.

Figure 37A:
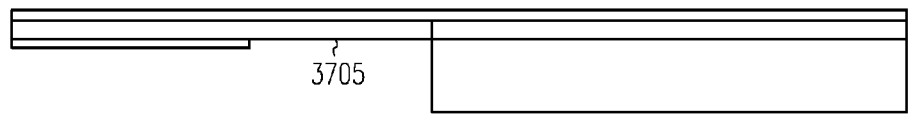
FIGS. 37A, 37B and 37C illustrate various views of an encapsulated composite fiber cantilever according to an example embodiment.
Figure 37B:
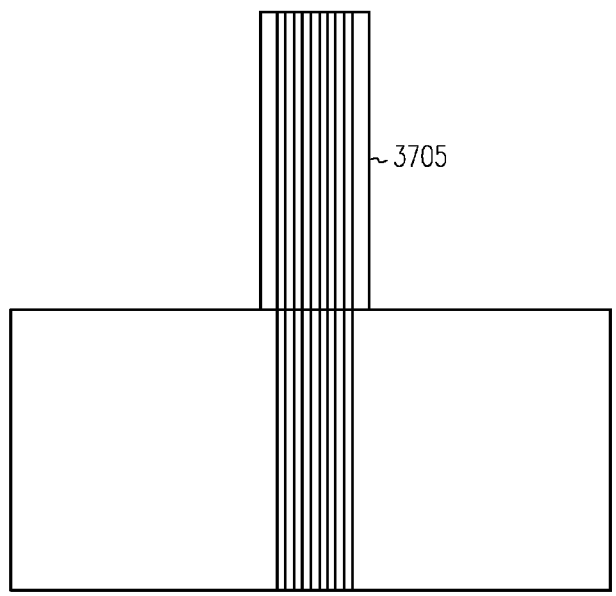
Figure 37C:
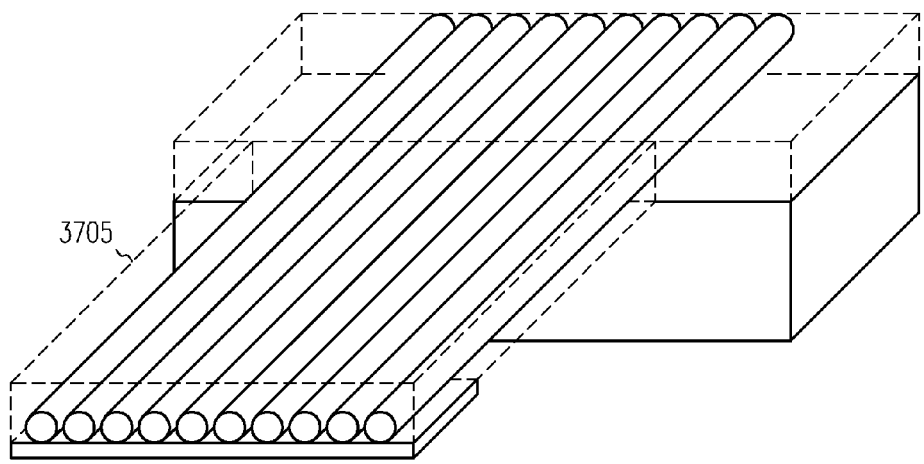

In further embodiments, the cantilever is formed of fibers with a minimal amount of "glue" to hold them in place, or as a more complex composite, where the fibers are first rigidly linked with a matrix to form a fiber-matrix composite cantilever as shown at 3705 in FIGS. 37A, 37B and 37C. This is really a point of degree, ranging from no load transfer between the matrix and fiber (free fibers with minimal glue) to maximal transfer during operation (the rigid composite).

Figure 38A:
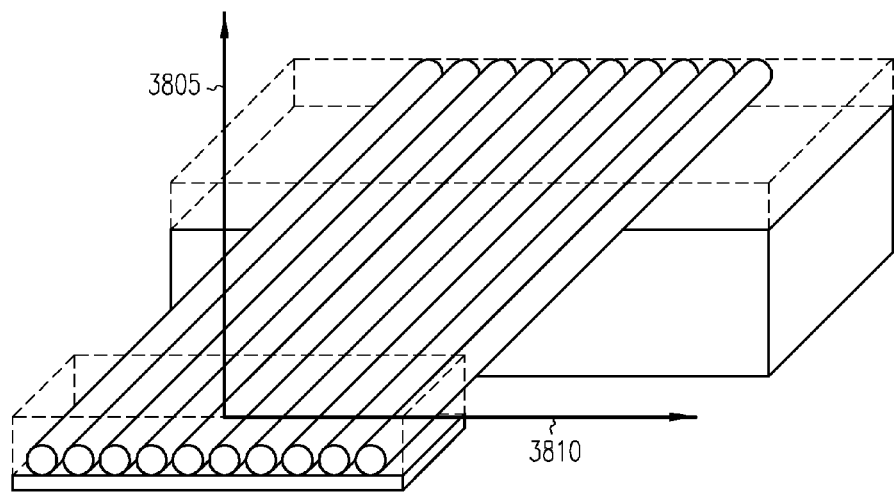
FIGS. 38A and 38B illustrate bidirectional cantilever tip motion according to an example embodiment.
Figure 38B:
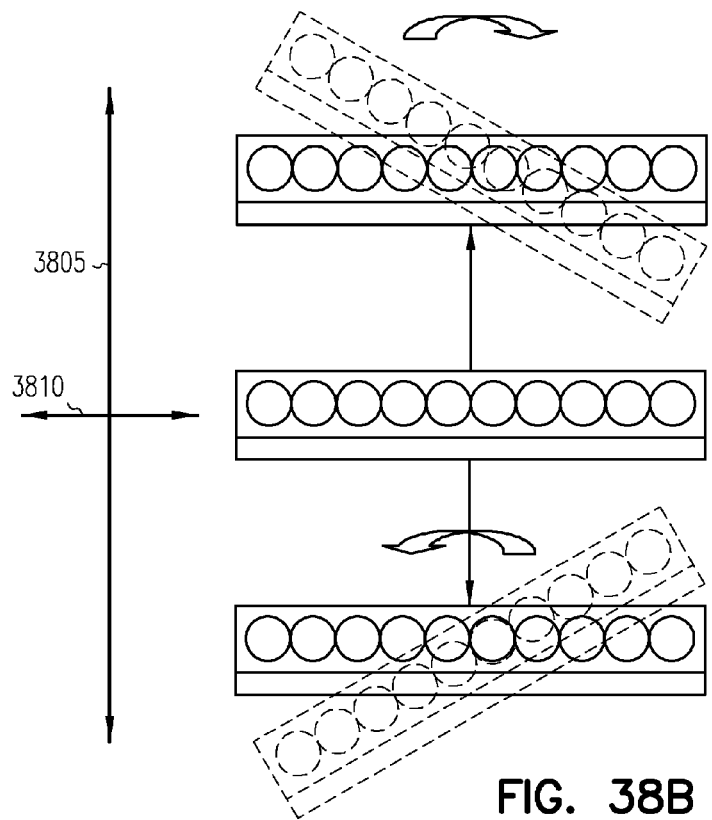
Figure 39:
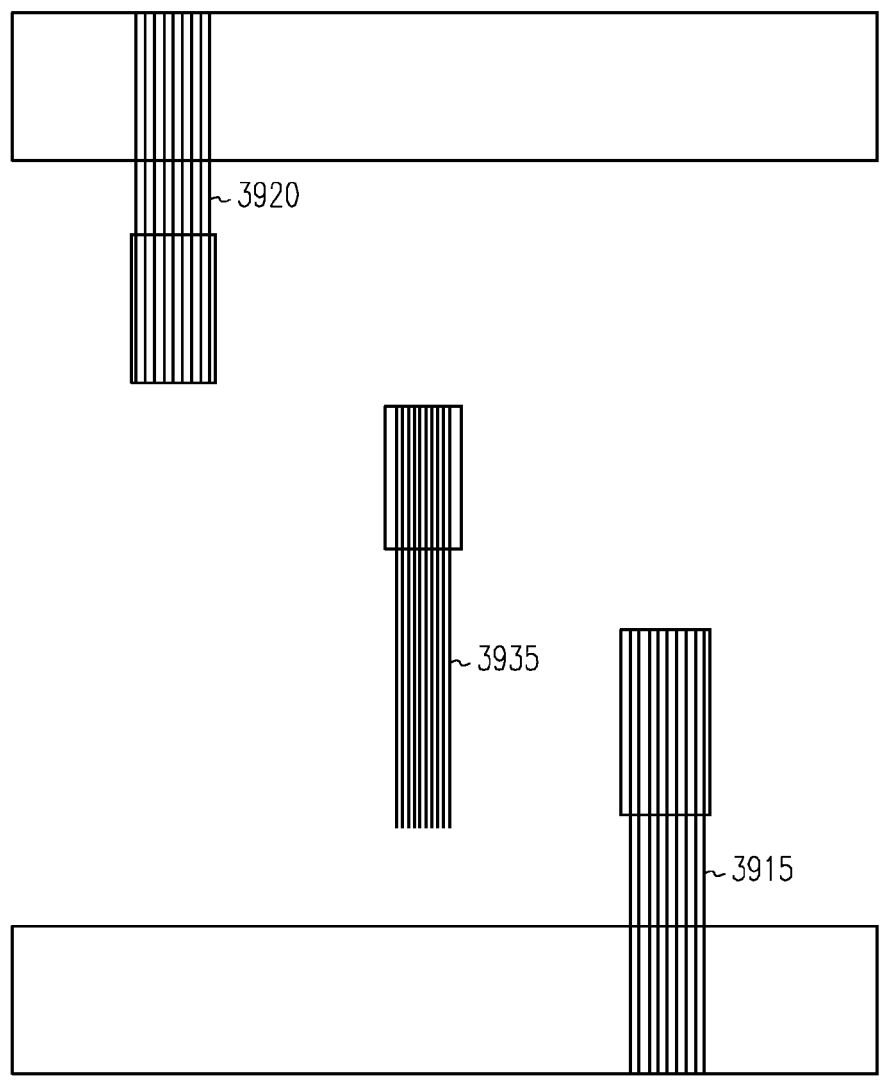
FIG. 39 illustrates a cantilever with orthogonal axes to provide deflection in two dimensions according to an example embodiment.
Figure 40:
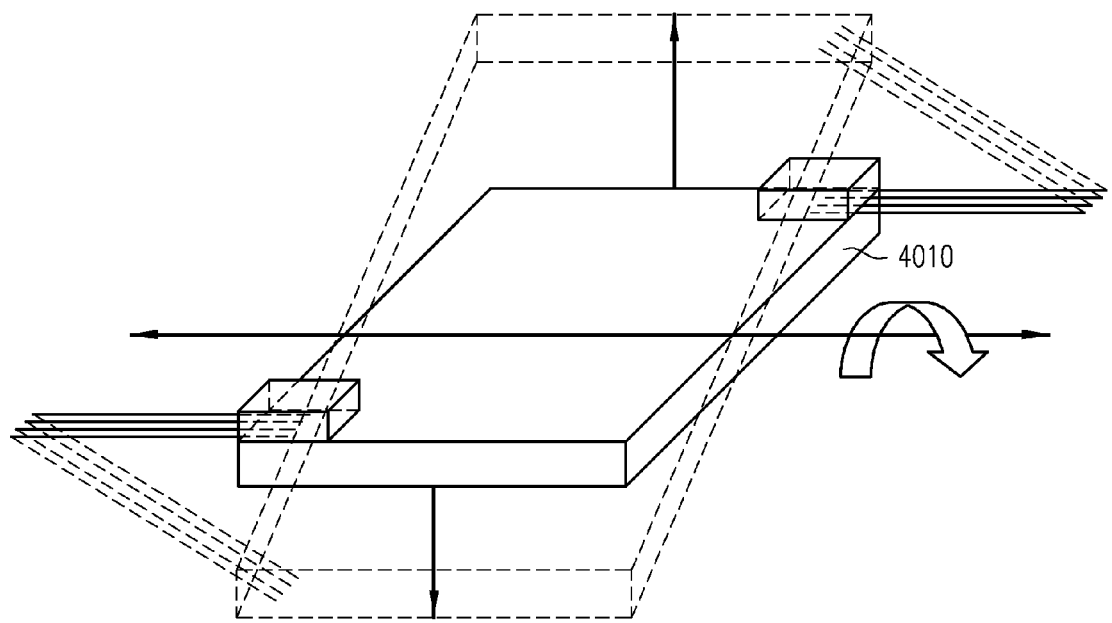
FIG. 40 illustrates rotation of a frame with cantilever attachments at diagonal ends of the frame according to an example embodiment.

The cantilever can also be constructed with two orthogonal axes 3805 and 3810 to provide deflection in two dimensions as seen in FIGS. 38A and 38B. A secondary structure illustrated in FIG. 39, designed to move orthogonal to the cantilevers, might consist of a rectangular frame surrounding the fiber array cantilever and attached to it, with fibers 3915 and 3920 placed at two diagonally opposite ends and parallel to the fibers 3935 in the cantilever structure. The fibers at the diagonally opposite ends of the frame structure 4010 may be attached to the frame 4010 using a photopatternable epoxy and act as cantilever hinges/springs that bend in opposite directions simultaneously and cause the frame to tilt orthogonally to the motion of the scanner under an external mechanical stimulus shown in FIG. 40.

Two dimensional scanning may be obtained by attaching the fiber composite MEMS mirror structure to any other base/structure which oscillates or provides non-resonant motion in an orthogonal direction to the plane of the mirror oscillations. This may include rods, surfaces, galvanometric coils etc. The frequency of motion in the second direction can be substantially slower than those of the primary mirror which scans the lines.

Figure 41:
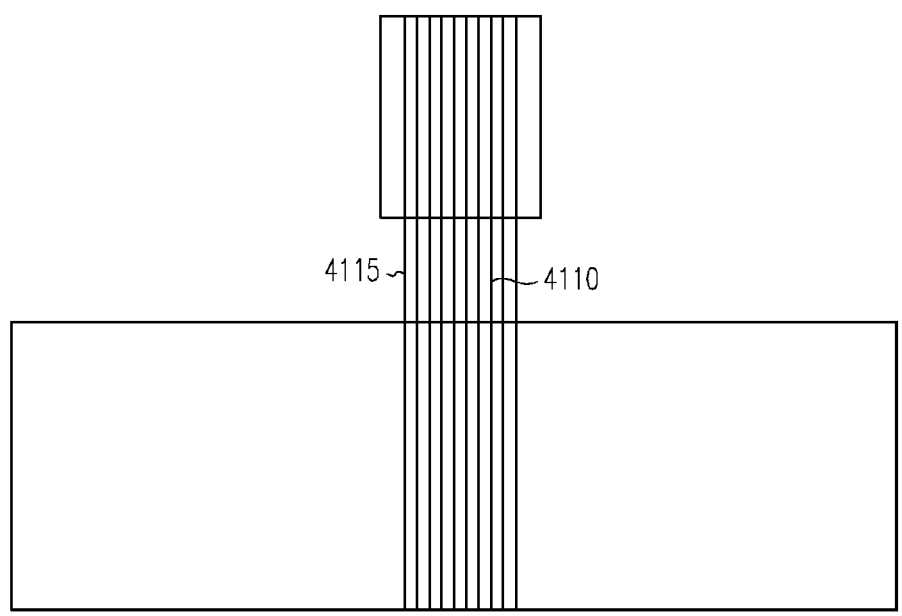
FIG. 41 illustrates a cantilever with actuating fibers embedded in an array of fibers according to an example embodiment.
Figure 42:
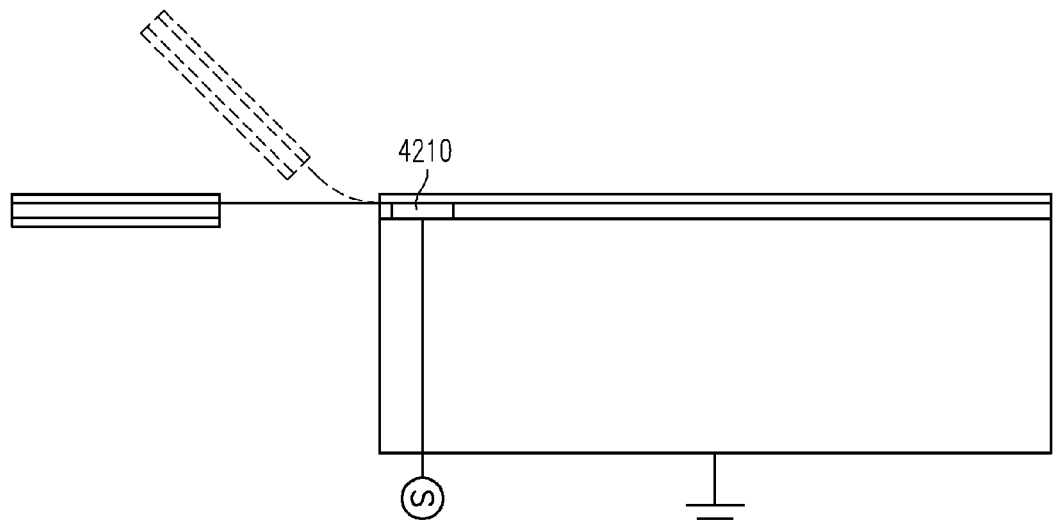
FIG. 42 illustrates motion of the cantilever of FIG. 41 according to an example embodiment.
Figure 43:
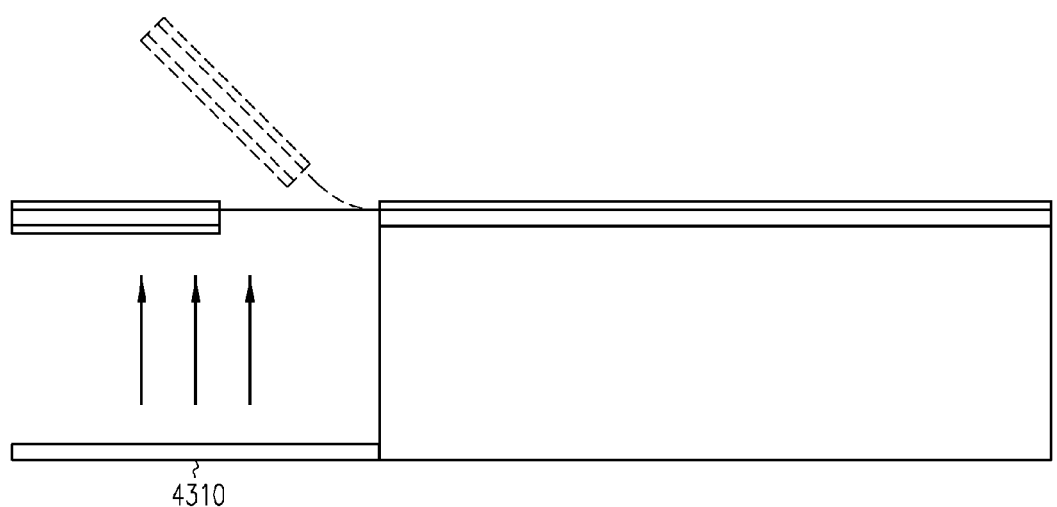
FIG. 43 illustrates motion of a cantilever driven by an electromagnet according to an example embodiment.

Motion (actuation) can also be integrated into the scanner and secondary support structures. This can include incorporating fibers 4110 that are piezoelectric or ferromagnetic into a fiber 4115 array making up the cantilever MEMS scanner device as illustrated in FIG. 41. The piezoelectric element 4110 can be caused to bend by applying a voltage to an electrode 4210 attached to the fiber array causing an overall deflection in the scanner and the support structure illustrated in FIG. 42. Magnetic fibers can also be made to bend to create overall deflection in the fiber array cantilever and hence the scanner, by creating pulsed magnetic fields via an electromagnet 4310 under the cantilever structure at the scanner's resonance frequency causing it to oscillate as illustrated in FIG. 43.

Figure 44:
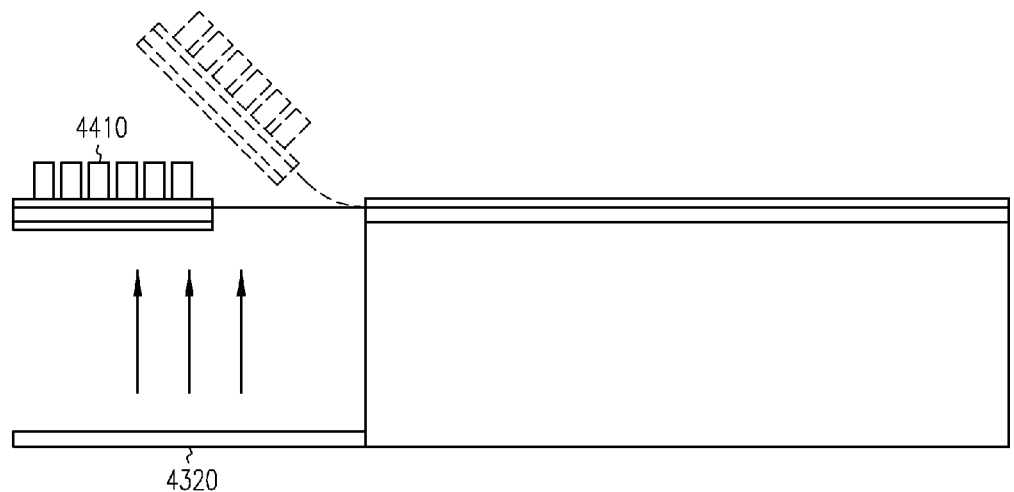
FIG. 44 illustrates motion of a cantilever driven by pulsed magnetic fields according to an example embodiment.
Figure 45:
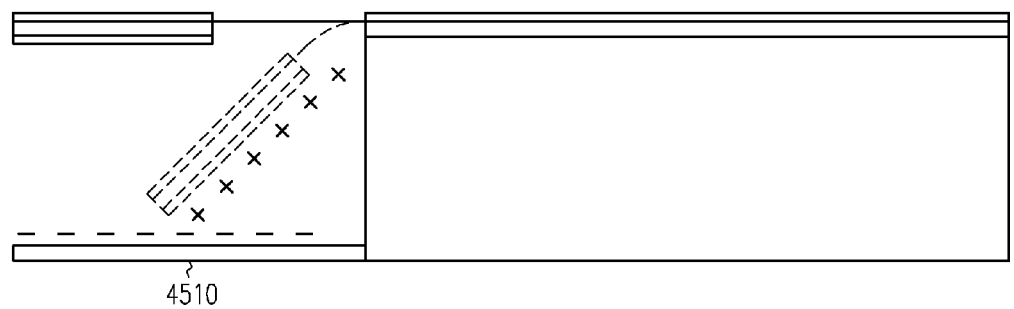
FIG. 45 illustrates electrostatic deflection of a cantilever according to an example embodiment.

Alternatively, a current carrying coil 4410 such as an electroplated current carrying coil may be fabricated that is part of the scanner and/or the support structure. By placing the scanner device in a constant magnetic field such as provided by a magnet 4420, Lorentz force actuation known in the art may be used to cause the scanner and/or the support structure to oscillate by varying the current in the coil as shown in FIG. 44. Electrostatic actuation known in the MEMS art may also be used to cause deflection in the graphite fibers making up the cantilever and/or the support structure as illustrated in FIG. 45 by creating a difference in charge between a metal electrode 4510 and the cantilever. These methods of actuation may also be used for sensing to ascertain precisely the position of the cantilever and supporting frame along their respective scanning arcs.

Overview of Fabrication Process

The graphite fiber based cantilever MEMS optical scanner may fabricated using conventional processes, such as those used in semiconductor and MEMS fabrication—photolithography, wet/dry etching, thin film deposition etc. Further methods are used to provide deposit, alignment and anchoring of the fiber materials onto patterned elements on the silicon wafer.

Figure 46A:
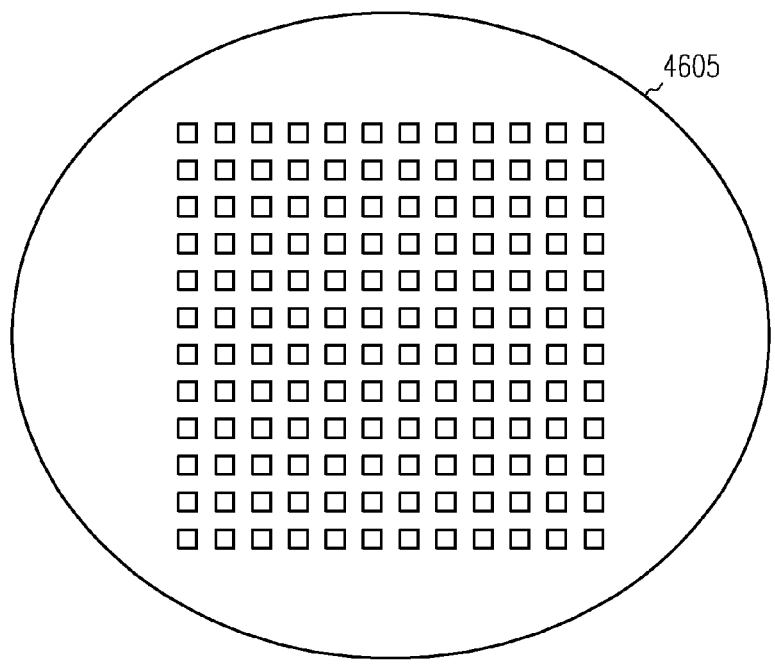
FIGS. 46A and 46B illustrate initial formation of a mirror according to an example embodiment.
Figure 46B:
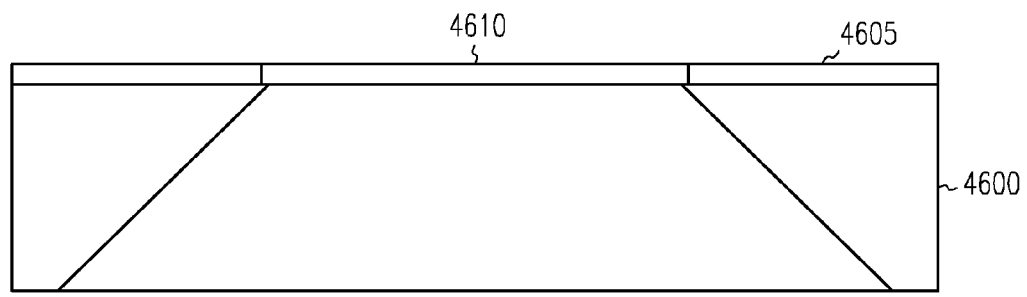
Figure 47A:
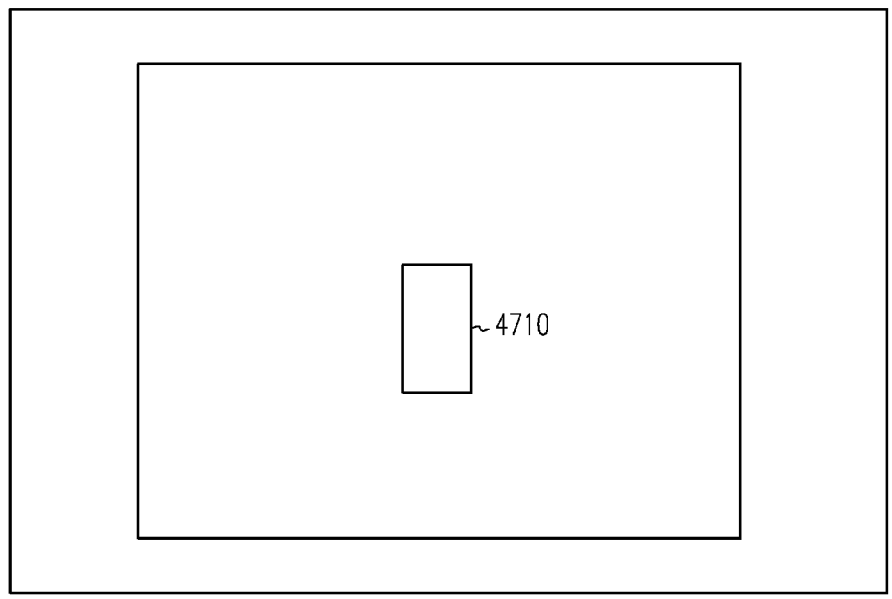
FIGS. 47A and 47B illustrate formation of a reflective surface for a mirror according to an example embodiment.
Figure 47B:
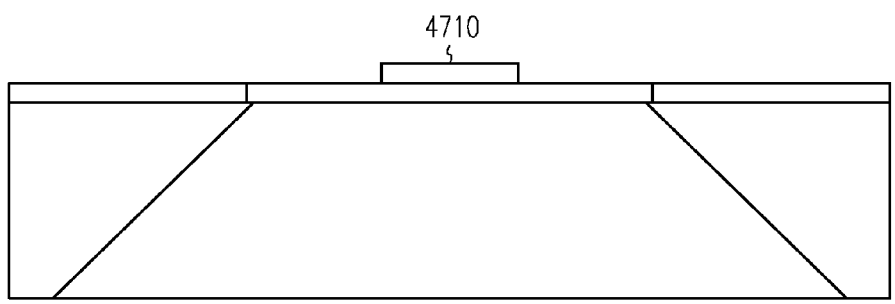

In one embodiment, fabrication of the fiber MEMS optical scanners is performed on a silicon substrate 4600. The substrate is comprised of a $Si_3N_4$ covered 4605 silicon wafer that has been selectively etched to form 100-300 nm $Si_3N_4$ membranes 4610 on one surface as illustrated in FIGS. 46A and 46B. The membranes are selectively covered with a film of aluminum 100 nm thick, to produce aluminum rectangles 4710, 50 μm wide, 275 μm long, 0.5 mm from one edge of the membrane as shown in FIGS. 47A and 47B. The surface of the aluminum film is smooth because it is formed on a smooth surface creates by the $Si_3N_4$. When the $Si_3N_4$ is removed later in the process, it leaves a smooth exposed aluminum surface that forms a good mirror. In further embodiments, the mirror may be formed of thin reflective metallic films or dichroics.

Figure 48:
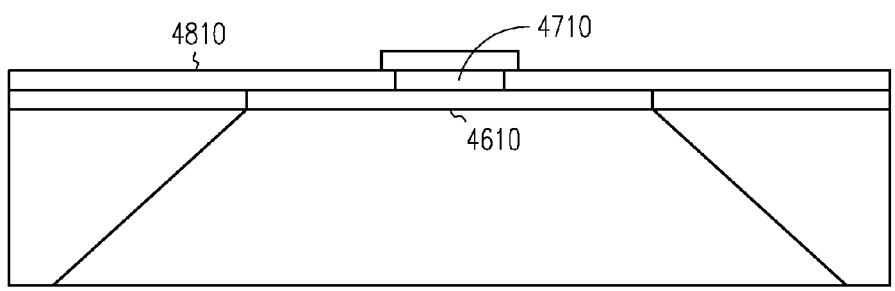
FIG. 48 illustrates further formation of a mirror according to an example embodiment.
Figure 49A:
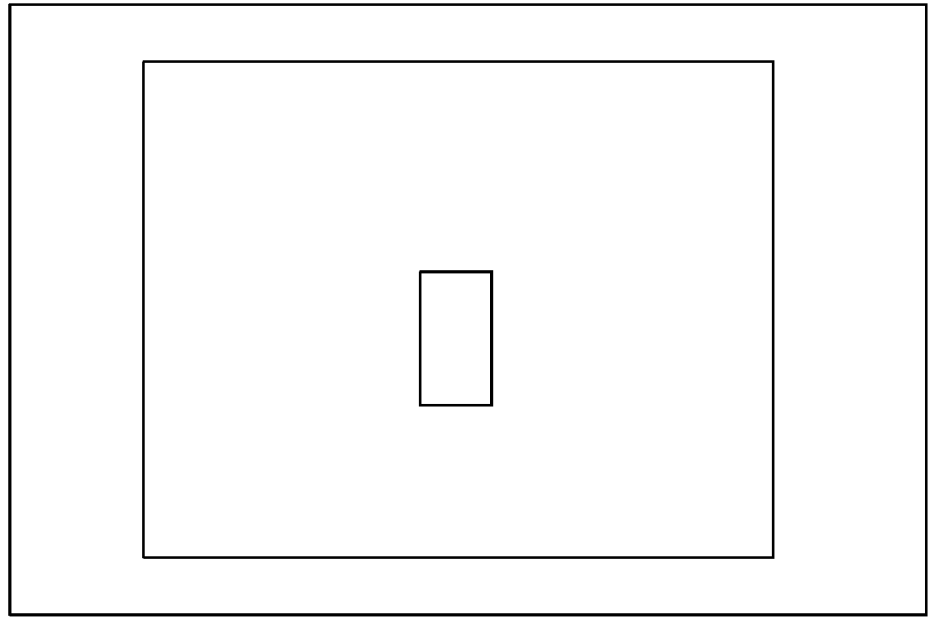
FIGS. 49A and 49B illustrate further steps in formation of a mirror according to an example embodiment.
Figure 49B:
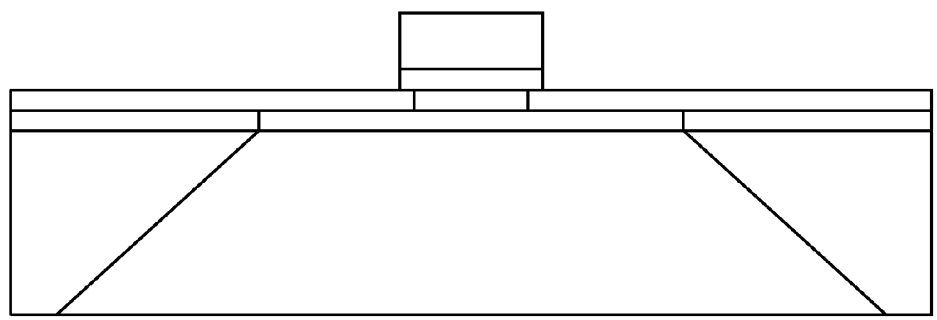

A layer 4810 of $Si_3N_4$ 50-100 nm thick is then deposited or otherwise formed to cover the entire wafer so that the aluminum rectangles 4710 are sandwiched in the membrane by 2 $Si_3N_4$ layers as shown in FIG. 48. The aluminum rectangle 4710 is a film within the $Si_3N_4$ membrane, and forms an optically reflective element to which fibers will be attached to form the cantilever MEMS optical scanner structure. Onto this patterned substrate, a layer of SU 8 photopatternable epoxy is spin coated and lithographically patterned to produce 2 μm thick rectangles 50 μm wide, 275 μm long of epoxy directly over the aluminum structures sandwiched within the $Si_3N_4$ membranes as seen in FIGS. 49A and 49B. In one embodiment, a layer of $Si_3N_4$ separates the carbon fibers and reflective element. It may prevent peeling of the mirror in various embodiments. Other materials that are selectively etchable from aluminum may also be used. Other reflective materials may also be used for forming the mirror such as polished silicon, reflective metal thin films (Au, Ti etc.) or dichroic films.

Figure 50A:
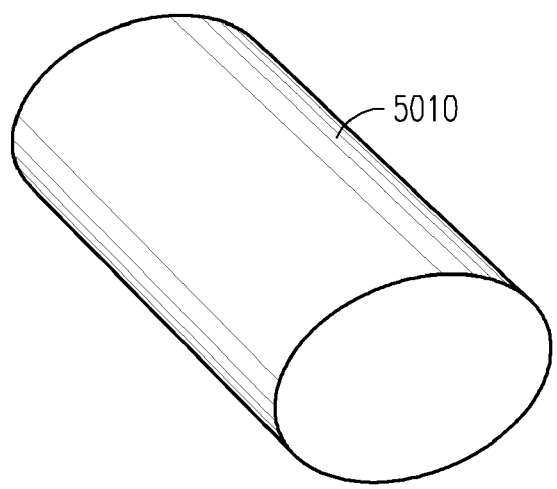
FIGS. 50A and 50B illustrate steps in forming an array of fibers according to an example embodiment.
Figure 50B:
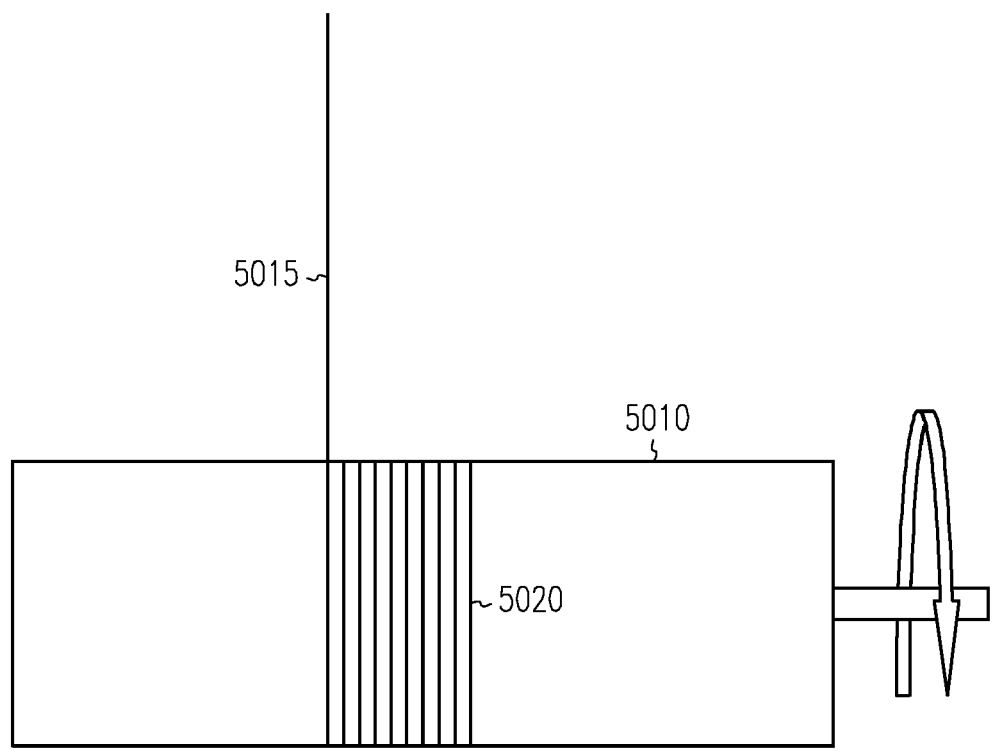
Figure 51A:
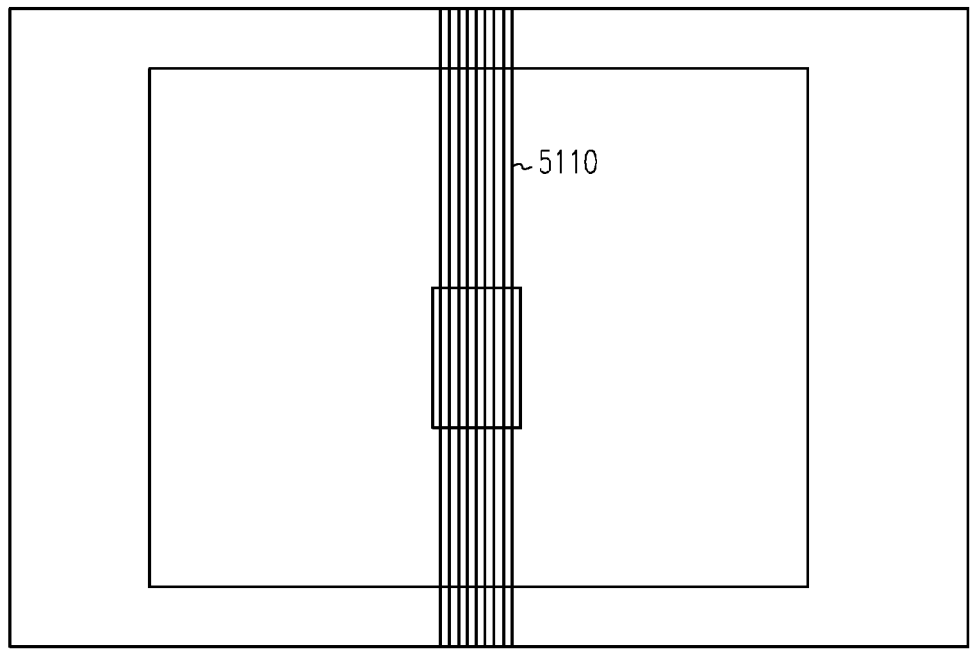
FIGS. 51A and 51B illustrate steps in transferring an array of fibers to a wafer according to an example embodiment.
Figure 51B:
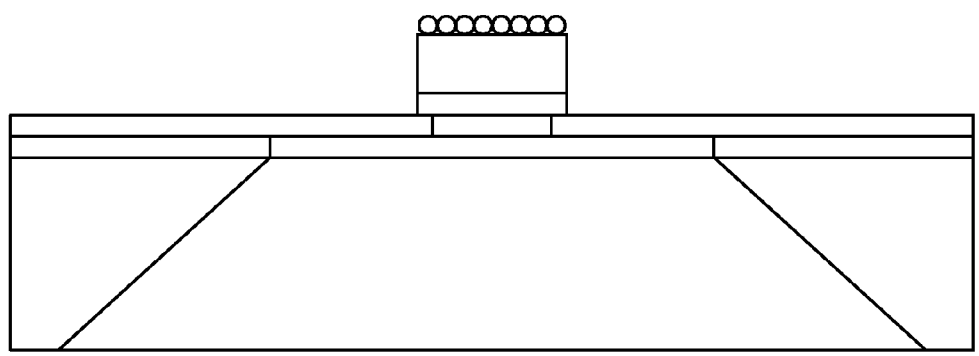
Figure 52:
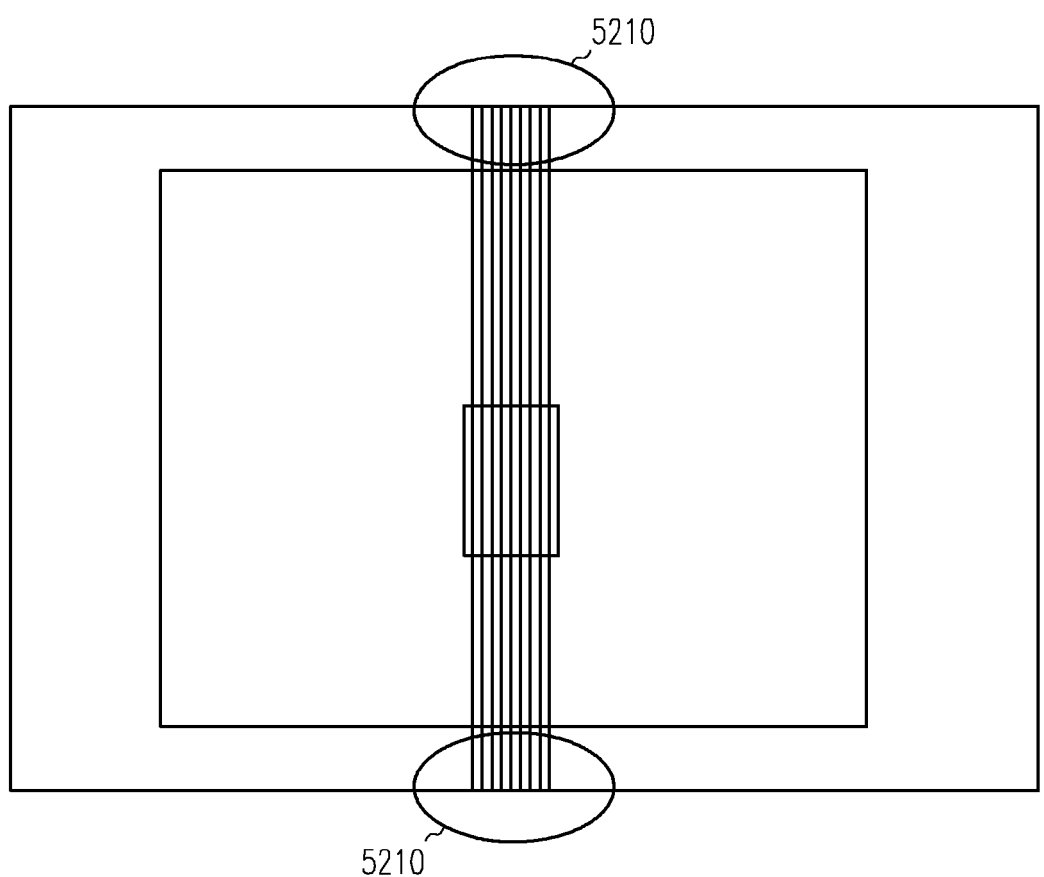
FIG. 52 illustrates a wafer having an array of fibers according to an example embodiment.
Figure 53A:
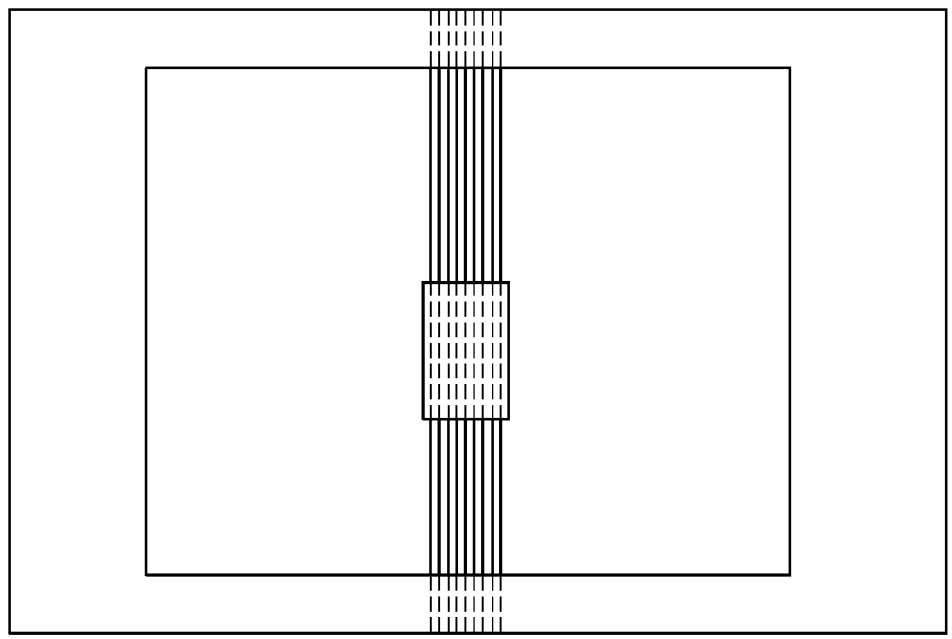
FIGS. 53A and 53B illustrate fibers encapsulated and anchored to a substrate according to an example embodiment.
Figure 53B:
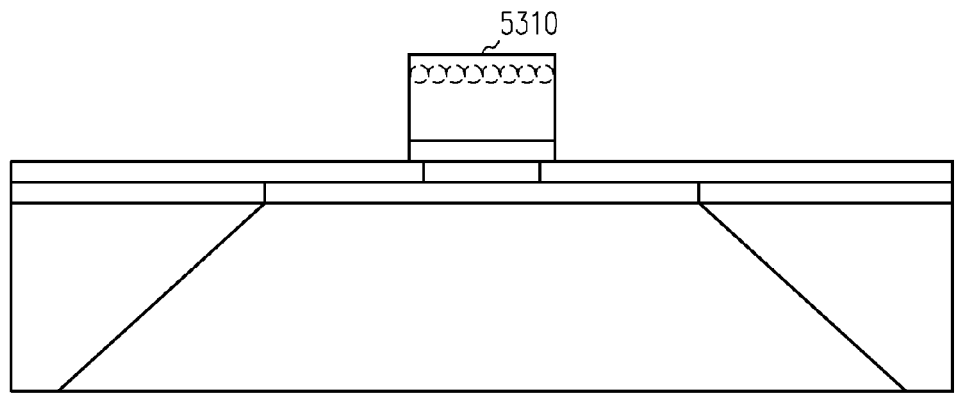

An array of fibers is then formed using various methods as illustrated in FIGS. 50A and 50B. In one embodiment, single 5 μm diameter fibers are then extracted from a tow or bundle of graphite fibers 5010, by soaking the bundle in acetone and drawing individual filaments 5015. A tape is made from individual fibers by wrapping the fibers around a mandrel to form arrays of 10 adjacently placed fibers 5020. The fiber arrays 5020 are placed onto the substrate in FIGS. 51A and 51B so that each array 5110 covers a row of SU 8 rectangles on the membranes. The fiber arrays 5110 are held in place by gluing them to the edges 5210 of a wafer using epoxy or other suitable means of holding the fiber arrays in place as illustrated in FIG. 52. SU 8 is then spin coated onto the substrate covered with fiber arrays to a thickness of 10 μm as shown in FIGS. 53A and 53B. This SU 8 layer 5310 is patterned so that the fibers are encapsulated and anchored to the substrate at one end of the membranes, and attached to the 2 μm SU 8 rectangles on top of the membrane.

Figure 54A:
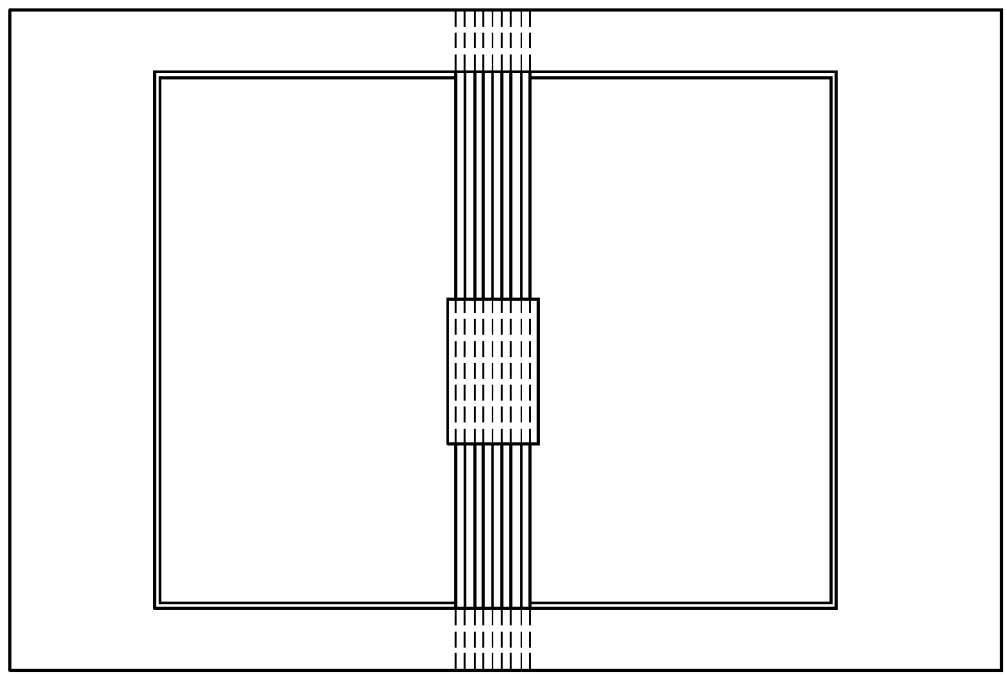
FIGS. 54A and 54B illustrate etching to expose a mirror and cantilever structure according to an example embodiment.
Figure 54B:
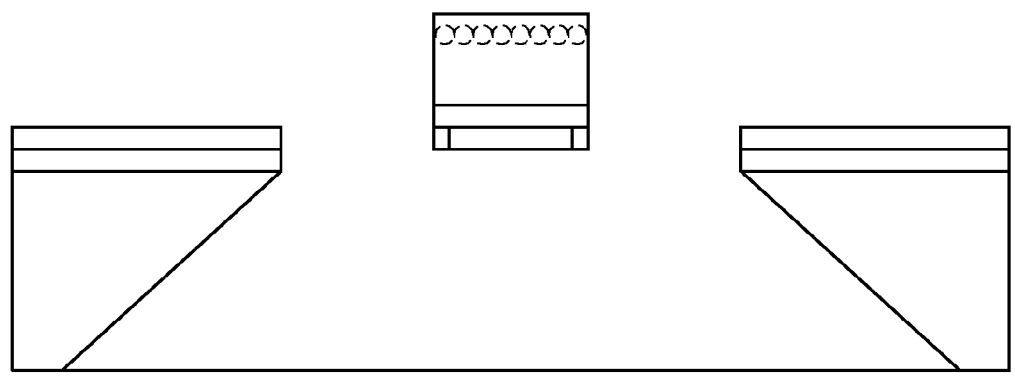
Figure 55:
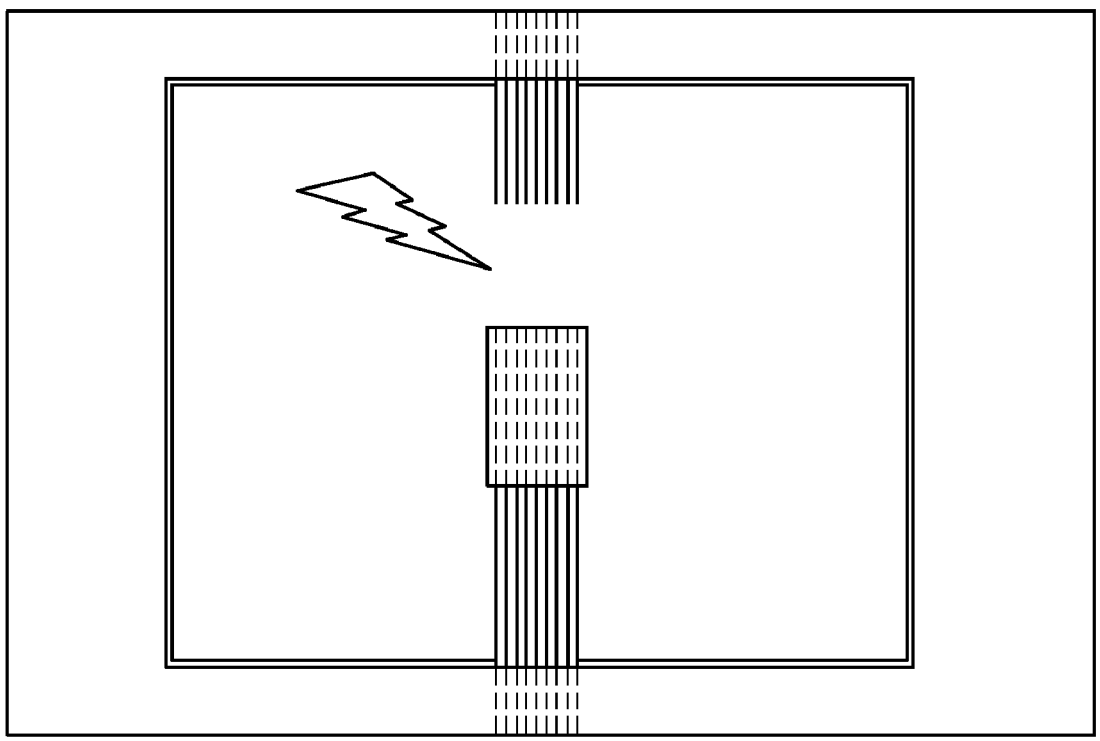
FIG. 55 illustrates a released mirror and cantilever structure via laser cutting according to an example embodiment.

The $Si_3N_4$ membrane is then etched away in a CF4 plasma resulting in the structures shown in FIGS. 54A and 54B. Etching methods may vary depending on the materials used for the membrane and mirror. A YAG laser may then be used to cut the fibers precisely to form the cantilever MEMS structure as illustrated in FIG. 55.

Variations in Fabrication Process

Figure 56A:
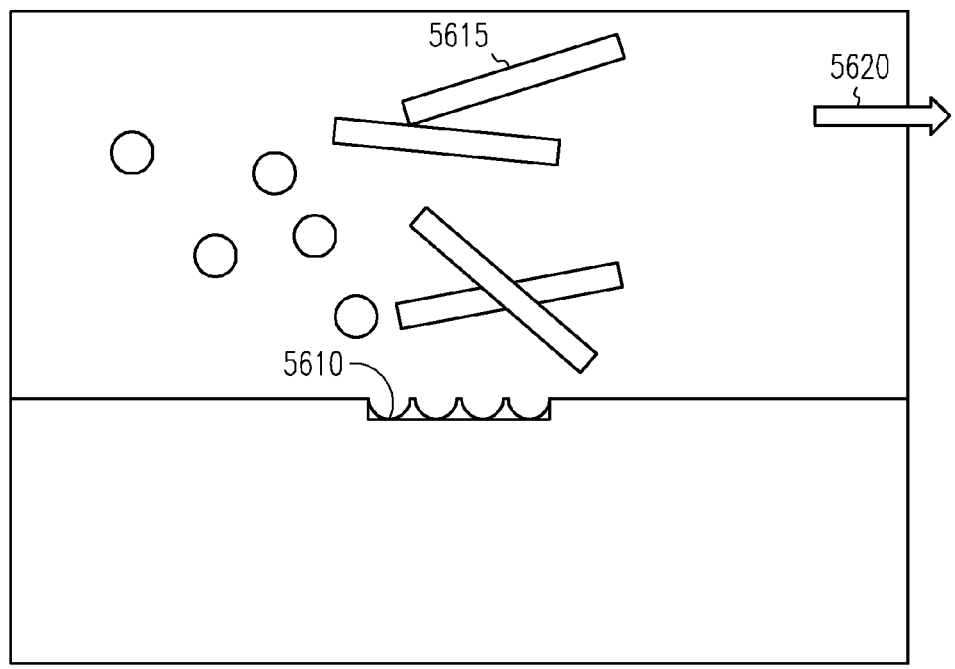
FIGS. 56A and 56B illustrate fiber alignment on a substrate according to an example embodiment.
Figure 56B:
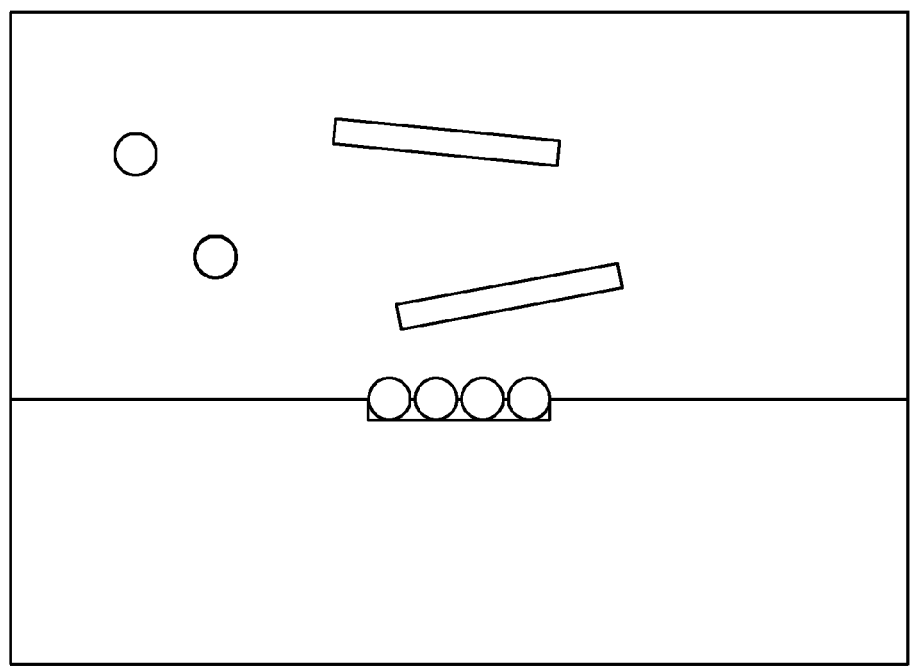

Fluidic assembly of fibers into cantilever MEMS structures may also be used. An alternative fabrication process uses fluid based self-assembly methods to align and anchor single fibers onto the substrate to form the MEMS cantilever structures. Fluidic transport may be the method of choice, since surface forces that dominate in these scales are easier to control in a fluid. Such a process involves patterning the substrate to form binding sites 5610 in FIGS. 56A and 56B where fibers 5615 have a tendency to settle according to prescribed energetically favorable orientations, when a solution containing fibers is flown over the substrate as indicated by arrow 5620. Such binding sites may include grooves with dimensions and shapes precisely or substantially matching that of the fibers. Capillary forces would then cause individual fibers to settle into the grooves as shown in FIG. 56B.

Figure 57A:
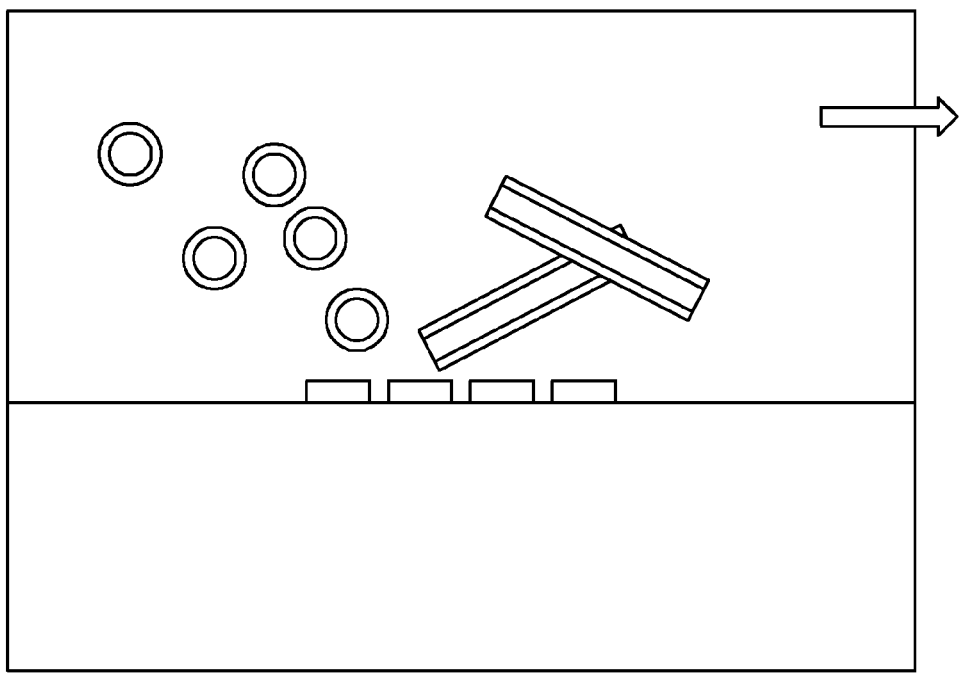
FIGS. 57A and 57B illustrate an alternative method of fiber alignment on a substrate according to an example embodiment.
Figure 57B:
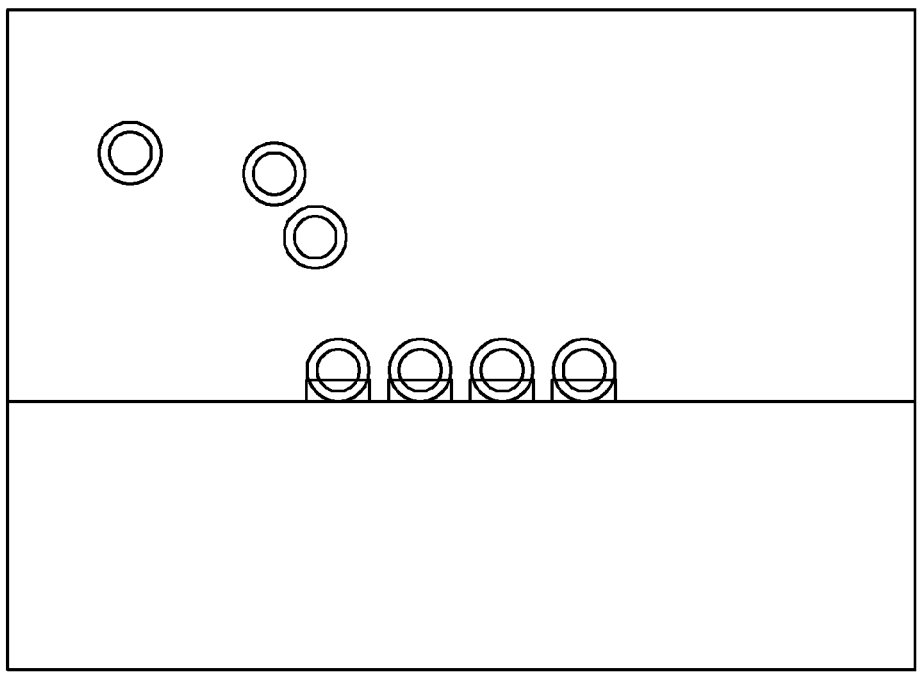
Figure 58A:
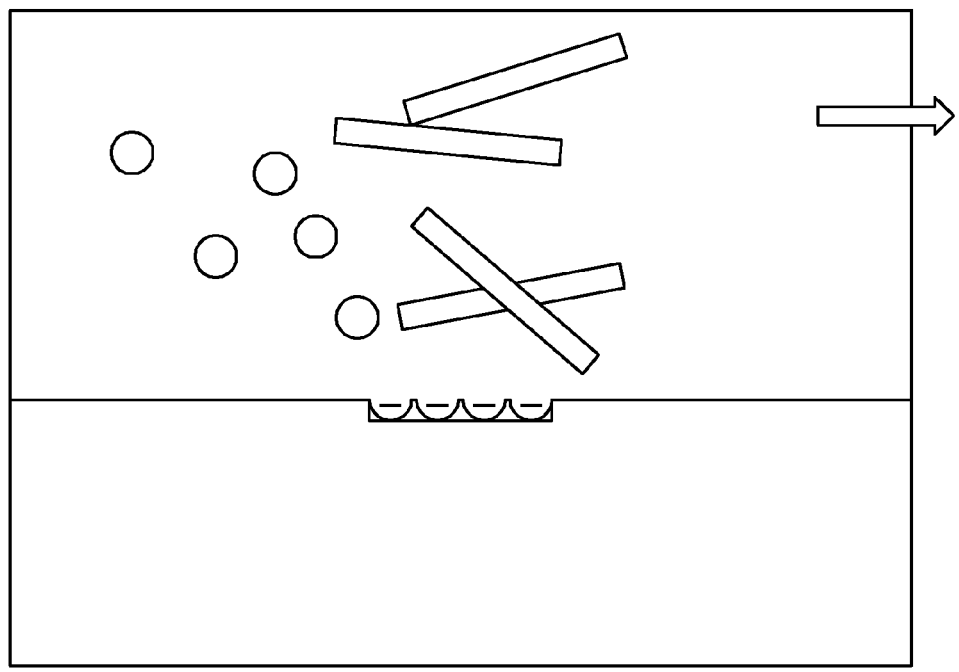
FIGS. 58A and 58B illustrate a further alternative method of fiber alignment on a substrate according to an example embodiment.
Figure 58B:
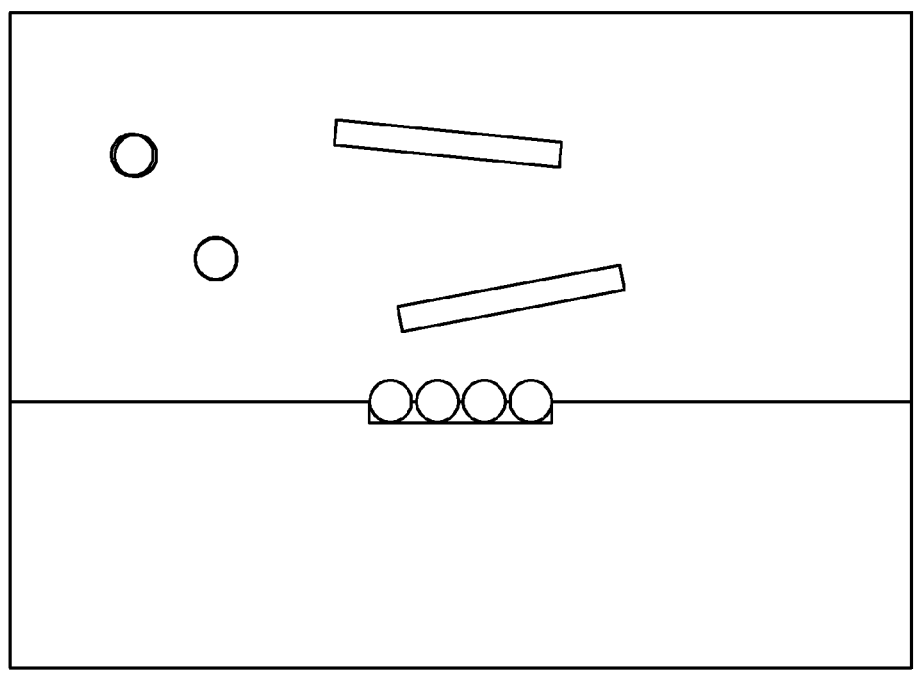

Alternatively, the fibers and parts of the substrate where the fibers are required to align and aggregate may be patterned with complementary chemicals that create a high probability for the fibers to orient themselves and 'stick' in the desired location on the substrate, thus minimizing the surface energy of the system as illustrated in FIGS. 57A and 57B. Grooves or other patterned areas on the substrate where the fibers are desired may also be electrostatically charged to facilitate attraction and anchoring of the fibers in those locations as illustrated in FIGS. 58A and 58B. A combination of such methods may be used to align and anchor fibers in appropriate locations on a substrate to form cantilever structures. In one embodiment, the grooves may be aligned with a desired crystalline orientation of a substrate, such as <110> to match anisotropic etches, or along <100> to span similar trenches.

Figure 59A:
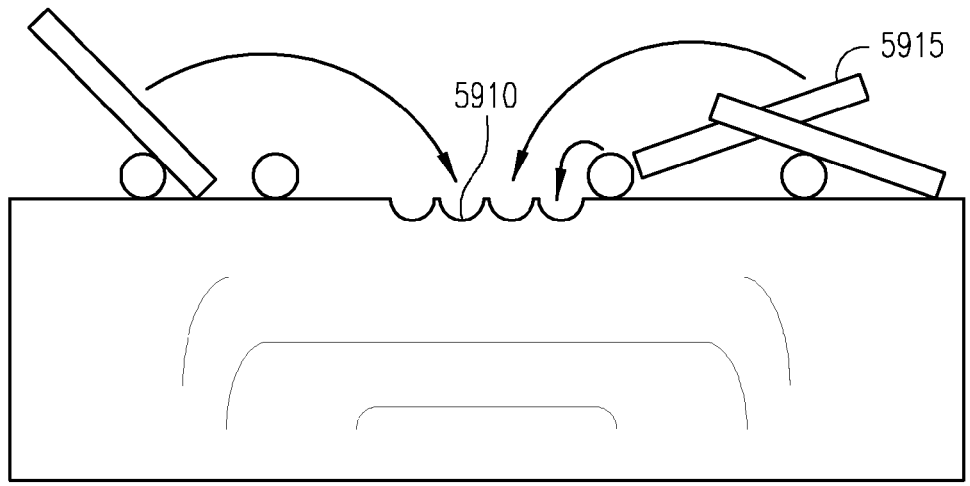
FIGS. 59A and 59B illustrate a further alternative method of fiber alignment on a substrate according to an example embodiment.
Figure 59B:
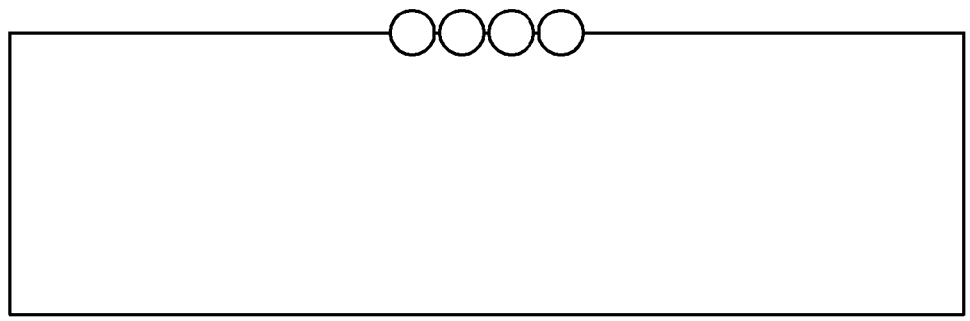
Figure 60A:
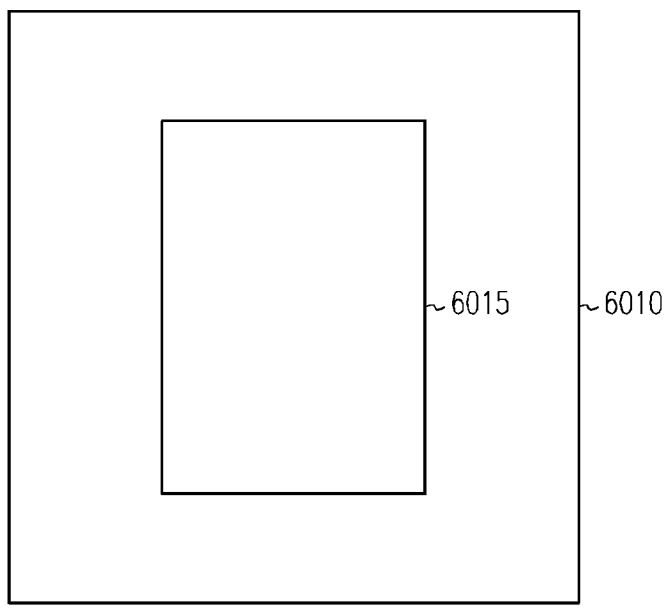
FIGS. 60A and 60B illustrate steps in forming a fiber array according to an example embodiment.
Figure 60B:
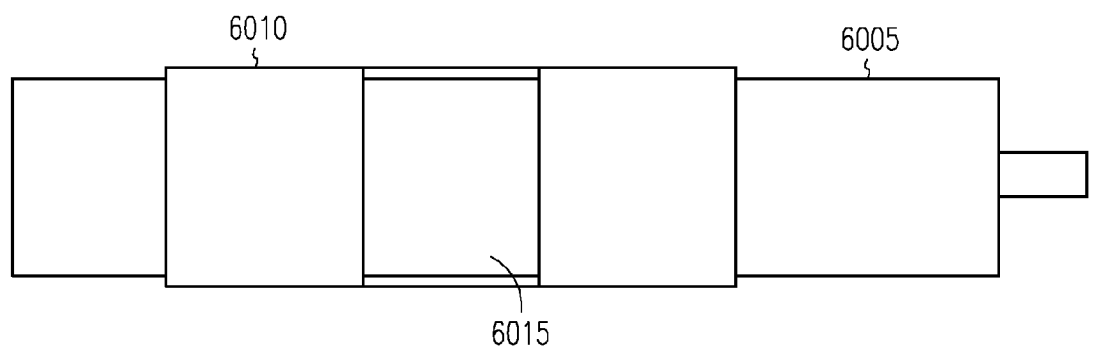
Figure 61A:
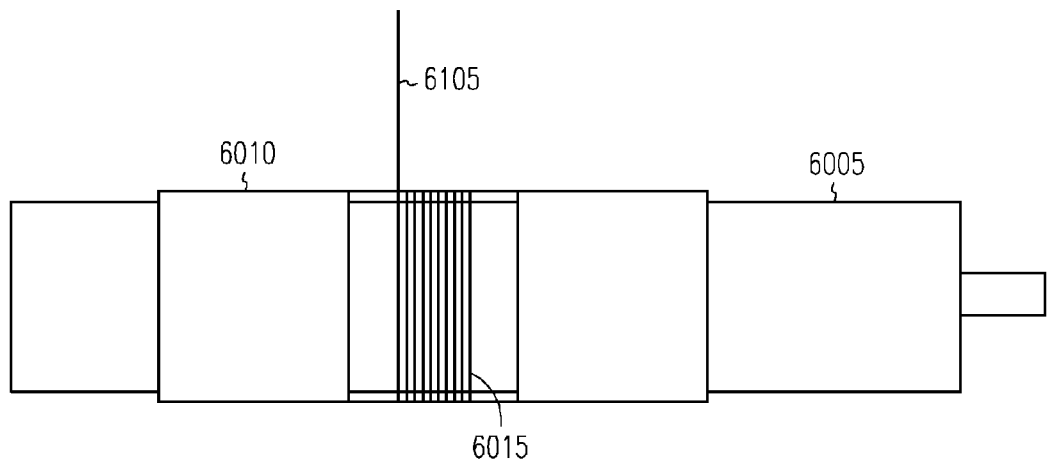
FIGS. 61A and 61B illustrate further steps in forming a fiber array according to an example embodiment.
Figure 61B:
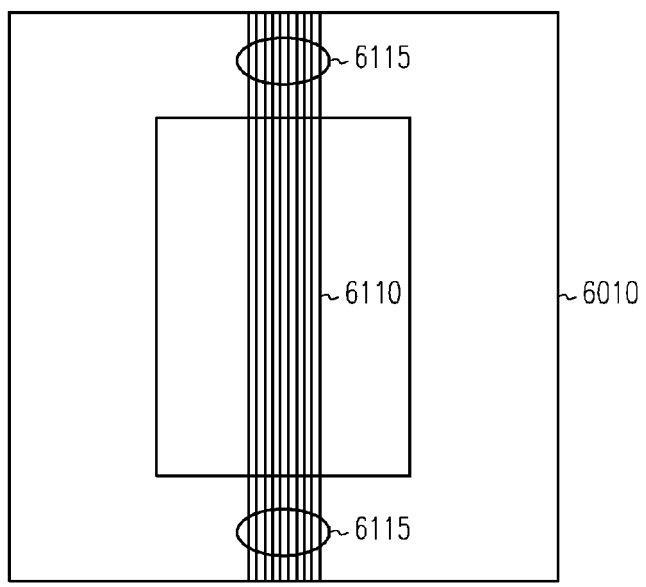

Self assembly methods may also be done without the use of fluids as illustrated in FIGS. 59A and 59B. In such an embodiment, grooves 5910 and other shapes defining the array structure forming the cantilever backbone may be defined into or patterned onto the surface of the substrate. The shapes defined in the substrate would match those of the individual fibers. Large numbers of precisely cut fibers 5915 matched to the dimensions of the grooves may then be placed onto this substrate and ultrasonically excited. The vibrations may cause the fibers to 'hop' over the surface and into the grooves as shown in FIG. 59B.

In one example embodiment, a method to extract and align a set of fibers to a substrate in preparation for making MEMS structures is described. A cylindrical mandrel 6005 is covered with a sheet of plastic 6010 into which a rectangular slot 6015 has been cut. Starting with a tow of fibers obtained commercially (Toray T1000), the fibers are soaked in acetone to remove the sizing (a adhesive polymer coating). Once cleared of the sizing, the fibers are rinsed and soaked in water. A single fiber 6105 is pulled from the tow in water and wrapped on the cylindrical mandrel so that 10 of them sit side by side at 6110. The mandrel is covered with a sheet of plastic into which the rectangular slot has been cut out, into which the tape of 10 fibers sits. Once aligned, the fibers are held in place by attaching them with glue 6115 to the plastic sheet 6010.

Figure 62:
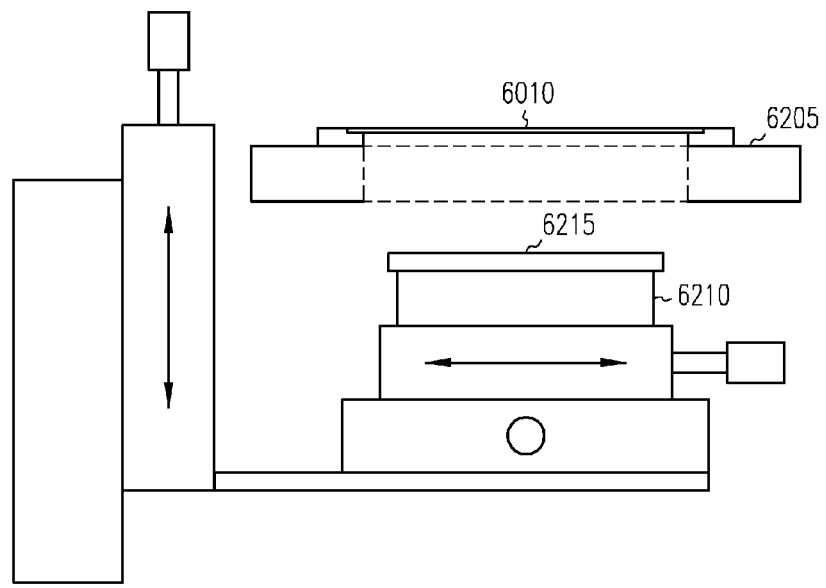
FIG. 62 illustrates a method of transferring a fiber array to a substrate according to an example embodiment.
Figure 63:
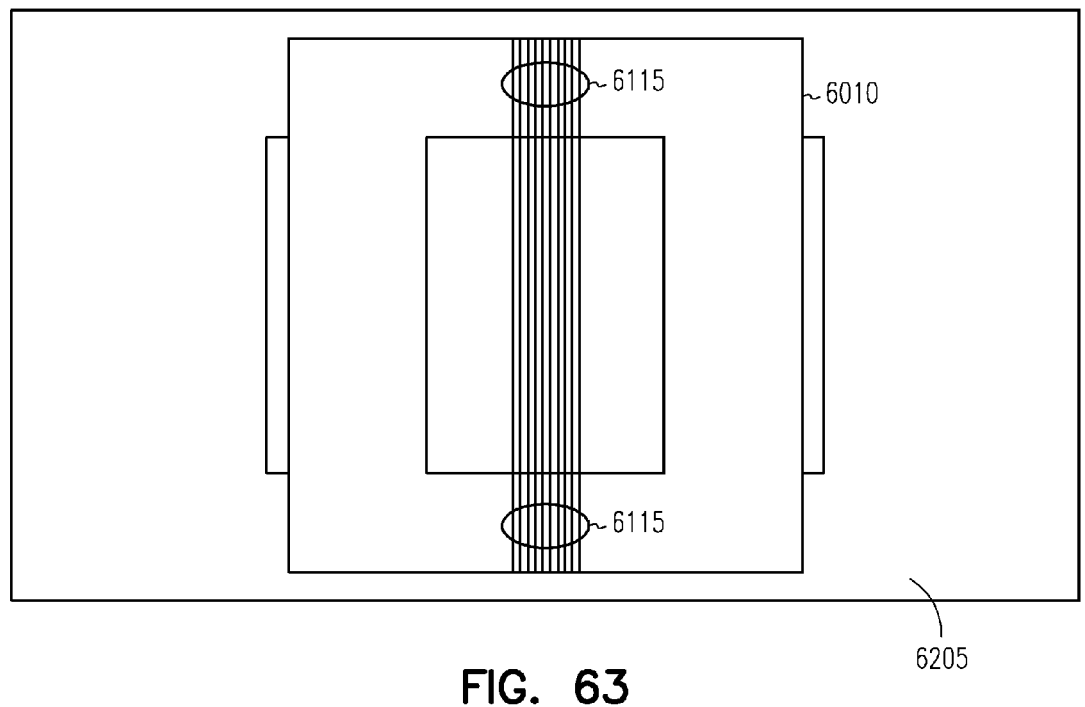
FIG. 63 illustrates a method of attaching a fiber array to a substrate according to an example embodiment.

The plastic sheet 6010 is then unwrapped from the mandrel 6005, and taped onto an aluminum chuck 6205 into which a wafer size slot has been cut out as shown in FIG. 62. The aluminum chuck sits above a rotating X-Y-Z stage 6210 onto which sits a silicon wafer 6215 with $Si_3N_4$ membranes patterned with aluminum mirror elements. A microscope may be used to align the fiber tape to the structures on the wafer and once alignment has been achieved, the wafer is raised up to contact the fibers. The fibers are then glued to the edge of the wafer and cut away from the plastic sheet on the aluminum chuck as illustrated in FIG. 63. SU 8 photoepoxy is then coated onto the wafer and patterned so that the fibers are glued to the wafer at one end of the membrane, and to the mirror element in the middle of the membranes.

Alternative Actuation

In a further embodiment, tip deflection is created by causing small motions at the cantilever's anchor point to the substrate. By attaching the anchor point to a piezoelectric bending element and matching the resonance of the piezoelectric bending element to that of the fiber cantilever (by varying the piezo's length), maximum amplitudes in the fiber tips may be obtained. If the resonances are not matched, deflections in the fiber may not be as great.

Figure 64A:
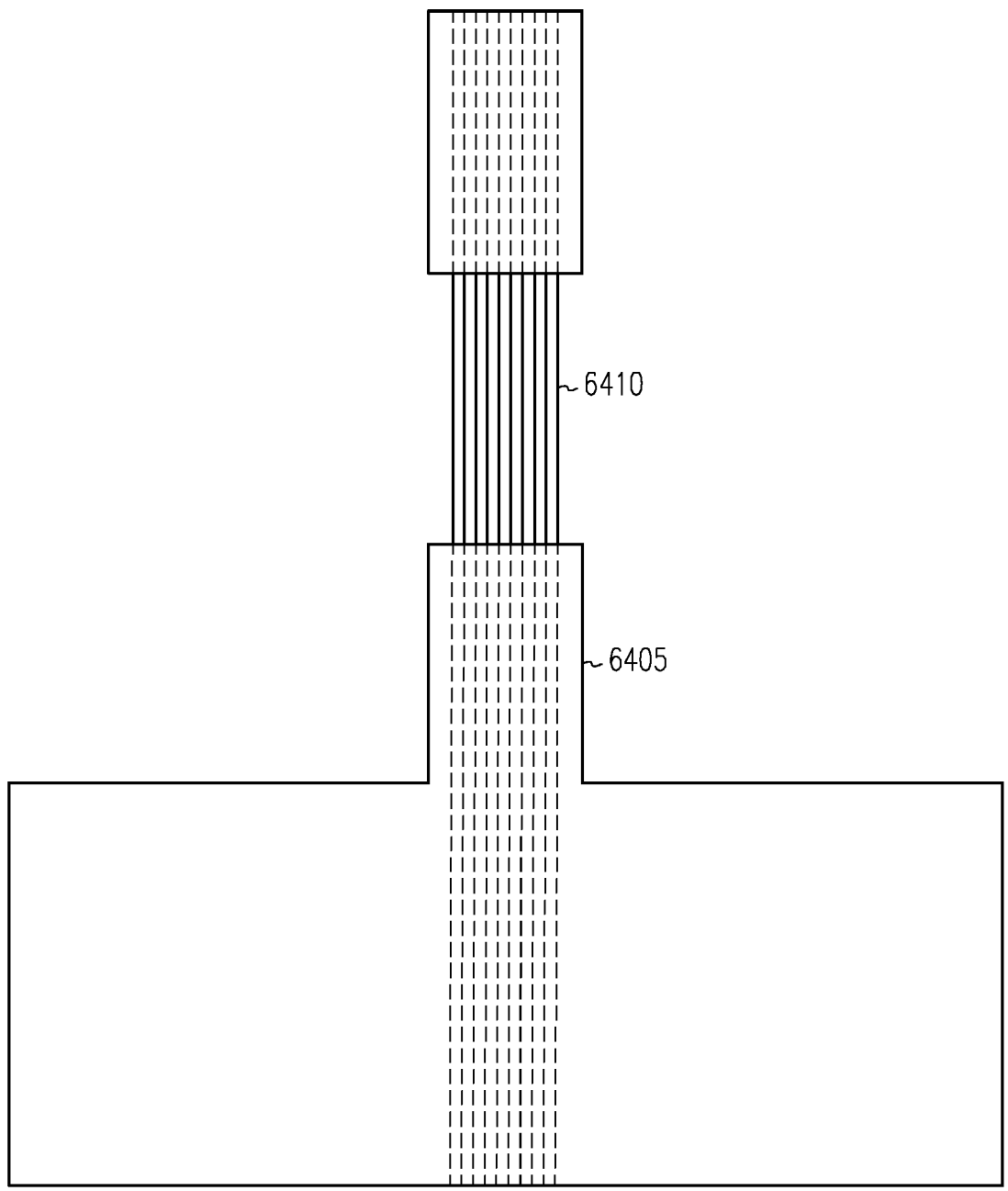
FIGS. 64A, 64B and 64C illustrate an alternative dual cantilever structure according to an example embodiment.
Figure 64B:
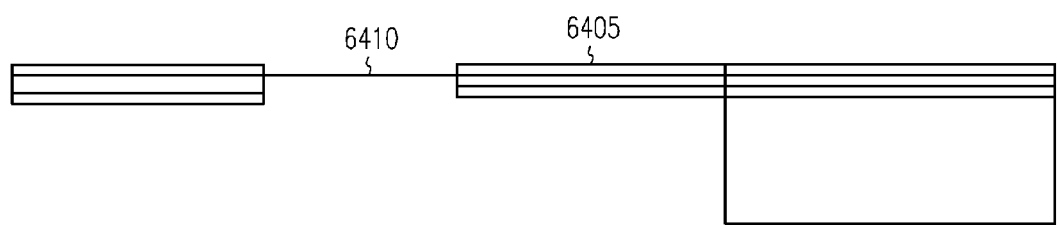
Figure 64C:
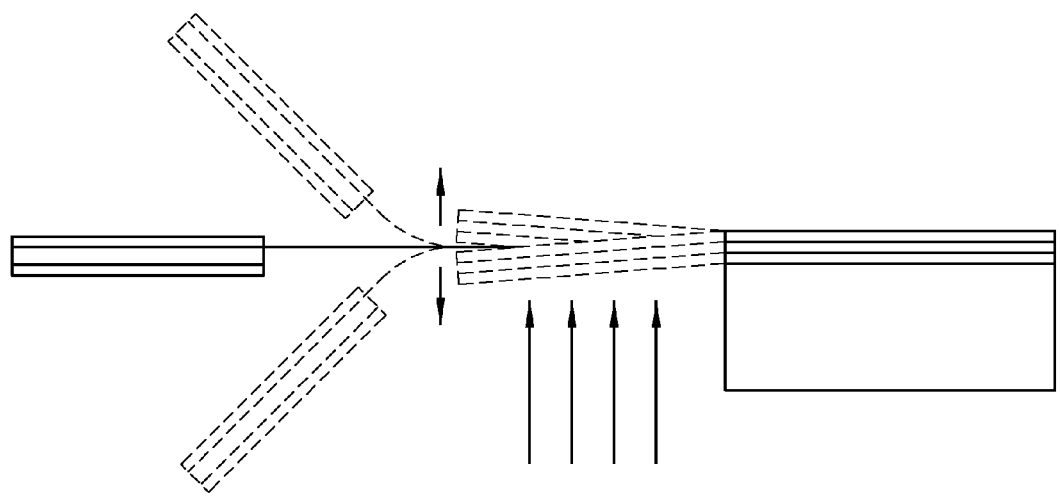

In one embodiment, a cantilever of ferromagnetic nickel 6405 is fabricated on a silicon substrate as illustrated in FIGS. 64A, 64B and 64C. A fiber cantilever 6410 is then placed over the nickel cantilever and glued with epoxy as described above, creating dual serial cantilevers. The length of the nickel cantilever may be designed to match (approximately) that of the fiber cantilever. In one embodiment, the nickel cantilever length and thickness is selected so that resonance matches the fiber cantilever. An alternating magnetic field may then be applied perpendicular to the nickel cantilever causing it to oscillate as shown in FIG. 64C.

The oscillations may be amplified in the fiber cantilever with tip deflection several times that of the nickel cantilever deflection. Similar actuation methods at the base may also include the formation of Lorentz coils at the base of the fiber cantilever, or the application of electrostatic forces on the basal parts of the fiber cantilever. A combination of actuation methods may also be used. For example, a piezo-based mechanism may be used to start the oscillations, and lower force actuation such as electrostatics or weak pulsing magnetic fields may be used to maintain oscillations at resonance. Since the energy requirements to maintain the oscillations in the cantilever are minimal at resonance, a strong force or large deflection actuator can be used to begin resonance deflections in the cantilever, which may be maintained by the application of smaller forces or deflections over each oscillation cycle of the cantilever.

CONCLUSION

Fibrous micro-composite materials are formed from micro fibers. The fibrous micro-composite materials are utilized as the basis for a new class of MEMS. In addition to simple fiber composites and microlaminates, fibrous hollow and/or solid braids, can be used in structures where motion and restoring forces result from deflections involving torsion, plate bending and tensioned string or membrane motion. In some embodiments, these materials will enable simultaneous high operating frequencies, large amplitude displacements and or rotations, high reliability under cyclical stresses.

In one embodiment, fibrous elements are formed using high strength, micron and smaller scale fibers, such as carbon/graphite fibers, carbon nanotubes, fibrous single or multi-ply graphene sheets, or other materials having similar structural configurations. The type of fiber used may vary greatly. Some examples in addition to carbon fibers (and their penultimate carbon nanotubes), include but are not limited to glass fibers, Kevlar fibers, metal fibers (magnetic or electrically conductive), etc.

One MEMS device formed using the micro-composite materials is an optical scanner. The optical scanner has a mirror that is sufficiently stiff to resonate at high frequencies-approaching and eventually exceeding 10 kHz, and is tough enough to undergo large elastic deformations in either bending or torsion so as to actuate the mirror element through angular deflections approaching 40°. Fiber properties, fiber volume fraction, fiber orientation, resin materials and the fiber/resin interface characteristics can all be adjusted to modify the properties of the scanner. Scanners may be optimized for stiffness and elasticity by combining the stiffness and strength of one material with the elasticity of another.

The fibrous MEMS materials technology is also compatible with CMOS processing, which enables full system development with active control and sense circuitry on associated wafers. The anticipated commercial benefits of the use of fibrous based materials for MEMS devices are far and wide reaching.

One of the largest commercial markets for high speed/large deflection MEMS—as envisioned today—is the optical imaging and Telecommunication spaces, specifically scanners and optical switches. Raster scanned displays could be substantially miniaturized as current performance limitations are addressed, and the inherent size and mass producible nature of MEMS scanners also allows for a dramatic reduction in the cost and power consumption of these systems. Fibrous micro-composite MEMS scanners may be used in video display applications, optical cross connects for telecommunications networks, spatial light modulators, laser printer and optical data storage heads, barcode scanners etc. A myriad of other broad and niche applications exist for high performance scanners, such as endoscopic and confocal microscopes or spatial light modulators for use in laser printers, barcode scanners and optical storage heads. The small size and weight, low power consumption and low cost of the MEMS scanners also translate to the same advantages in the micro display markets.

MEMS can be fabricated from fibers without the use of a matrix material. Devices can be built where fibers are attached only at a substrate edge (e.g. cantilevers, bridges). Motions can be controlled by adjusting the linkage between multiple fibers with weak coupling (e.g. base, tip, in-between). Driving mechanisms now include base-forcing (magnetics, piezo, electrostatics) or tip forcing (magnetics). Fiber based MEMS devices may be valuable in portable instruments due to their small size, the need for a single element, and power efficiency. The simplest optical scanner assembly would be formed by attaching a mirror (or other reflective element, perhaps a hologram) to a set of aligned graphite fibers on a substrate. These structures can be formed using many conventional semiconductor and microelectromechanical system (MEMS) fabrication techniques.

In one embodiment, single layers of individual graphite fibers may be used to fabricate a fiber composite MEMS cantilever devices on a silicon substrate. In adding the fibers to the MEMS, structural elements produced in different manufacturing processes (the substrate by standard silicon processing techniques and the fiber by a fiber manufacturing process) are combined to create complex, composite MEMS structures which exploit the unique properties of each element to obtain unprecedented performance. The development and use of fibrous materials to form moving microscopic structures represents a vast improvement in materials technology for MEMS. In one embodiment, the cantilever structure is comprised of aligned fibers anchored to a substrate at one end with a second end free to move. A structure can be attached to or fabricated on the free end of the cantilevered fibers (in the process of manufacture as described below, the 'free end' of the cantilever may not actually be able to move freely until the structure to which it is attached is released from the substrate). A force can be applied to the cantilever to move the attached structure in a desired manner.

In one embodiment, the attached structure is a mirror. The mirror may be fabricated on the free end of a fiber MEMS cantilever structure. Oscillating the structure in an incident light beam causes the beam to be deflected and scanned. The scan length and speed depends on the fiber's deflection and frequency. The fibers used can be tailored so as to control both.

Any type of fiber can be used, and the specific fiber used for a given device will be chosen to meet the performance requirements of that device. Scanners and other cantilevered devices can be made with either one or multiple fibers. Carbon/graphite fibers can be deformed to provide high angles of deflection, have high resonate oscillating frequencies at useful lengths/cross-section and have exceptional fatigue life. As such, carbon/graphite fibers are especially suitable for use in scanning MEMS with scan angles, speeds, and fatigue life far beyond the capabilities of conventional MEMS scanners based on silicon and other traditional MEMS materials.

Fiber composite MEMS, such as scanners, may be fabricated using standard MEMS and semiconductor fabrication processes. These include photolithography and etching, spin-coating and laser cutting. Photolithography is used to prepattern the substrate prior to the incorporation of the fibers and form discrete elements, including the mirror for an optical scanner. Guides for positioning or aligning the fibers and other structures may be formed prior to incorporation of the fibers using photolithography and etching. Simple alignment methods provide the ability to deposit and assemble the fibers into cantilever structures on a silicon substrate. Spincoating, controlled deposition and other methods can be used to attach or mount the fibers on the substrate. Photolithography and etching can be used after incorporation of the fibers to further modify the structure, such as to release certain elements (such as the mirror). Lasers have been used to process both the substrate and the fibers.

Cantilever scanner structures made from graphite fibers leverage both the superior mechanical properties of the graphite fibers in bending or flexure, (notably, high strength and stiffness, as well as fatigue free behavior under repetitive stress cycling) and the vast body of knowledge of silicon device manufacturing. Graphite fiber based MEMS optical scanners may produce tip deflections >±80° at frequencies exceeding 30 kHz, and for over $10^{11}$ oscillating (scanning) cycles; and are hence capable of scanning light through very large angles and at very high speeds almost indefinitely.

There are many applications for aligned/oriented fibers, such as structural scaffolds and or reinforcements for MEMS devices/structures. Diameters of the fibers may range from nms-ums to form individual structures in a MEMS. Some diameters which may be used include from 5 um to 1 nm. Larger, or smaller diameter fibers may also be used. Lengths of fibers range from 1 mm to larger than 300 mm. Shorter and longer fibers may also be used. The addition of a fiber or a plurality of specifically oriented fibers to a pre-patterned substrate with microscopic structures may also be used to form MEMS. Aligned fibers added to MEMS structures on a substrate may be used as reinforcement and to impart and enhance certain desired properties.

In further embodiment, fibers may be coupled to a substrate and with each other. Microscopic graphite fibers, Kevlar, biologically, chemically, optically, and electrically functional fibers and others may be used to form MEMS structures. Such fibers may be used to impart actuation and sensing capabilities to MEMS and particularly fiber MEMS structures. Multiple fibers may be combined with varied material types to form MEMS structures with desired and tailored properties.

In yet further embodiments, a MEMS has a substrate, and a microscopic structure made of fibers operatively coupled to the substrate. The fiber structure is a microscopic cantilever beam in one embodiment, and may be formed of a single fiber or an array of parallel and adjacent oriented fibers. The fibers may be aligned within or onto a MEMS structure. In further embodiments, the fibers are carbon fibers, graphite fibers or carbon nanotube fibers. In one embodiment, the fibers have diameters ranging from 10 nm-10 um.

Complex motion of cantilevers may be obtained by intentional fabrication of non-resonant elements. The cantilever can be made to oscillate in modes other than pure bending. By varying the lengths of the fiber, placing masses unevenly at the tip, incorporating materials with disparate mechanical properties can all be used to cause different types of motion within the cantilever. This may be useful in other MEMS applications. Additionally, this may also be beneficial in imaging applications by making a single cantilever oscillate at high frequencies in bending (>30 kHz), and at very low (60-120 Hz) scans in the orthogonal dimension. Motion other than pure bending in the fiber cantilevers may occur due to some of the factors mentioned above.

In one embodiment, the fibers may be uneven in length, such as fibers on one side of a cantilever being longer than the fibers on the other side of the cantilever. The slower resonance of the longer fibers may cause the cantilever to tilt in the direction of the longer fibers during every oscillation cycle. This in effect produces a diagonal scan line instead of a straight scan line in the case of using the cantilever as an optical scanner. Fiber lengths may be varied in a way that the tilting effect in the cantilever during oscillation is produced gradually, so that the cantilever tilts by a certain amount after its first oscillation, and then by the same amount after every subsequent oscillation. Such a scanner may be made to scan in two dimensions at disparate rates, which may be useful for imaging. In single fibers, a circular oscillation path of the fiber tip may be obtained when excited at different frequencies in two orthogonal dimensions. Applications for such single fiber structures may include ciliary actuators and nano-mixers.

A MEMS cantilever may have a mirror at its tip. In one embodiment, a MEMS device is formed by extracting single fibers from fiber bundles, and aligning and coupling the extracted fibers in specific orientations on a suitable substrate. The fibers may be selectively coupled to each other and or to other structures on the substrate. The fibers may then be selectively patterned and released to form MEMS devices.

In one embodiment, the substrate may be pre-patterned to create desired fiber MEMS structures. The pre-patterning may be done by pre-forming alignment patterns or grooves on the substrate. Actuating of fiber MEMS structures may be accomplished by using electromechanically functional fibers and or matrices coupled to structural fiber scaffold. Vibrations may be created by various means (piezoelectric, magnetic, electrostatic etc.) at the point of attachment of fiber devices to the substrate, and are used to create large deflection amplitudes and forces at the free ends of the fiber MEMS structures.

The invention claimed is:

1. A method comprising:
   forming an array of fibers supported by a substrate at a clamped end of the fibers in the array of fibers; and
   supporting a structure at a second free end of the array of fibers, wherein the structure oscillates responsive to selected stimulus to form a micro-electro-mechanical device.

2. The method of claim 1 and further comprising forming a matrix encapsulating the array of fibers.

3. The method of claim 1 wherein the structure comprises a mirror.

4. The method of claim 1 wherein the array of fibers comprises carbon fibers.

5. The method of claim 4 wherein the carbon fibers are extracted from a tow or bundle of graphite fibers.

6. The method of claim 4 comprising the further step of extracting at least one fiber of said array of carbon fibers from a tow or bundle of graphite fibers prior to forming said array of fibers;
   wherein the step of extracting the carbon fiber from the tow or bundle of graphite fibers comprises:
      soaking the tow or bundle of graphite fibers in solvent to remove sizing from the tow;
      and washing the tow or bundle of graphite fibers with water after soaking the tow in solvent to remove sizing from the tow.

7. The method of claim 1 further comprising forming a groove in the substrate such that at least one of said array of fibers is supported by the substrate in the groove.

8. The method of claim 1 further comprising incorporating an actuation element into at least one of the substrate, the fiber and the structure.

9. The method of claim 1 wherein one of said array of fibers is selected from the group consisting of magnetic, piezoelectric, electrostatic, electrothermal, and electrostrictive responsive fibers.

10. The method of claim 1 further comprising initially forming a nickel cantilever on the substrate, wherein the array of fibers is clamped to the free end of the nickel cantilever.

11. The method of claim 3 wherein the array of fibers is supported on a top side of the substrate, and wherein the mirror has a reflective surface facing a bottom side of the substrate.

12. The method of claim 11 wherein the reflective surface of the minor is formed by depositing reflective metal on a selectively etchable deposited material having a substantially flat surface.

13. The method of claim 1 wherein the structure comprises a further fiber.

14. A method comprising:
   forming a mirror on a surface supported by a substrate;
   placing a fiber over the substrate so that at least a portion of the fiber overlays the mirror;
   clamping the fiber to the minor at a first end and to the substrate at a second end; and
   releasing the mirror from the substrate and removing substrate material beneath a portion of the fiber to create a minor supported by the substrate via the fiber in a cantilevered manner from the substrate.

15. The method of claim 14 further comprising integrating an actuation element into the substrate, the fiber and/or the mirror to form a mirror that oscillates responsive to selected stimulus of the actuation element.

16. The method of claim 15 wherein said actuation element comprises at least one of a magnetically functional fiber, an electroactive fiber, an electromechanical fiber, or a piezoelectric fiber.

17. The method of claim 14 wherein a minor supported by the substrate via the fiber in cantilevered manner from the substrate is formed at a plurality of locations on the substrate.

18. The method of claim 14 wherein said fiber is a carbon fiber.

19. The method of claim 18 wherein said carbon fiber is extracted from a tow or bundle of graphite fibers.

20. The method of claim 18 and further comprising:
   extracting said carbon fiber from a tow or bundle of graphite fibers prior to forming said array of fibers;
   wherein the step of extracting the carbon fiber from the tow or bundle of graphite fibers comprises of:
      soaking the tow or bundle of graphite fibers in solvent to remove sizing from the tow; and
      washing the tow or bundle of graphite fibers with water after soaking the tow in solvent to remove sizing from the tow.

21. The method of claim 14 and further comprising forming a groove in the substrate such that the fiber is supported by the substrate in the groove.

22. The method of claim 14 wherein the fiber is part of an array of fibers to create a mirror supported by the substrate via the array of fibers in a cantilevered manner from the substrate.

23. The method of claim 15 wherein a mirror that oscillates responsive to selected stimulus of the actuation element is formed at a plurality of locations on the substrate.

24. The method of claim 22 a mirror supported by the substrate via the array of fibers in cantilevered manner from the substrate is formed at a plurality of locations on the substrate.

25. The method of claim 22 wherein the array of fibers is supported on a top side of the substrate, and wherein the mirror has a reflective surface facing a bottom side of the substrate.

26. The method of claim 25 wherein the reflective surface of the mirror is formed by depositing a reflective metal on a selectively etchable deposited material having a substantially flat surface.

27. The method of claim 14 wherein the fiber is supported on a top side of the substrate, and wherein the mirror has a reflective surface facing a bottom side of the substrate.

28. The method of claim 27 wherein the reflective surface of the mirror is formed by depositing a reflective metal on a selectively etchable deposited material having a substantially flat surface.

29. The method of claim 22 further comprising integrating an actuation element into the substrate, the array of fibers and/or the mirror, wherein said mirror oscillates responsive to selected stimulus of said actuation element.

30. The method of claim 29 wherein said actuation element comprises at least one of a magnetically functional fiber, an electroactive fiber, an electromechanical fiber, or a piezoelectric fiber.

31. The method of claim 29 wherein a mirror that oscillates responsive to selected stimulus of the actuation element is formed at a plurality of locations on the substrate.

32. The method of claim 1 further comprising repeating the forming and supporting elements at a plurality of locations on the substrate.

33. The method of claim 1 further comprising repeating the forming and supporting elements at a plurality of locations on the substrate.

* * * * *

UNITED STATES PATENT AND TRADEMARK OFFICE
CERTIFICATE OF CORRECTION

PATENT NO.        : 7,835,055 B2
APPLICATION NO.   : 12/615625
DATED             : November 16, 2010
INVENTOR(S)       : Shahyaan Desai It is certified that error appears in the above-identified patent and that said Letters Patent is hereby corrected as shown below:

Title Page,

On page 2, under "Other Publications", in column 2, line 32, delete "Microengeering," and insert -- Microengineering, --, therefor.

In column 2, line 53, delete "101," and insert -- 10I, --, therefor.

In column 5, line 6, delete "and or" and insert -- and/or --, therefor.

In column 7, line 45, delete "and or" and insert -- and/or --, therefor.

In column 11, line 65, delete "($R_o$)" and insert -- ($R_0$) --, therefor.

In column 12, line 19, delete "and or" and insert -- and/or --, therefor.

In column 12, line 41, delete "15." and insert -- 15 --, therefor.

In column 13, line 45, delete "and or" and insert -- and/or --, therefor.

In column 15, line 49, delete "20." and insert -- 20 --, therefor.

In column 22, line 1, delete "and or" and insert -- and/or --, therefor.

In column 24, line 2, delete "and or" and insert -- and/or --, therefor.

In column 25, line 5, delete "and or" and insert -- and/or --, therefor.

In column 25, line 14, delete "and or" and insert -- and/or --, therefor.

Signed and Sealed this
Eighteenth Day of January, 2011

David J. Kappos
*Director of the United States Patent and Trademark Office*

CERTIFICATE OF CORRECTION (continued)
U.S. Pat. No. 7,835,055 B2

In column 25, line 65, in Claim 12, delete "minor" and insert -- mirror --, therefor.

In column 26, line 7, in Claim 14, delete "minor" and insert -- mirror --, therefor.

In column 26, line 11, in Claim 14, delete "minor" and insert -- mirror --, therefor.

In column 26, line 21, in Claim 17, delete "minor" and insert -- mirror --, therefor.

In column 26, line 47, in Claim 24, after "22" insert -- wherein --.

In column 28, line 5, in Claim 33, delete "claim 1" and insert -- claim 11--, therefor.